(12) United States Patent
Bowman et al.

(10) Patent No.: US 9,340,636 B2
(45) Date of Patent: May 17, 2016

(54) THIOL-CONTAINING DUAL CURE POLYMERS AND METHODS USING SAME

(71) Applicant: THE REGENTS OF THE UNIVERSITY OF COLORADO, A BODY CORPORATE, Denver, CO (US)

(72) Inventors: Christopher N. Bowman, Boulder, CO (US); Devatha P. Nair, Longmont, CO (US); Maciej Podgorski, Boulder, CO (US); Shunsuke Chatani, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 14/341,494

(22) Filed: Jul. 25, 2014

(65) Prior Publication Data

US 2015/0031782 A1 Jan. 29, 2015

Related U.S. Application Data

(60) Provisional application No. 61/858,859, filed on Jul. 26, 2013.

(51) Int. Cl.
*C08F 2/46* (2006.01)
*C08F 2/50* (2006.01)
*C08G 61/04* (2006.01)
*C08F 228/00* (2006.01)
*C08F 220/18* (2006.01)
*C08F 222/10* (2006.01)

(52) U.S. Cl.
CPC ............. *C08F 228/00* (2013.01); *C08F 220/18* (2013.01); *C08F 222/1006* (2013.01)

(58) Field of Classification Search
CPC ........ C08G 63/688; C08G 63/82; C08F 20/00
USPC .................. 522/33, 6, 1, 71, 189, 184; 520/1
See application file for complete search history.

(56) References Cited

U.S. PATENT DOCUMENTS

| 6,365,072 | B1 | 4/2002 | Katoot et al. | |
|---|---|---|---|---|
| 2003/0017424 | A1 | 1/2003 | Park et al. | |
| 2006/0263301 | A1* | 11/2006 | Vernon et al. | 424/9.4 |
| 2008/0021166 | A1 | 1/2008 | Tong et al. | |
| 2008/0085946 | A1 | 4/2008 | Mather et al. | |
| 2008/0269460 | A1 | 10/2008 | Bowman et al. | |
| 2010/0311861 | A1 | 12/2010 | Clapper et al. | |
| 2013/0277890 | A1* | 10/2013 | Bowman et al. | 264/496 |
| 2014/0271601 | A1* | 9/2014 | Aimetti et al. | 424/94.5 |

FOREIGN PATENT DOCUMENTS

WO WO2009/132070 A2 10/2009
WO 2012-061702 * 5/2012

OTHER PUBLICATIONS

Chatani et al, Relative reactivity and selectivity of vinyl sulfones and acrylates towards the thiol-Michael addition reaction and polymerization, Nov. 19, 2012, Polym. Chem, 4, 1048-1055.*
International Search Report dated Mar. 20, 2012 for PCT International Patent Application No. PCT/US2011/059320, filed Nov. 4, 2011.
Chan, J.W. et al., "Nucleophile-Initiated Thiol-Michael Reactions: Effect of Organocatalyst, Thiol, and Ene," Macromolecules, 2010, vol. 43, pp. 6381-6388.
Chatani, S. et al., "Reactivity and Selectivity of Vinyl Sulfones Towards the Thiol-Michael Addition Reaction and Their Implementation to Two-Stage Reactive Polymer Systems," Polymeric Materials Science and Engineering, ACS Abstract, ACS National Meeting and Exposition, New Orleans, Louisiana, 2013.
Chatani, S. et al., "Relative Reactivity and Selectivity of Vinyl Sulfones and Acrylates Towards the Thiol-Michael Addition Reaction and Polymerization," Polym. Chem., 2013, vol. 4, pp. 1048-1055.

* cited by examiner

*Primary Examiner* — Ling Choi
*Assistant Examiner* — Jessica E Whiteley
(74) *Attorney, Agent, or Firm* — Saul Ewing LLP; Kathryn Doyle; Domingos J. Silva

(57) ABSTRACT

The invention includes a composition comprising a vinyl sulfone monomer, a thiol monomer and an acrylate monomer. In one embodiment, the thiol monomer reacts with the vinyl sulfone monomer preferentially over the acrylate monomer, and this differential selectivity allows for the control of the architecture of crosslinking polymer network. The invention further includes a composition comprising an electrophilic monomer, a nucleophilic monomer, a nucleophilic catalyst and an acid, wherein the concentrations of the nucleophilic catalyst and acid are selected as to provide a specific induction time for the polymerization reaction of the composition.

11 Claims, 61 Drawing Sheets

Fig. 1

Thiols

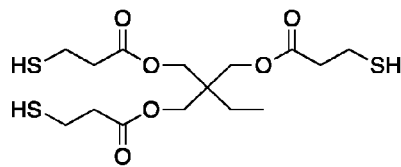
Trimethylolpropane tris(3-mercaptopropionate)
(TMPTMP)

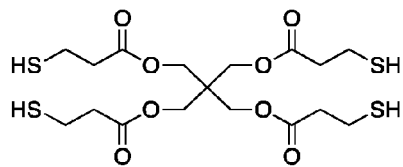
Pentaerythritol tetrakis(3-mercaptopropionate)
(PETMP)

1-Hexanethiol
(HT)

Methyl 3-mercaptopropionate
(MMP)

Isocyanates

Hexamethylene diisocyanate
(HMDI)

Vinyls

Hexyl acrylate
(HA)

Ethyleneglycol methyl ether acrylate
(EGMEA)

Hexanediol diacrylate
(HDDA)

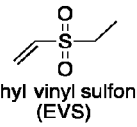
Ethyl vinyl sulfone
(EVS)

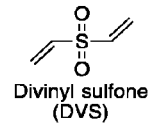
Divinyl sulfone
(DVS)

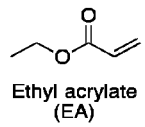
Ethyl acrylate
(EA)

Nucleophiles and bases

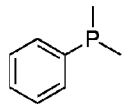
Dimethylphenylphosphine
(DMPP)

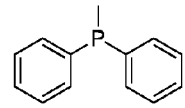
Methyldiphenylphosphine
(MDPP)

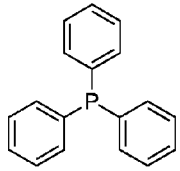
Triphenylphosphine
(TPP)

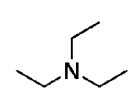
Triethylamine
(TEA)

Acids and solvents

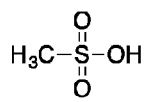
Methanesulfonic acid
(MsOH)

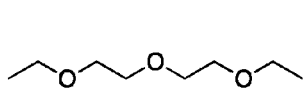
Diethyleneglycol diethylether
(DEGDE)

Fig. 7A
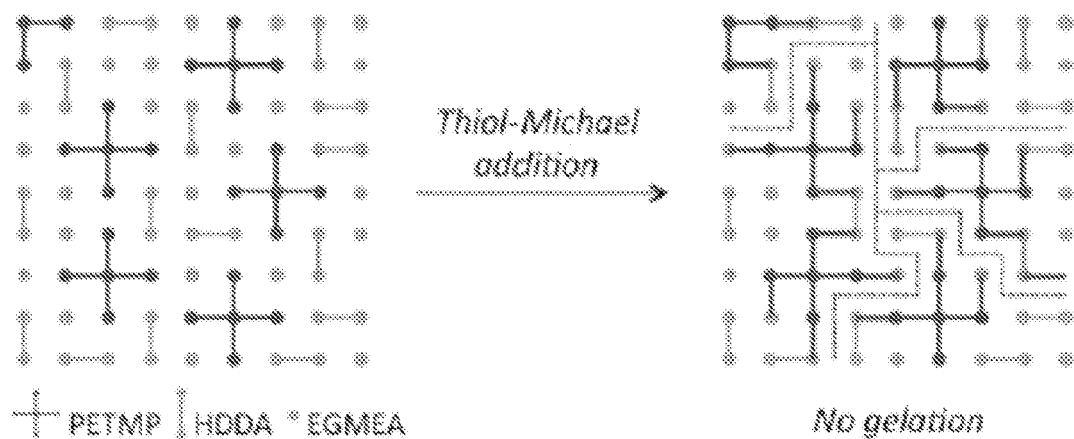
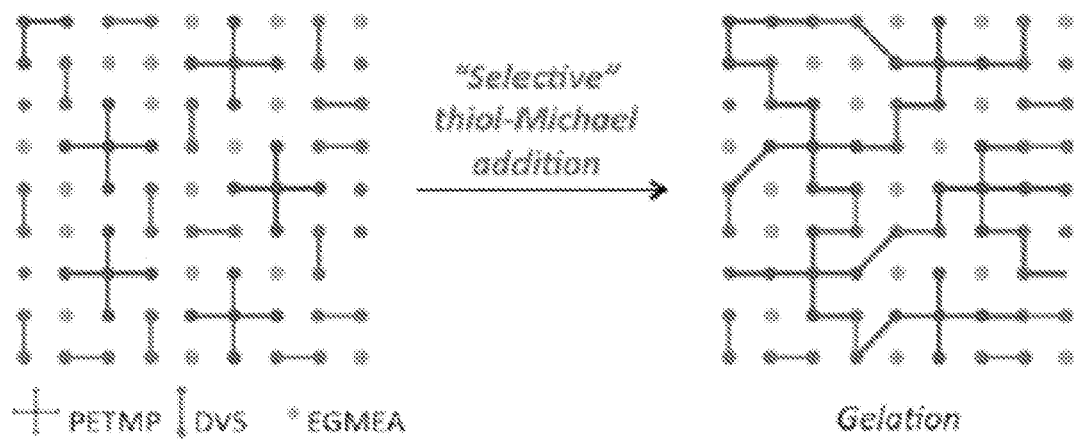
Fig. 7B

Fig. 11
| Run | [EVS] | [TMPTMP] | [Ph₃P] | [MsOH] | $t_{5\%}$ |
|---|---|---|---|---|---|
| 1 | 4.0 | 4.1 | 0.407 | 0.020 | 4.8 |
| 2 | 4.1 | 4.0 | 0.407 | 0.038 | 7.6 |
| 3 | 4.0 | 4.0 | 0.411 | 0.042 | 9.1 |
| 4 | 4.0 | 4.0 | 0.425 | 0.044 | 9.5 |
| 5 | 4.0 | 4.0 | 0.408 | 0.057 | 12.1 |
| 6 | 4.0 | 4.0 | 0.317 | 0.042 | 10.8 |
| 7 | 3.8 | 3.9 | 0.489 | 0.042 | 8.2 |
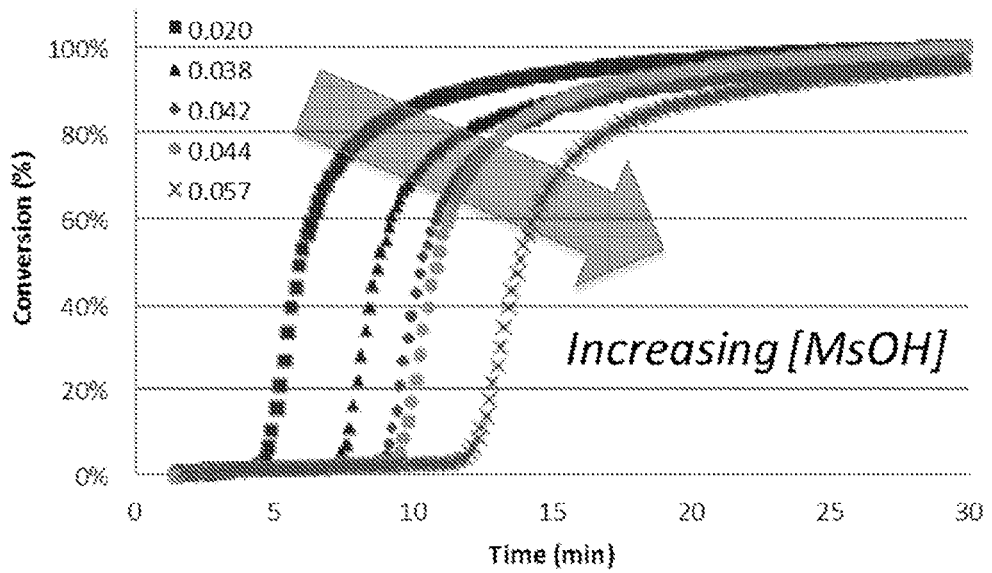
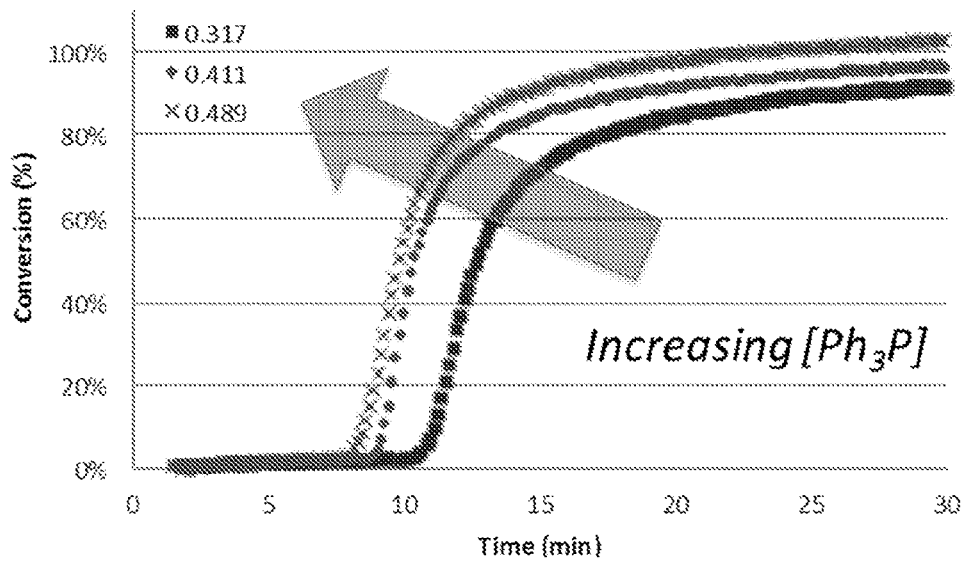

Stoichiometric EVS/DMPP mixture in DMSO-*d6*, 14 hrs
[EVS] = [DMPP] = 0.1

Fig. 14

*Kinetic constants*
*($M^{-1}min^{-1}$ for second order reaction, $min^{-1}$ for first order reaction)*

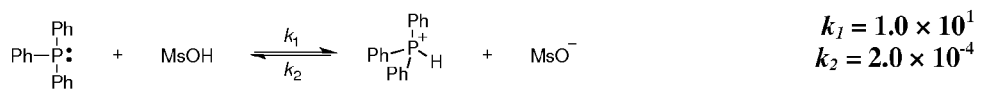

$k_1 = 1.0 \times 10^1$
$k_2 = 2.0 \times 10^{-4}$

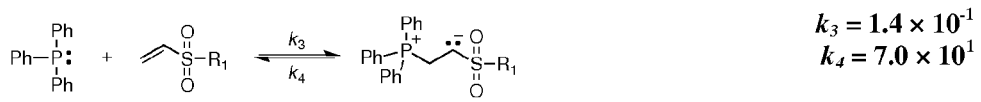

$k_3 = 1.4 \times 10^{-1}$
$k_4 = 7.0 \times 10^1$

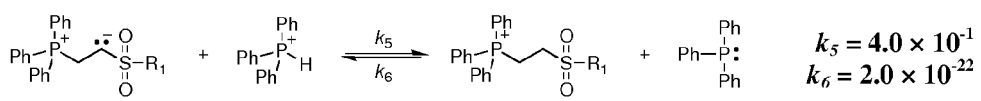

$k_5 = 4.0 \times 10^{-1}$
$k_6 = 2.0 \times 10^{-22}$

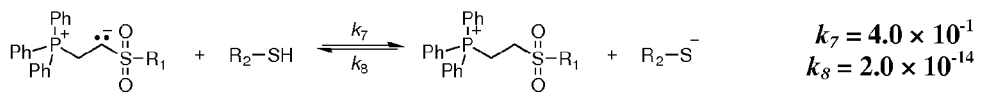

$k_7 = 4.0 \times 10^{-1}$
$k_8 = 2.0 \times 10^{-14}$

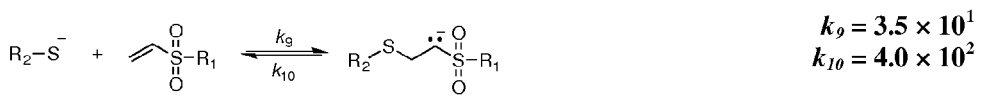

$k_9 = 3.5 \times 10^1$
$k_{10} = 4.0 \times 10^2$

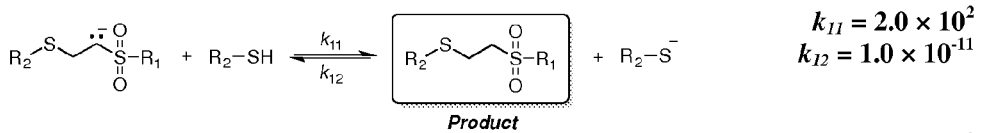

$k_{11} = 2.0 \times 10^2$
$k_{12} = 1.0 \times 10^{-11}$

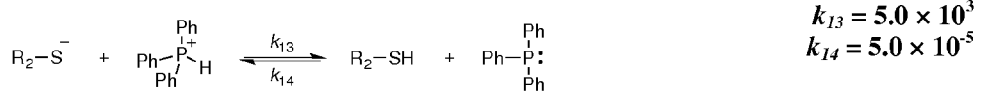

$k_{13} = 5.0 \times 10^3$
$k_{14} = 5.0 \times 10^{-5}$

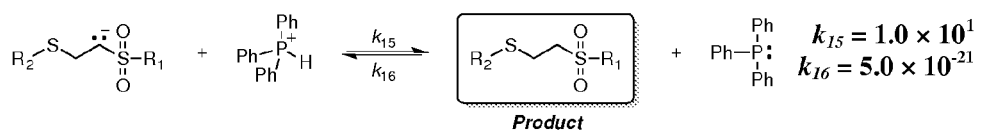

$k_{15} = 1.0 \times 10^1$
$k_{16} = 5.0 \times 10^{-21}$

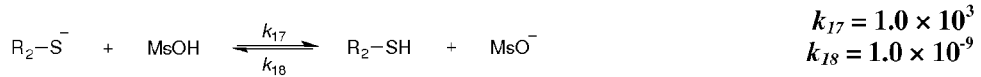

$k_{17} = 1.0 \times 10^3$
$k_{18} = 1.0 \times 10^{-9}$

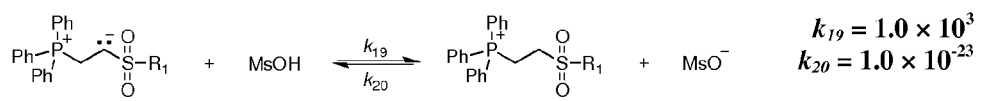

$k_{19} = 1.0 \times 10^3$
$k_{20} = 1.0 \times 10^{-23}$

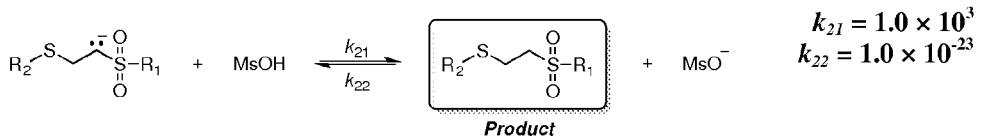

$k_{21} = 1.0 \times 10^3$
$k_{22} = 1.0 \times 10^{-23}$

Fig. 15A
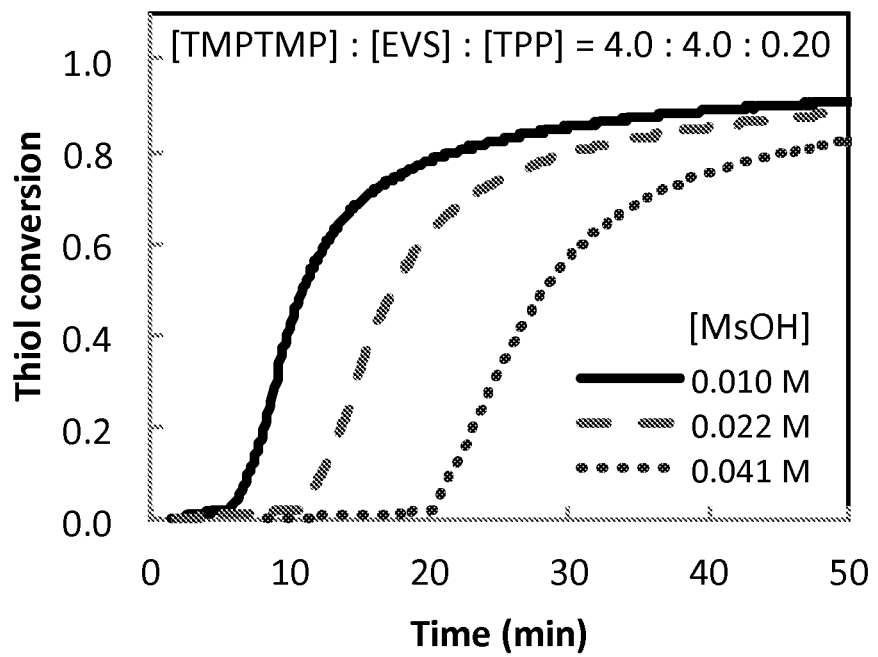
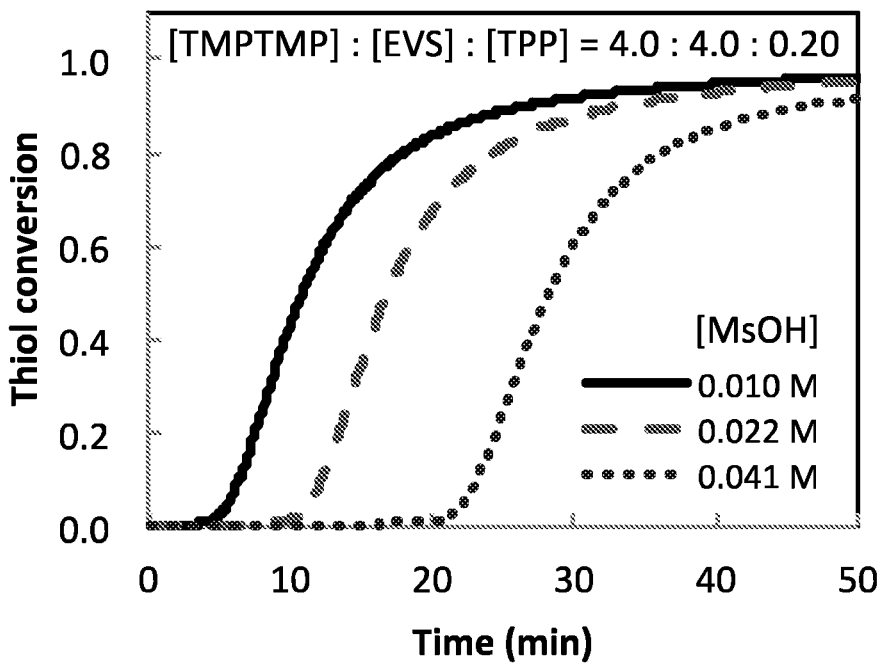

Fig. 15B
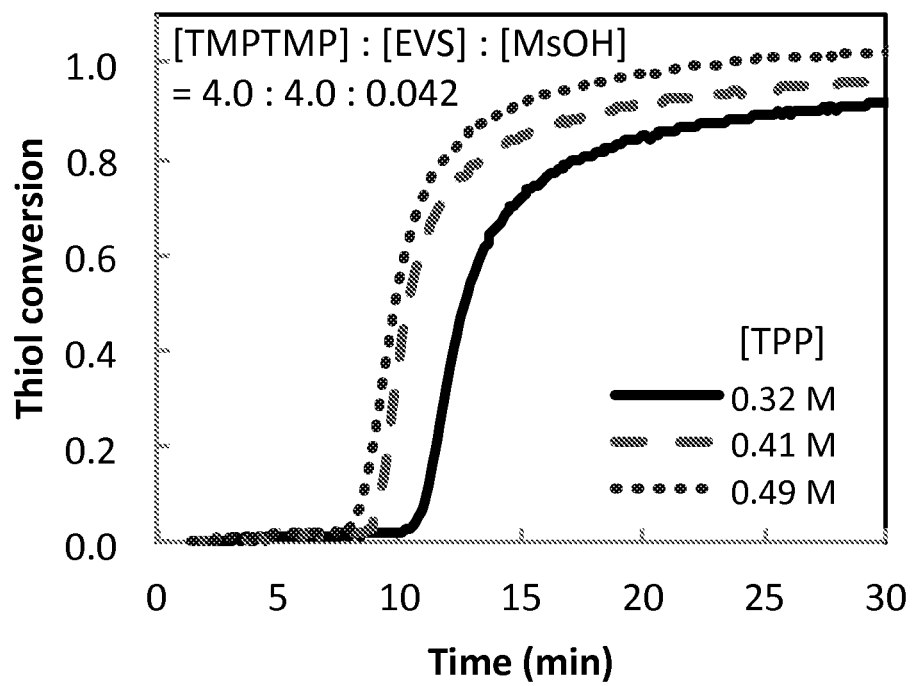
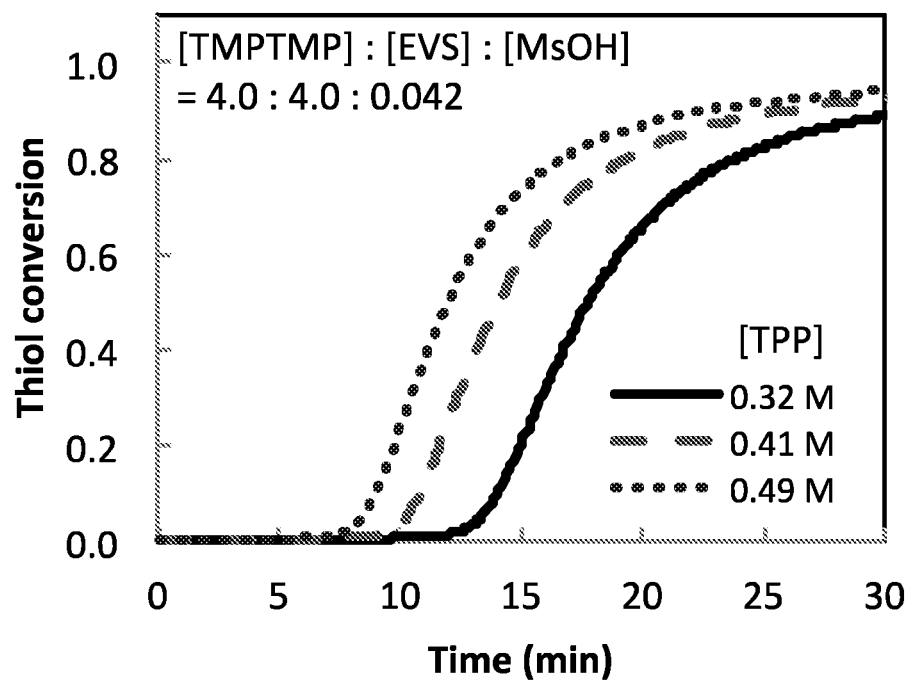

[TMPTMP] : [EVS] : [EA] : [TPP] : [MsOH] = 4.0 : 2.8 : 1.2 : 0.40 : 0.05

[TMPTMP] : [EVS] : [EA] : [TPP] : [MsOH] = 4.0 : 2.0 : 2.0 : 0.40 : 0.05

Fig. 19A
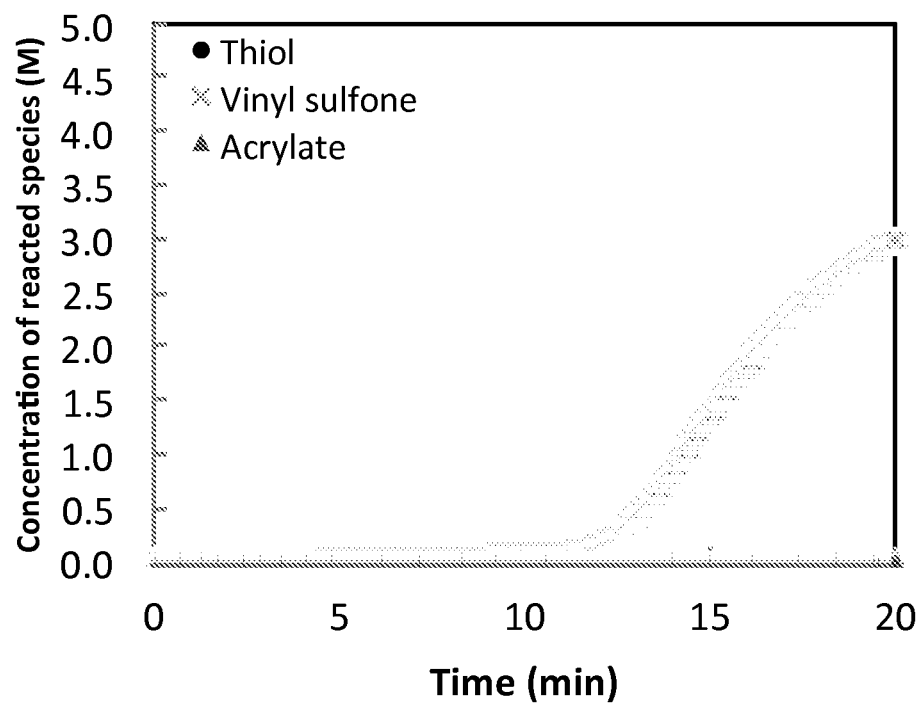
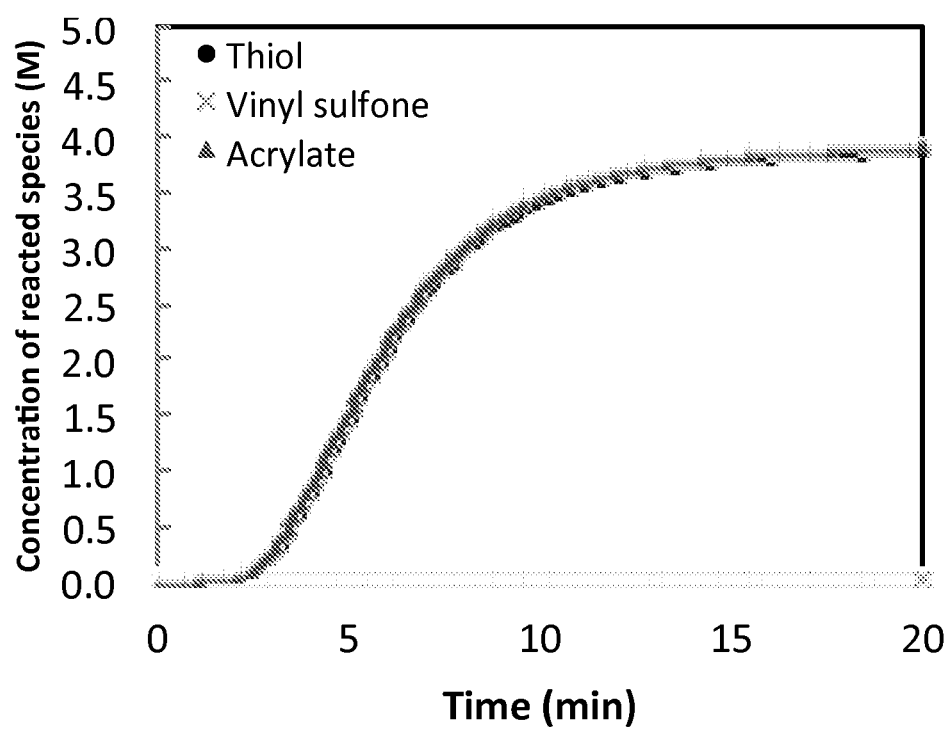

Fig. 20
| Entry | Thiol | V-SH | Alkene | f-C=C | $T_g$ (°C) | $E'_R$ (MPa) |
|---|---|---|---|---|---|---|
| 1 | PETMP | 4 | DVS | 2 | 49 | 12 |
| 2 | PETMP | 4 | TMPTA | 3 | 28 | 18 |
| 3 | TMPTMP | 3 | DVS | 2 | 28 | 8 |
| 4 | TMPTMP | 3 | TMPTA | 3 | -5 | 6 |
| 5 | PETMP | 4 | EGDA | 2 | -8 | 8 |
| 6 | PETMP | 4 | DVS-344 | 2 | 38 | 8 |
| 7 | PETMP | 4 | TVS-488 | 3 | 41 | 11 |
[1]DMA conditions: freq. 1 Hz, temp. ramp 3°C/min, specimen dimensions (4±0.2 mm)×(1±0.2 mm)×(10-12 mm)
[2]$T_g$ was assigned as the temperature at the tan delta curve maximum from DMA measurement.
[3]The rubbery modulus ($E'_R$) was measured at $T_g$ +35 °C.
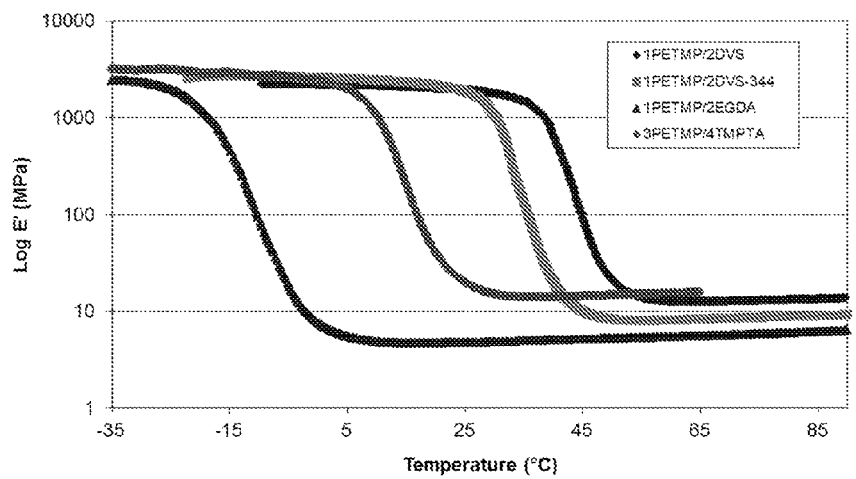
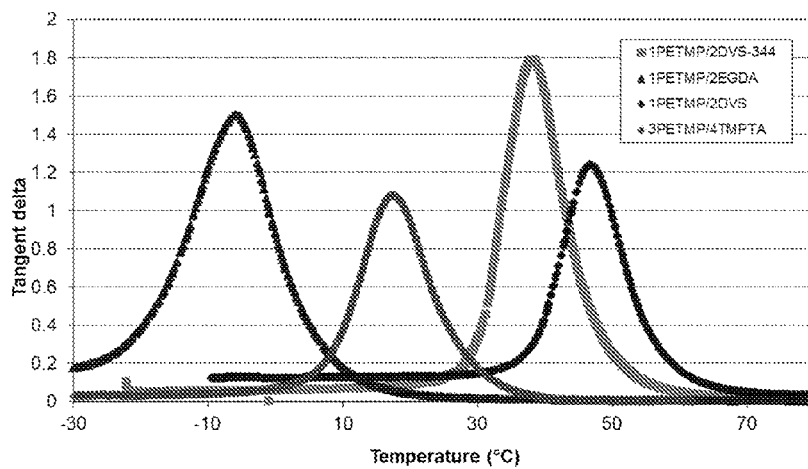

Fig. 22
Thiols
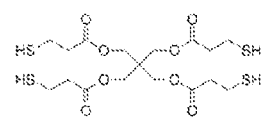
Pentaerythritol tetrakis
(3-mercaptopropionate) (PETMP)
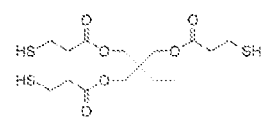
Trimethylolpropane tris
(3-mercaptopropionate) (TMPTMP)
• Alkenes
Divinyl sulfone
(DVS)
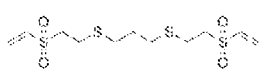
DVS-344
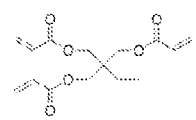
Trimethylolpropane
triacrylate (TMPTA)
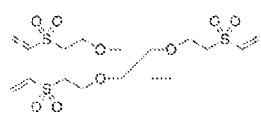
TVS-488
| Entry | Thiol | #SH | Alkene | #C=C | $T_g$ (°C) | Rubbery modulus (MPa) |
|---|---|---|---|---|---|---|
| 1 | PETMP | 4 | DVS | 2 | 49 | 12 |
| 2 | PETMP | 4 | DVS-344 | 2 | 38 | 8 |
| 3 | PETMP | 4 | TVS-488 | 3 | 40 | 11 |
| 4 | PETMP | 4 | TMPTA | 3 | 20 | 18 |
| 5 | TMPTMP | 3 | DVS | 2 | 17 | 6 |
| 6 | TMPTMP | 3 | TMPTA | 3 | -5 | 6 |

Fig. 23
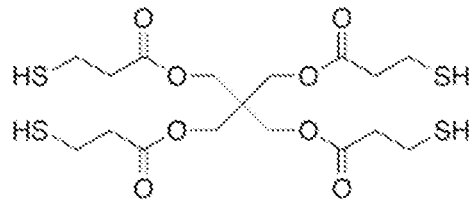
Pentaerythritol tetrakis
(3-mercaptopropionate) (PETMP)
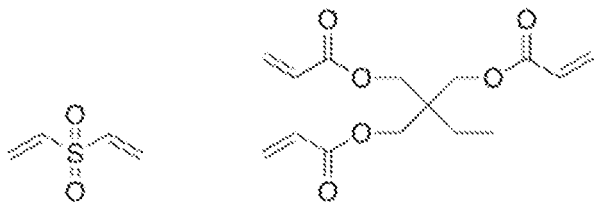
Divinyl sulfone
(DVS)
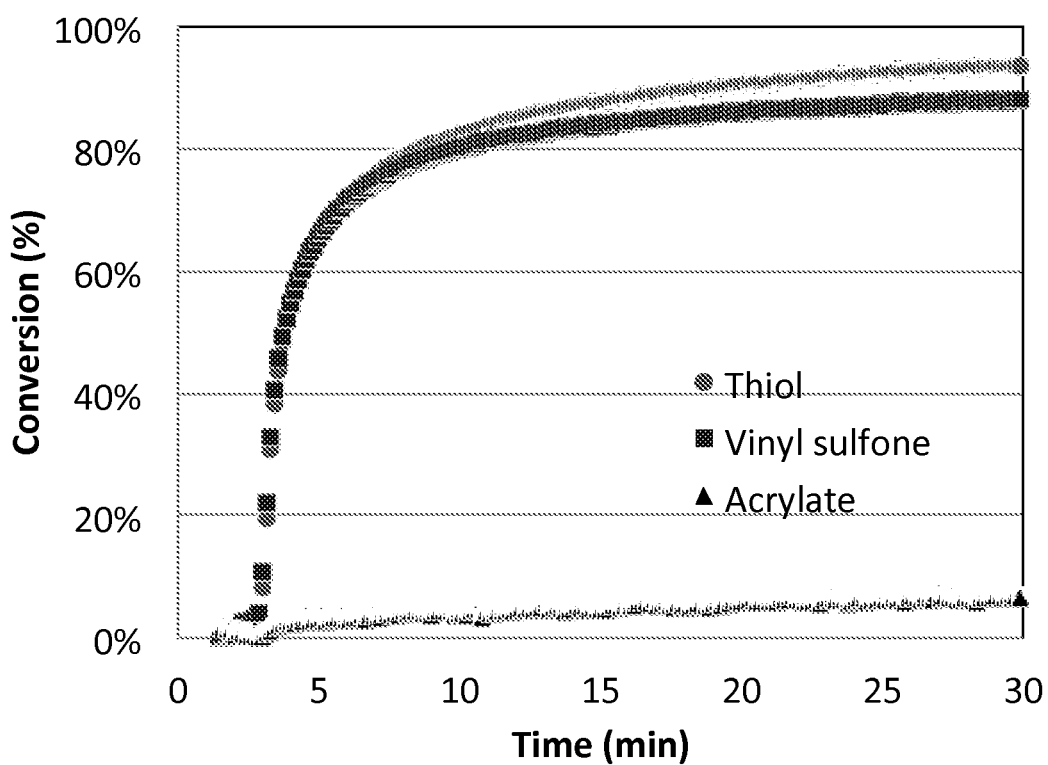

Fig. 24

| Thiol B \ Thiol A | BT (Benzenethiol, $pK_a \approx 6.5 - 8.2$) | BMA (Butyl mercaptoacetate, $pK_a \approx 8.0$) | BMP (Butyl 3-mercaptopropionate, $pK_a \approx 9.3$) | HT (1-Hexanethiol, $pK_a \approx 10.7$) |
|---|---|---|---|---|
| BT | - | 50 – 75% | 70 – 90% | 95% |
| BMA | 25 – 50% | - | 90% | 95% |
| BMP | 10 – 30% | 10% | - | 75% |
| HT | 5% | 5% | 25% | - |

Fig. 26B

| Formulation | Functional Group Molar ratio | stage 1 Tg (°C) | stage 1 Rubbery Modulus (MPa) | stage 2 Tg (°C) | stage 2 Rubbery Modulus (MPa) | Phase separation | Ref. |
|---|---|---|---|---|---|---|---|
| PETMP/DVS/TMPTA | 1.0/1.0/1.0 | 30 | 5 | 49 | 43 | Yes | 1 |
| PETMP/TMPTA | 1.0/2.0 | 2 | 9 | 67 | 81 | No | |
| PETMP/DVS/TCDDA | 1.0/1.0/0.66 | 32 | 5 | 47 | 45 | Yes | 1 |
| PETMP/TCDDA | 1.0/2.0 | 6 | 2 | 46 | 23 | No | |
| PETMP/DVS/Ebecryl 1290 | 1.0/1.0/1.0 | 17 | 0.4 | 78 | 155 | Yes | |
| PETMP/TCDDA/Ebecryl 1290 | 1.0/0.9/1.5 | 30 | 20 | 82 | 77 | No | 2 |

(1) D.P. Nair et al., Adv. Funct. Mater. 2012, 1502-1510; (2) D.P. Nair et al. Polymer 2012, 2429-2434.

Fig. 28A
4.0 : 4.0 : 0.0 : 0.4 : 0.05
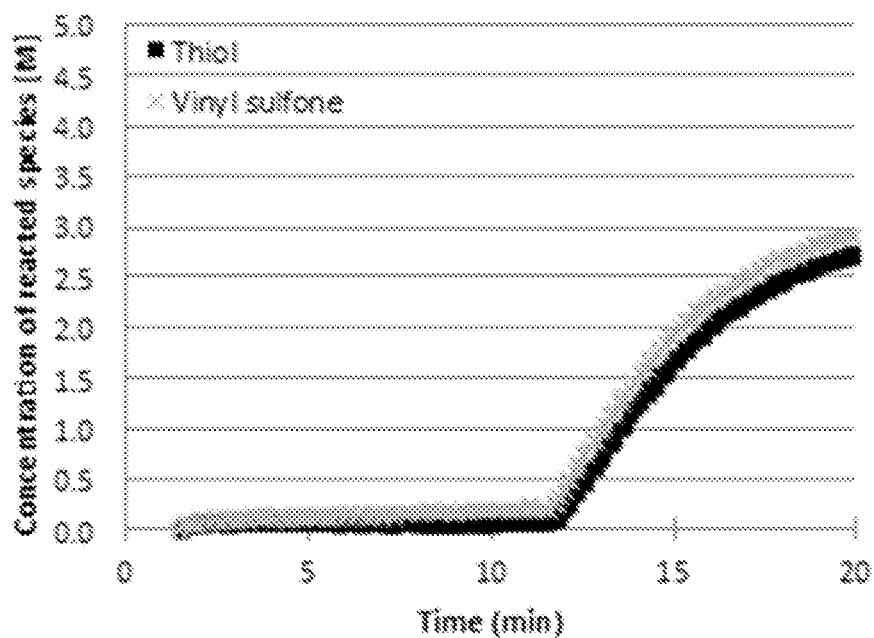
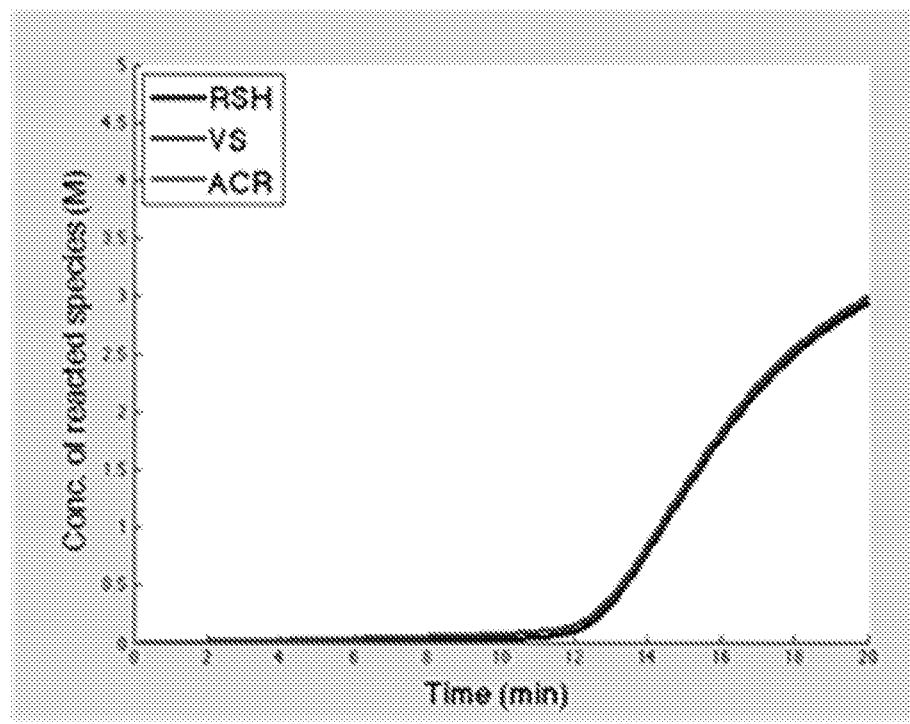

Fig. 28B
4.0 : 2.8 : 1.2 : 0.4 : 0.05
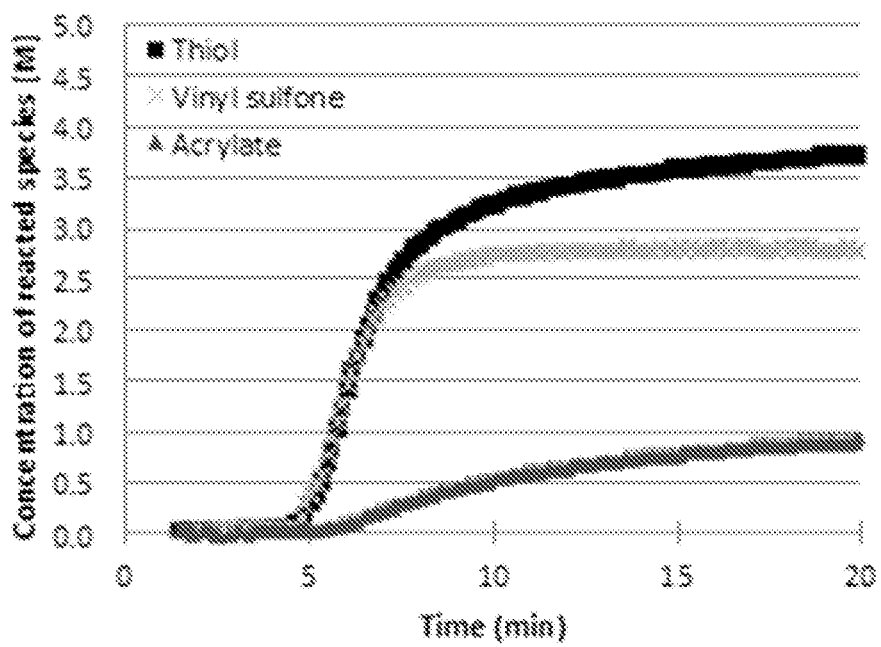
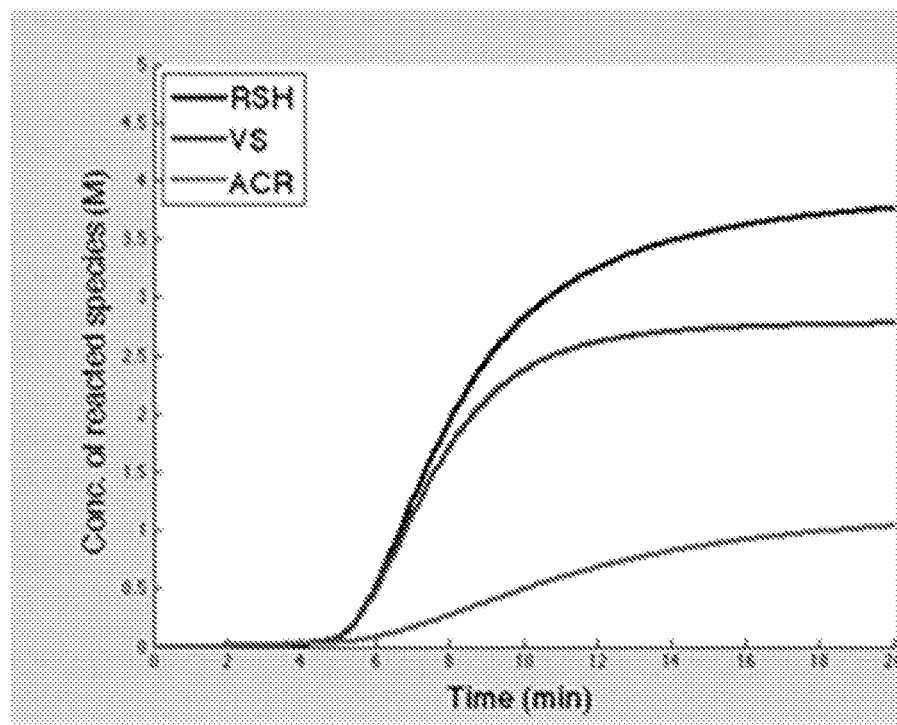

Fig. 28C
4.0 : 1.2 : 2.8 : 0.4 : 0.05
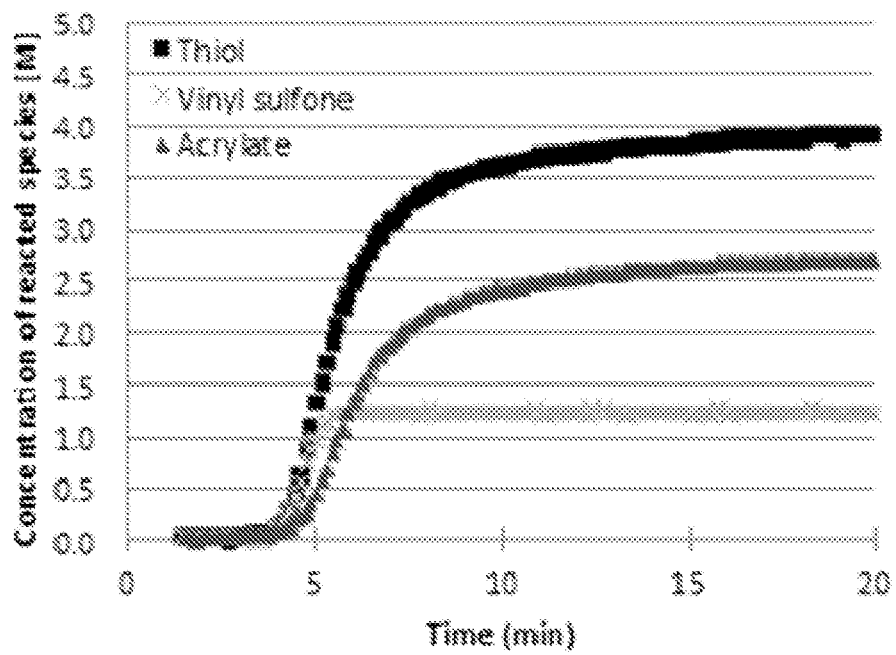
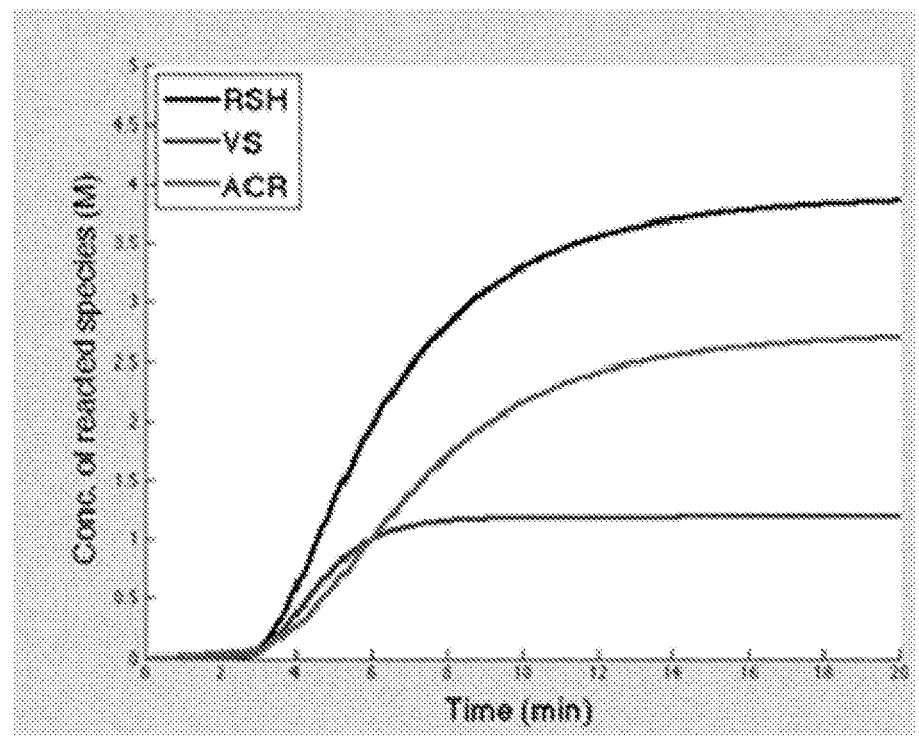

Fig. 28D
4.0 : 0.0 : 4.0 : 0.4 : 0.05
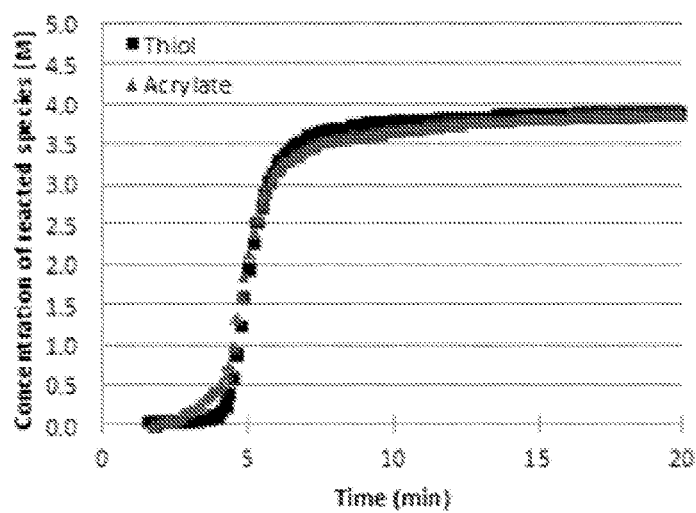
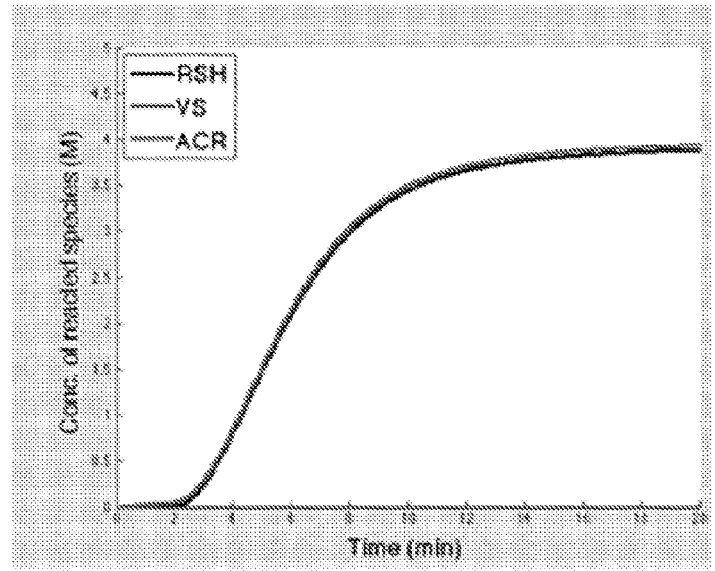
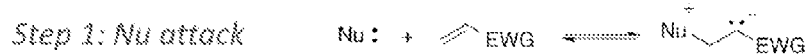
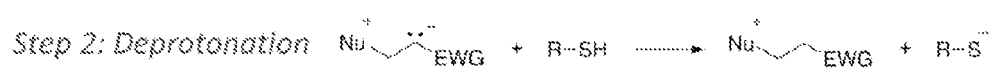

[TMPTMP] : [EVS] : [TPP] = 4.0 : 4.0 : 0.40

[TMPTMP] : [EVS] : [MsOH] = 4.0 : 4.0 : 0.042

Fig. 34A
[TMPTMP] : [EA] : 4.0 : 4.0
[TPP] : [MsOH]
0.395 : 0.050          0.390 : 0.105
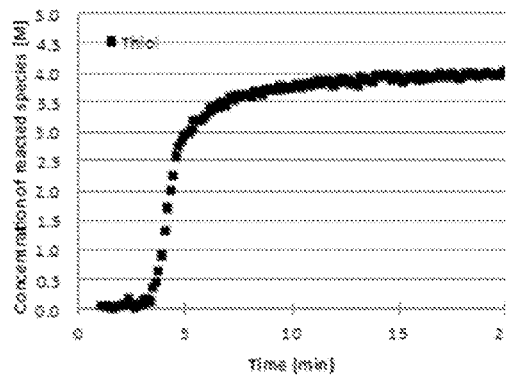
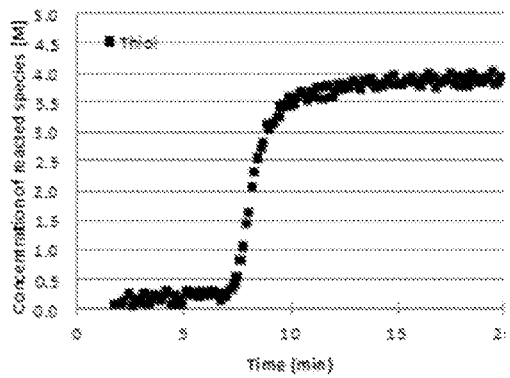
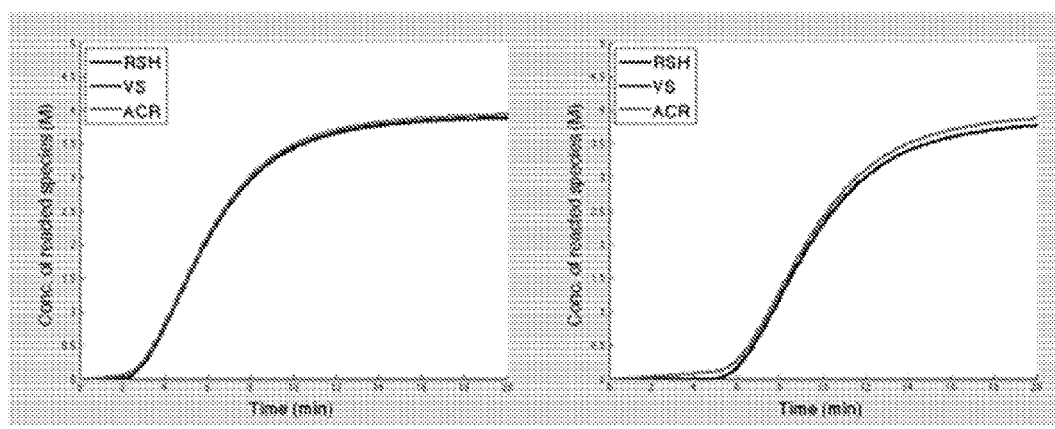

Fig. 34B
[TPP] : [MsOH]
0.393 : 0.199
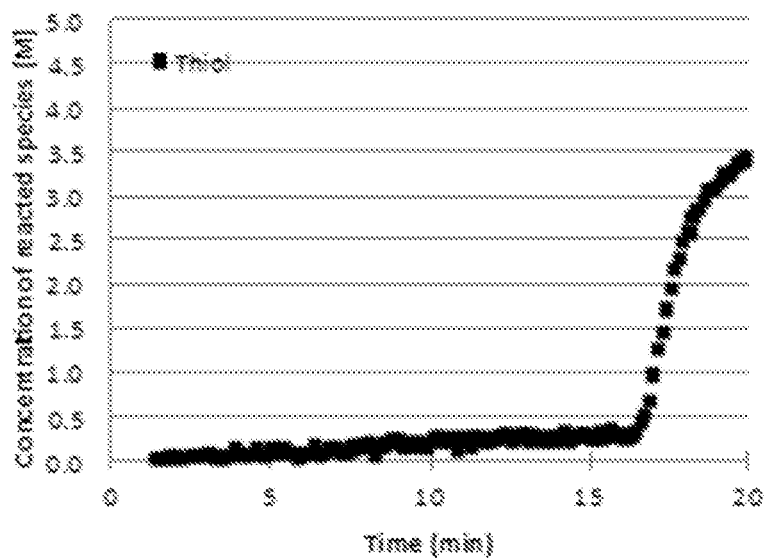
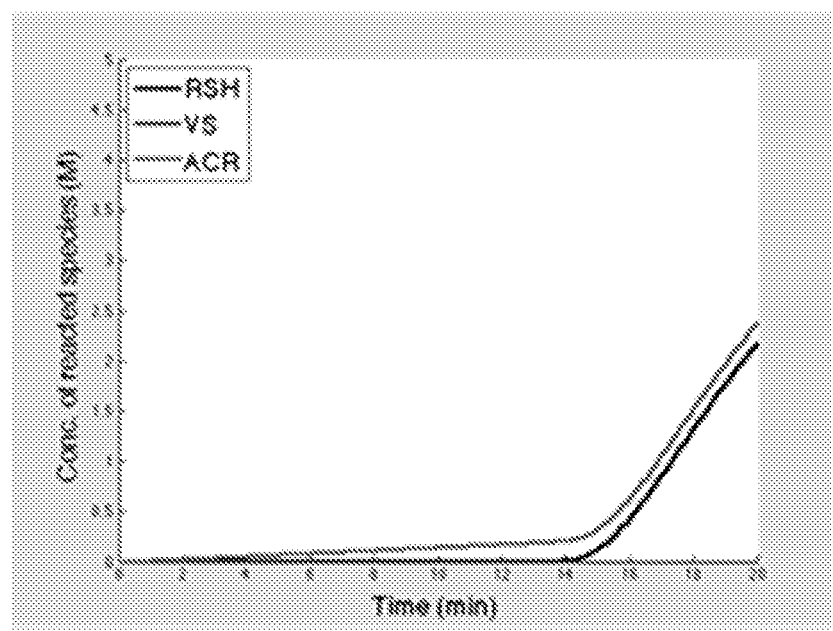

Fig. 35A
[TMPTMP] : [EVS] : [TPP] = 4.0 : 4.0 : 0.40
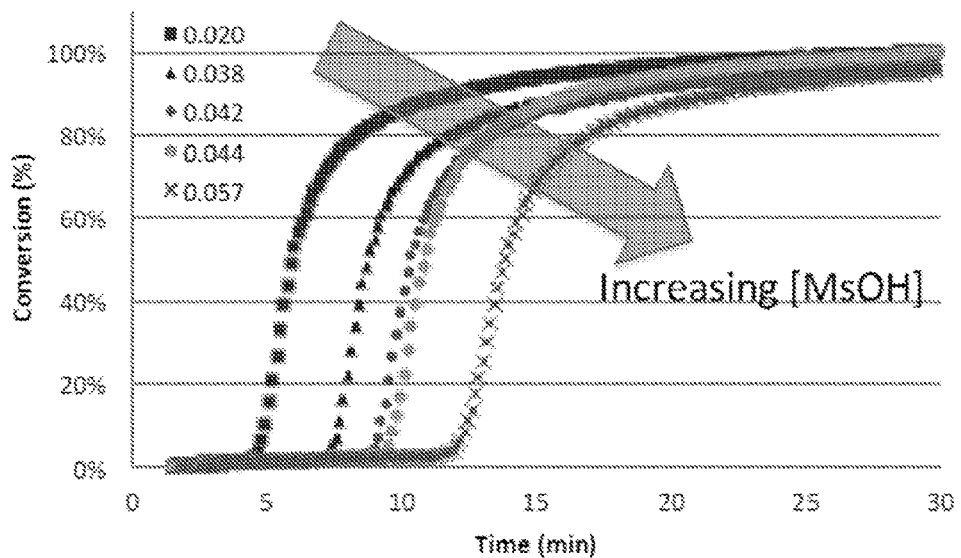
[MsOH]
0.020
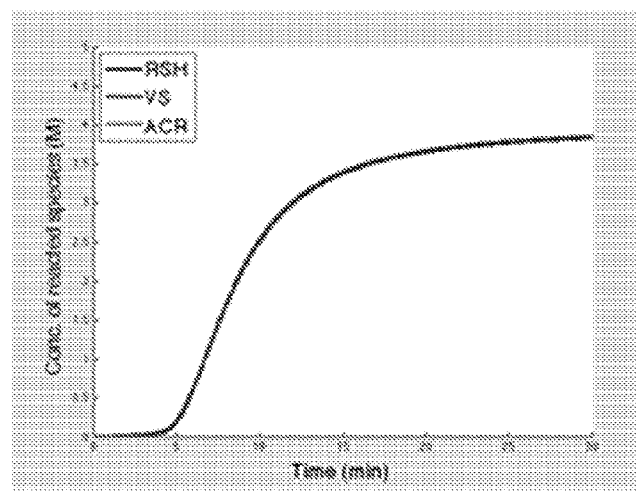

Fig. 35B
[MsOH]
0.038          0.042
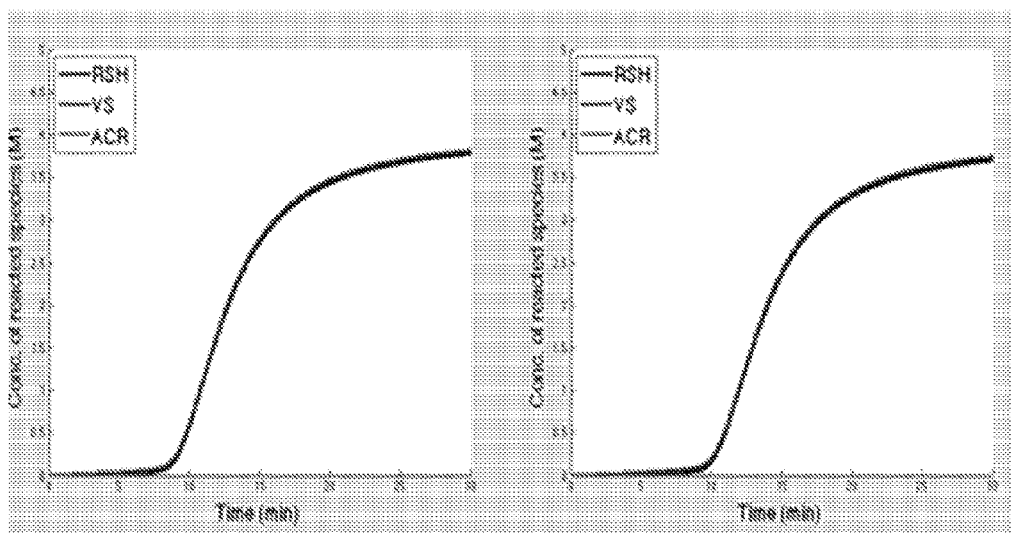
0.044          0.057
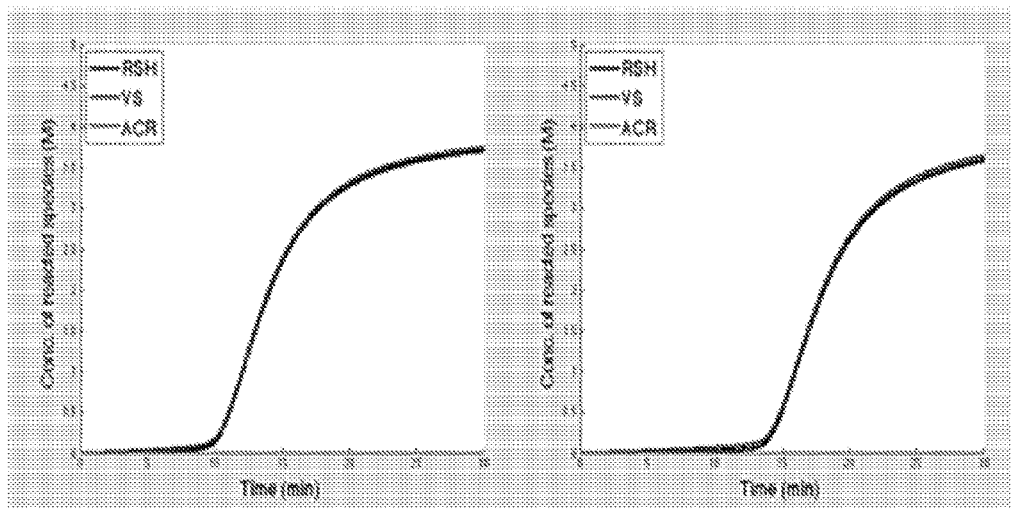

Fig. 36A
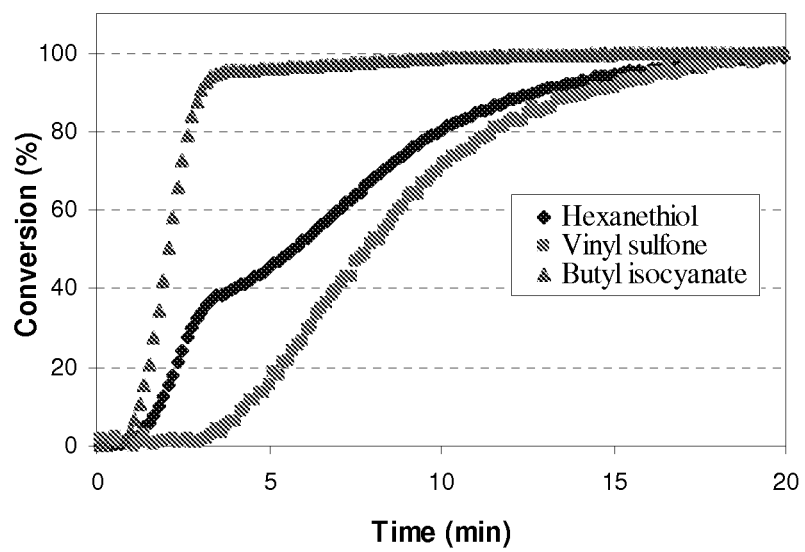
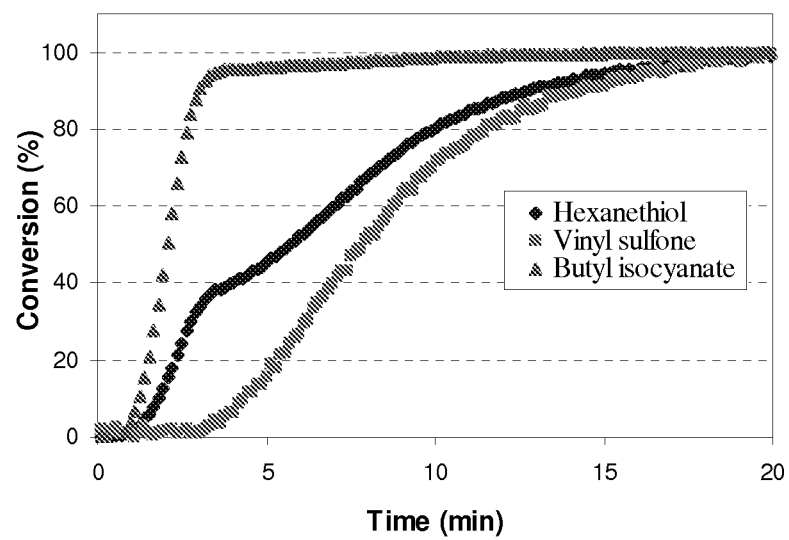

Fig. 36B
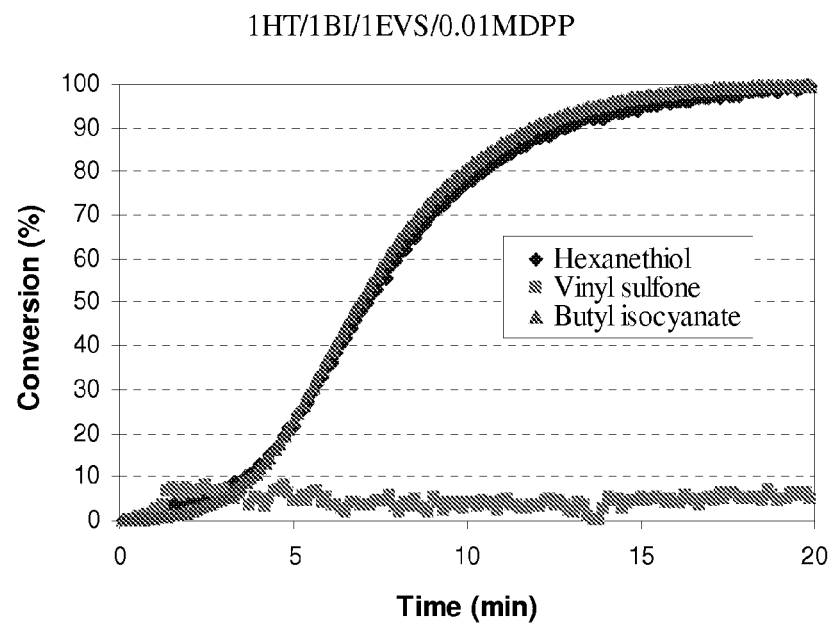
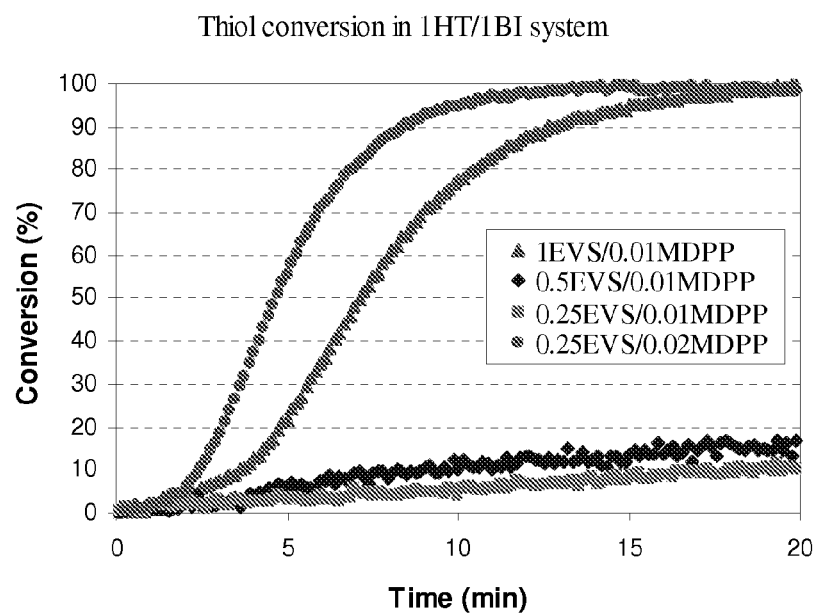
(1) $R_{NCO} = 5.4 \times 10^{-3}$ M×s$^{-1}$   $R_{SH1} = 5.1 \times 1010^{-3}$ M×s$^{-1}$
(2) $R_{NCO} = 6.2 \times 10^{-3}$ M×s$^{-1}$   $R_{SH} = 5.4 \times 10^{-3}$ M×s$^{-1}$
(3) $R_{NCO} = 2.4 \times 10^{-3}$ M×s$^{-1}$   $R_{SH} = 2.1 \times 10^{-3}$ M×s$^{-1}$

Fig. 37
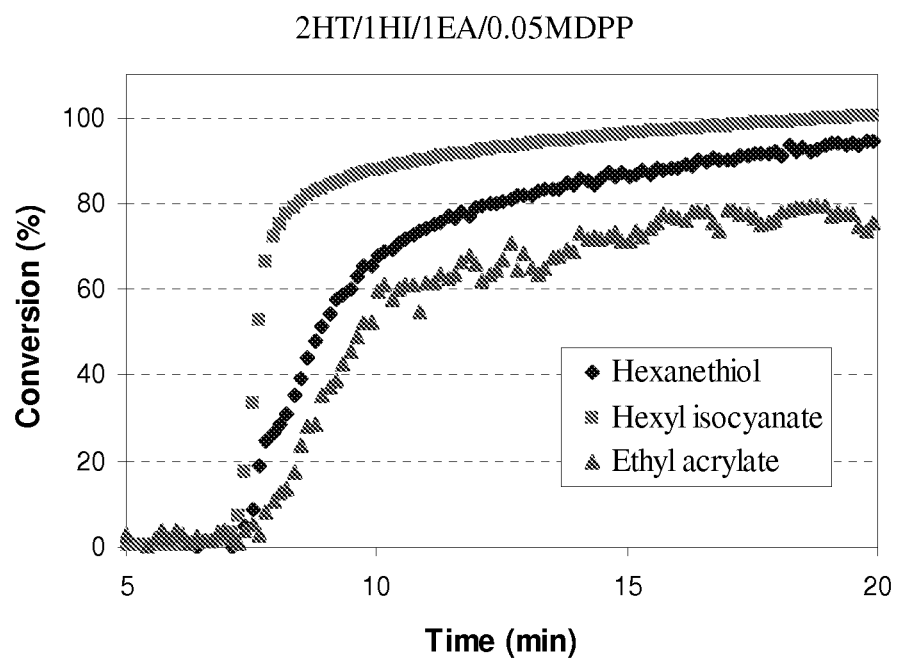
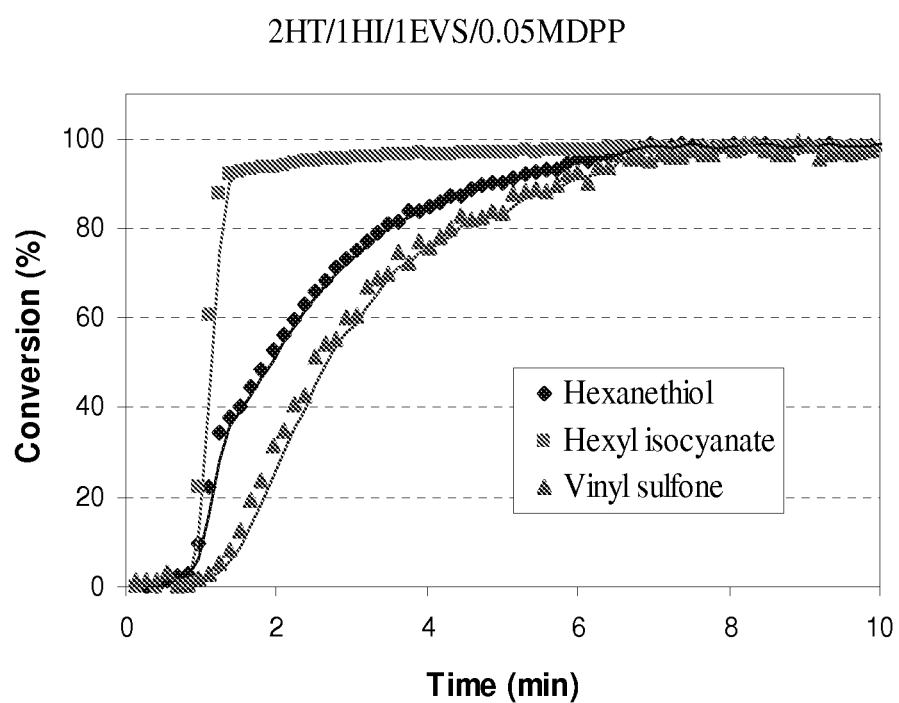

Fig. 38
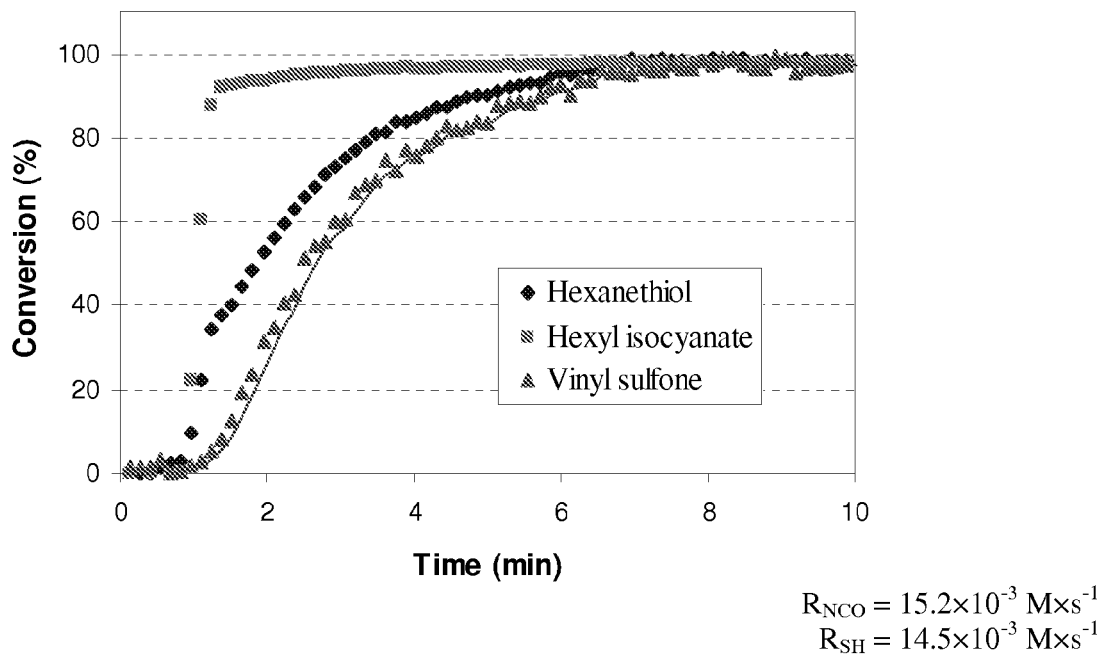
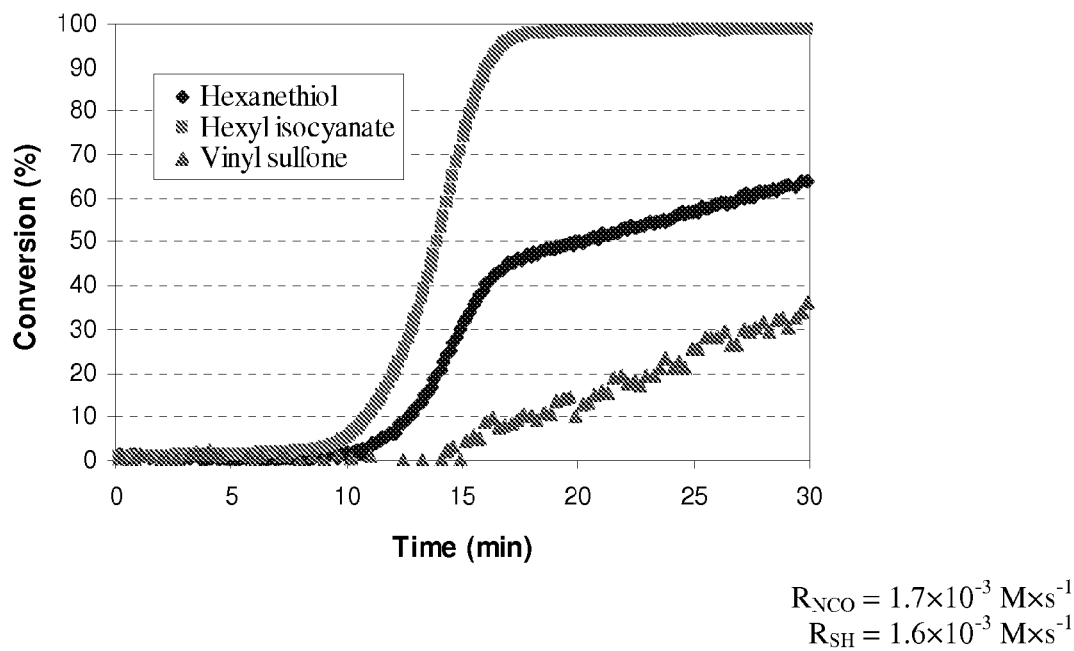

Fig. 39
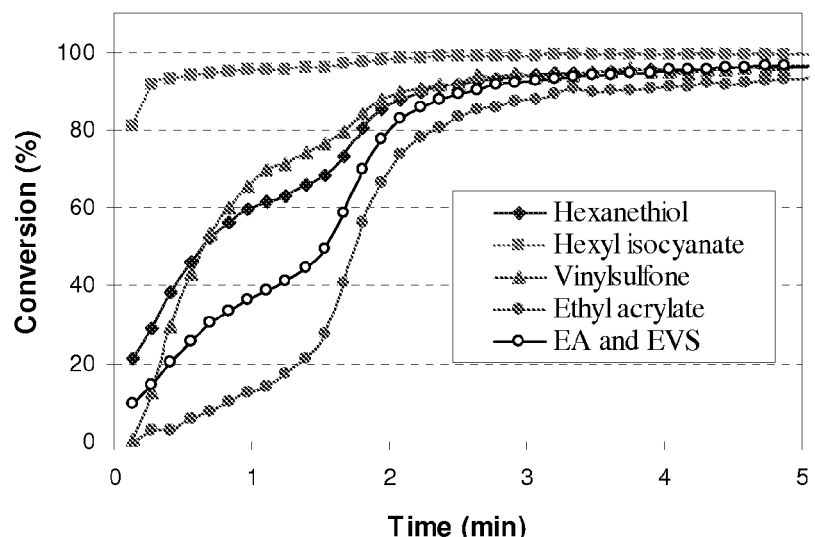
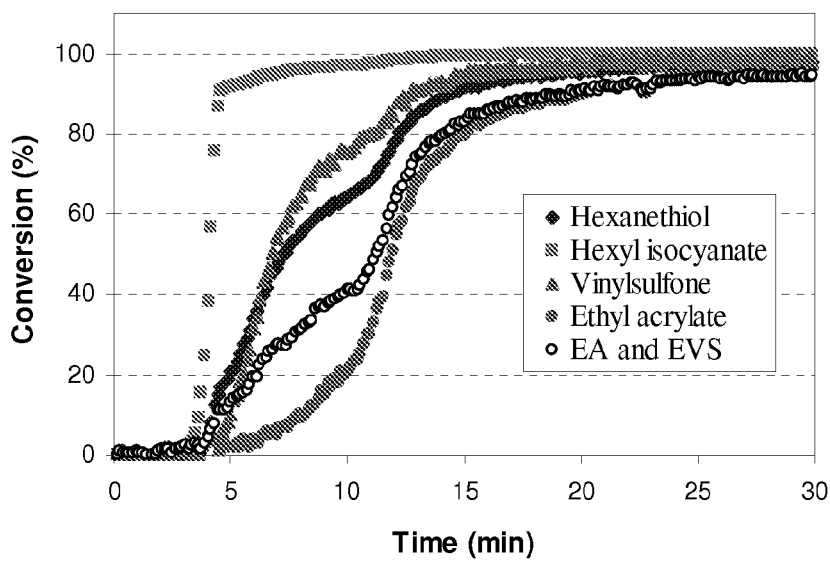
Max. reaction rates for system with 0.02M of MDPP:
$R_{SH-NCO} = 9.9 \times 10^{-3}$ M×s$^{-1}$
$R_{SH-EVS} = 7.4 \times 10^{-3}$ M×s$^{-1}$
$R_{SH-EA} = 5.2 \times 10^{-3}$ M×s$^{-1}$

Fig. 41
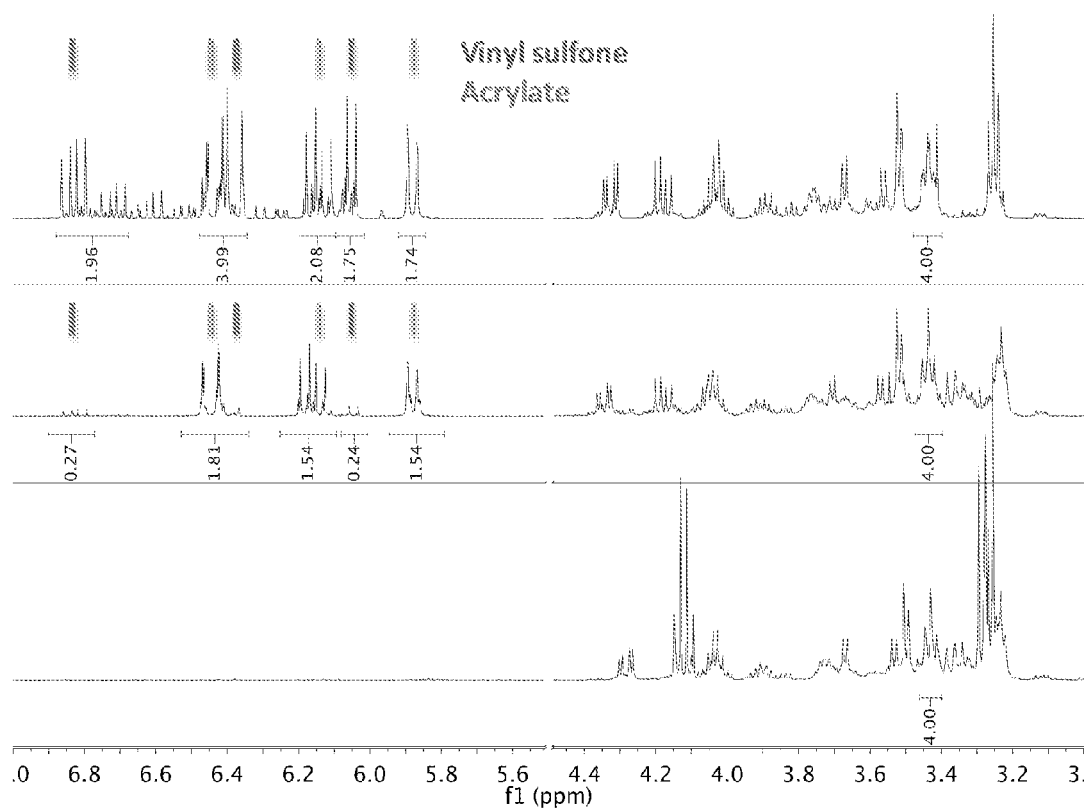
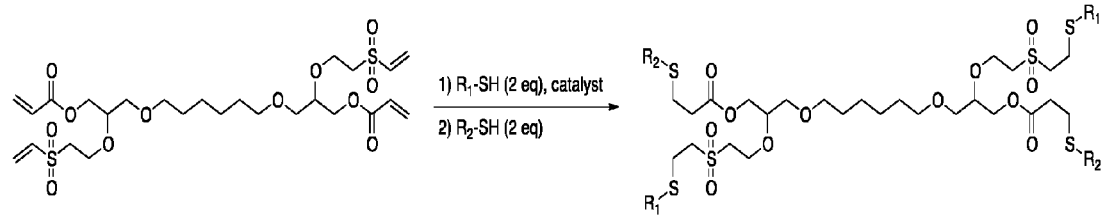

Fig. 42A
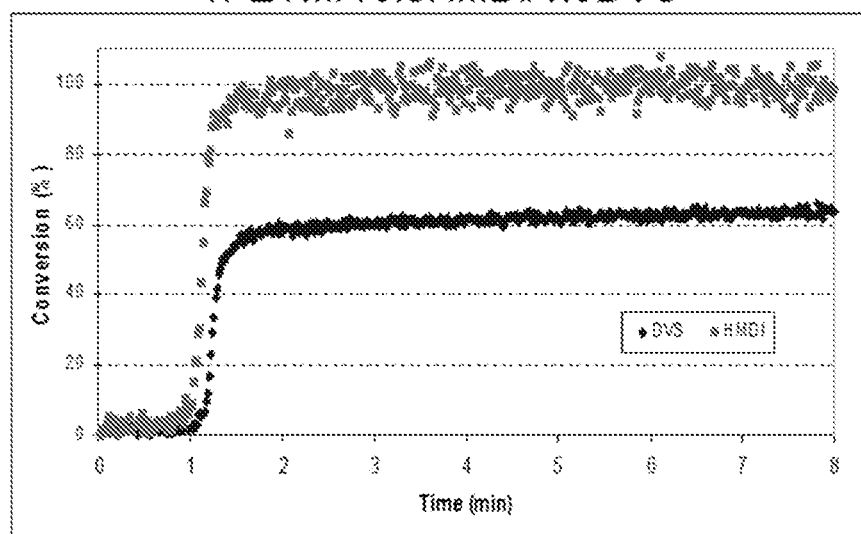
Overall conversion: 73% Induction time 1 min
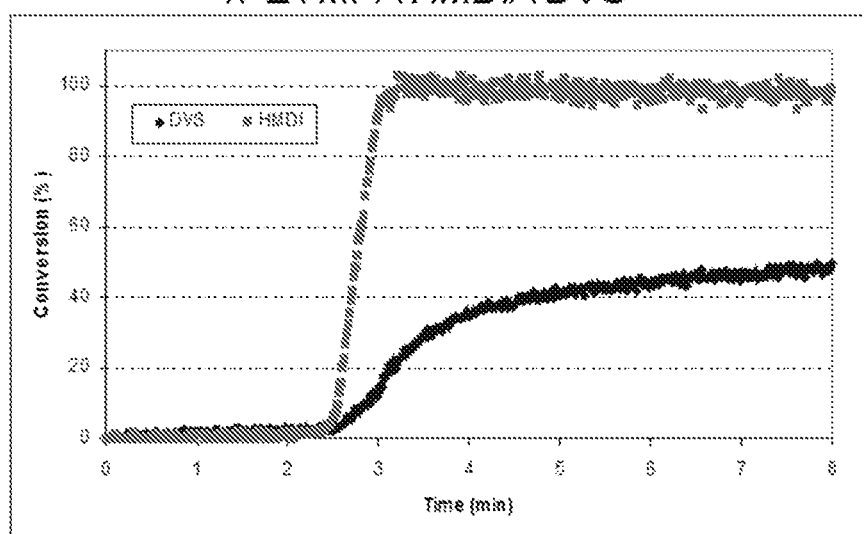
Overall conversion: 74%; Induction time 2.5 min
Fig. 42B Overall conversion: 76% Induction time 8 min

Fig. 43
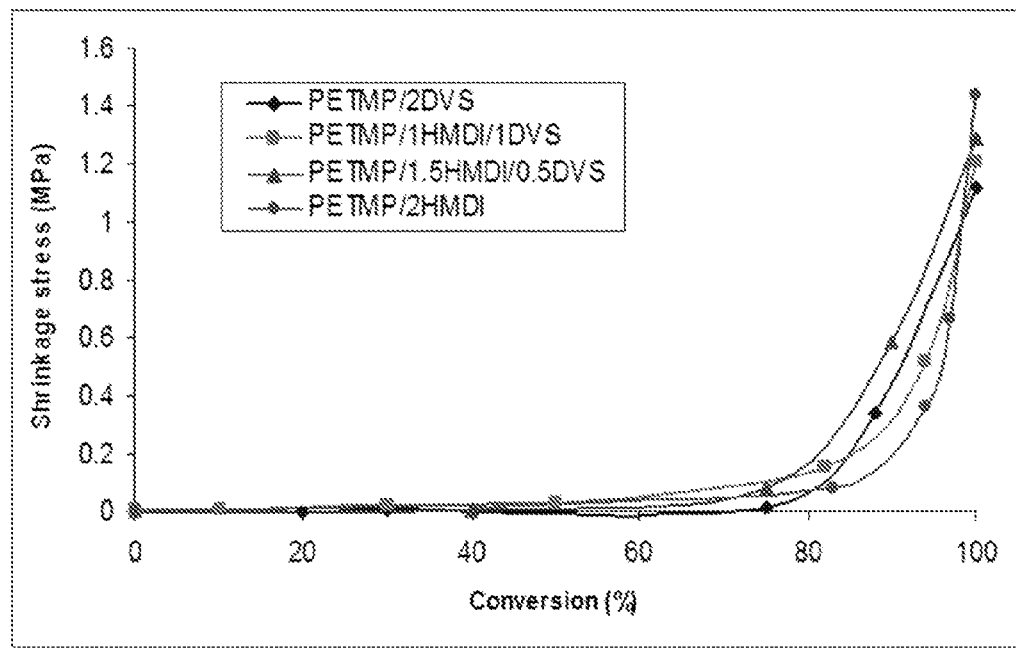
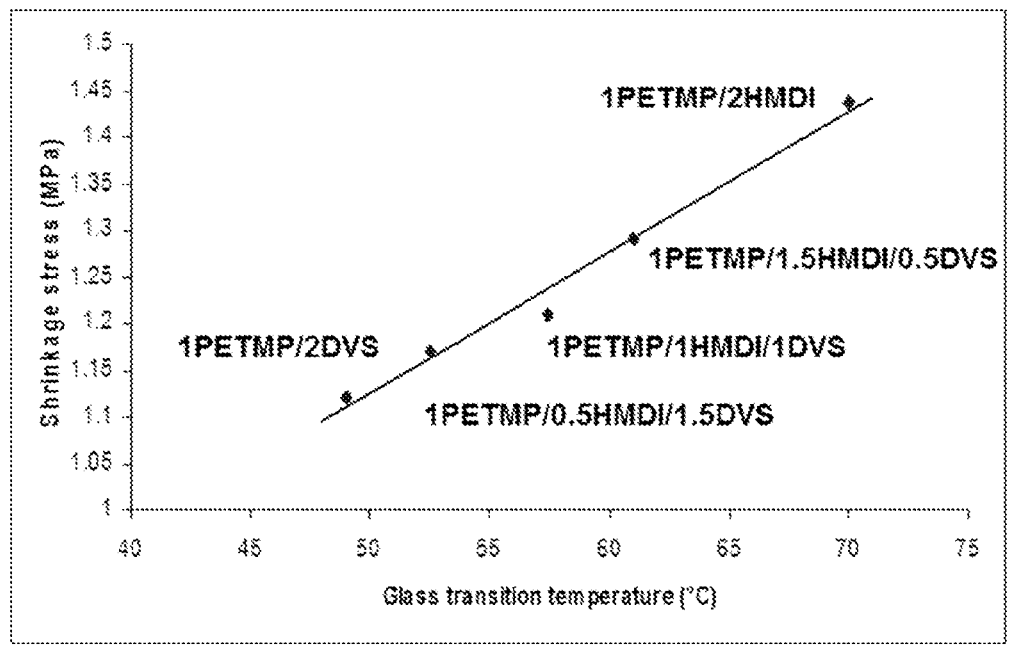

Fig. 45A
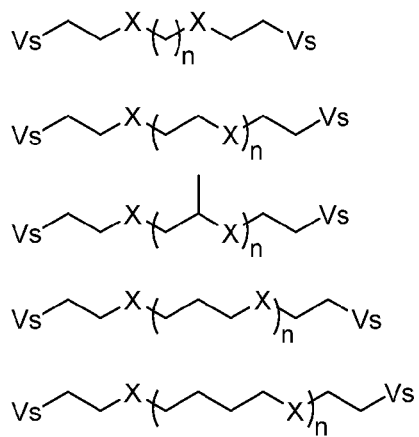
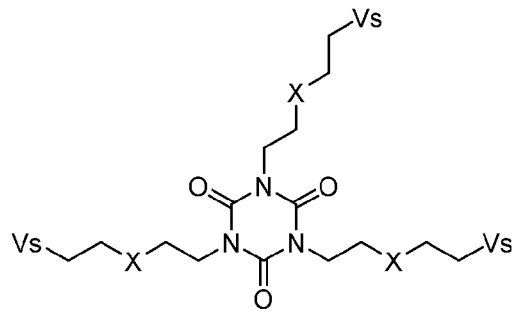
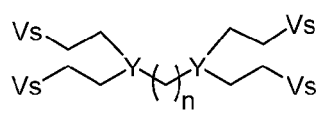
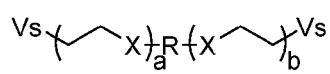
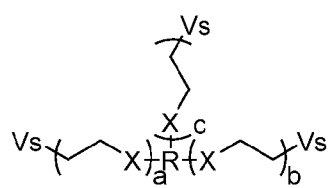
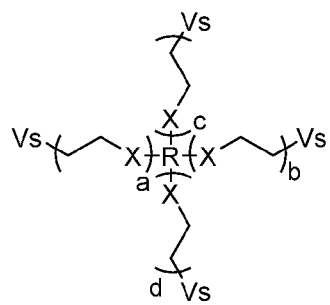
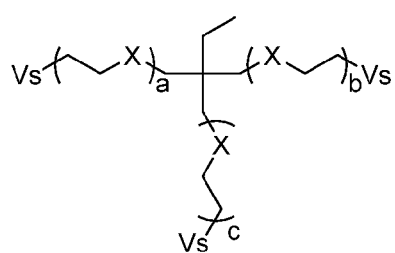
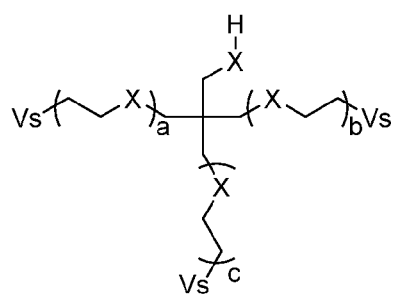

wherein:  X is O or S;
  Y is N;
  Vs is SO$_2$CH=CH$_2$;
  n, a, b, c and d are independently an integer ranging from 1 to 12; and
  R = alkyl, cycloalkyl, phenyl, biphenyl, -PhC(CH$_3$)$_2$Ph- or tricyclodecane.

THIOL-CONTAINING DUAL CURE POLYMERS AND METHODS USING SAME

CROSS-REFERENCE TO RELATED APPLICATIONS

The present application claims priority under 35 U.S.C. §119(e) to U.S. Provisional Application No. 61/858,859, filed Jul. 26, 2013, which application is hereby incorporated by reference in its entirety herein.

STATEMENT REGARDING FEDERALLY SPONSORED RESEARCH OR DEVELOPMENT

This invention was made with government support under grant number BET0626023 awarded by the National Science Foundation, and grant numbers HL072738 and HL051506 awarded by the National Institutes of Health. The government has certain rights in the invention.

BACKGROUND OF THE INVENTION

Nucleophilic reactions of thiols to several functional groups such as electron deficient vinyls (i.e., thiol-Michael addition reaction), isocyanates and epoxides are known to proceed extremely efficiently under mild conditions, with no by-products at room temperature, minimal amounts of catalysts like a base, high functional group tolerance and high conversions, and thus widely considered as "click" reaction (Hoyle et al., 2010, Chem. Soc. Rev. 39:1355-1387; Hoyle & Bowman, 2010, Angew. Chem. Int. Ed. 49:1540-1573; Lowe, 2010, Polym. Chem. 1:17-36). The thiol-X reaction family has been used in organic synthesis, polymer formation, and materials modification in recent decades (Hoyle et al., 2004, J. Polym. Sci., Part A: Polym. Chem. 42:5301-5338; Hoyle et al., 2010, Chem. Soc. Rev. 39:1355-1387; Hoyle & Bowman, 2010, Angew. Chem., Int. Ed. 49:1540-1573; Lowe, 2010, Polym. Chem. 1:17-36) Given that the versatile thiol-click chemistry can be used to synthesize highly functional materials under relatively facile reaction conditions, various thiol-vinyl reaction qualify as highly efficient click reactions as used in applications that range from complex dendrimer synthesis (Killops et al., 2008, J. Am. Chem. Soc. 130:5062-50645), convergent synthesis of star polymers (Chan et al., 2008, Chem. Commun. 40:4959-4961), functional biodegradable lactides (Nuttelman et al., 2008, Prog. Polym. Sci. 33:167-179) to surface modifications of films (Khire et al., 2007, Macromolecules 40:5669-5677) and nanoparticles (Khire et al., 2008, J. Polym. Sci., Part A: Polym. Chem. 46:6896-69069).

Polymers formed via the thiol-vinyl step-growth reaction mechanism exhibit distinct characteristics such as uniform network densities that afford narrow glass transition temperatures and low shrinkage stress that results from delayed gelation of the polymer when compared to polymers formed via a chain-growth mechanism. These key attributes of the polymerization mechanism result in the ability to produce materials that have unique physical and mechanical properties via thiol-vinyl chemistry. One of the most powerful aspects of the thiol-vinyl reaction family is that it can be mediated by various species such as radicals (i.e., the classical thiol-ene reaction), acids, bases, nucleophiles and highly polar solvents. Each of these reaction pathways exhibits some or all of the characteristic advantages of the thiol-vinyl reaction.

A base or nucleophile mediated thiol reaction, often referred to as the thiol-Michael addition reaction, has attracted great interest for its high reactivity with relatively low amount of catalysts and its orthogonality to radical mediated reactions. Chan et al. took advantage of this orthogonality and have utilized sequential thiol-Michael addition reactions and radical thiol-yne reactions to develop a facile synthetic method of constructing polyfunctional materials (Chan et al. 2009, J. Am. Chem. Soc. 131:5751-5753). Yu et al. described polymer end-group functionalization via a combination of nucleophilic thiol-vinyl/radical thiol-ene and nucleophilic thiol-vinyl/radical thiol-yne pathways (Yu et al., 2009, Polymer 47:3544-3557).

Nair et al. have utilized the self-limiting character of the thiol-Michael addition reaction with excess vinyls to realize a crosslinked material that is further reactive to radical polymerizations to attain two-stage reactive polymers with distinct material properties at each stage (Nair et al., 2012, Polymer 53:2429-2434; Nair et al., 2012, Adv. Funct. Mater. 22:1502-1510). Among several catalysts that are used for the thiol-Michael addition reaction, nucleophiles such as organophosphines (Chan et al., 2010, Macromolecules 43:6381-6388) and nucleophilic tertiary amines (Xi et al., 2012, ACS Macro Lett. 1:811-814) are known to be efficient catalysts for the thiol-Michael addition reaction.

Due to its high reactivity, nucleophilic thiol-Michael addition reactions are used for modification of multifunctional thiols with acrylates (Shin et al., 2009, Macromolecules 42:6549-6557), end functionalization of macromolecules (Soeriyadi et al., 2011, Polym. Chem. 2:815-822; Li et al., 2010, Polym. Chem. 1:1196-1204), and synthesis of linear (Shin et al., 2009, Macromolecules 42:3294-3301) and multi arm star polymers (Chan et al., 2008, Chem. Commun. 40:4959-4961).

However, the understanding of the nucleophilic thiol-Michael addition reaction pathway is still incomplete as seen by the inability to consistently control the reaction (Chan et al., 2010, Macromolecules 43:6381-6388) and the formation of undesirable by-products (Li et al., 2010, Polym. Chem. 1:1196-1204), which are definitely not the characteristics of click reactions. Understanding the mechanism of the rapid and powerful nucleophilic pathway enables the selection of conditions under which the reaction behaves in a click manner, as is critical for practical application of the nucleophilic thiol-Michael addition reaction in polymer science, surface modification, and organic synthesis.

An activated vinyl, also referred to as an electron deficient vinyl, is suitable for thiol-Michael addition reactions since it accelerates the nucleophilic attack of a thiolate anion on a vinyl (Mather et al., 2006, Prog. Polym. Sci. 31:487-531). Carbonyl conjugated vinyls, such as acrylates and maleimides are well known as activated vinyls for Michael addition. Vinyl sulfone, a sulfone conjugated vinyl, is a functional group that has a highly electron deficient vinyl and has been used extensively as a textile dye since the 1950's (U.S. Pat. No. 2,657,205). The vinyl sulfone group is highly reactive towards the hydroxyl groups of the cellulose present in textile fibers under alkaline conditions. Additionally, the thiol-Michael addition product of vinyl sulfone forms a very stable thioether sulfone bond (Mather et al., 2006, Prog. Polym. Sci. 31:487-531; Morales-Sanfrutos et al., 2010, Org. Biomol. Chem. 8:667-675), while the counterparts of acrylates and maleimides contain relatively labile thioether ester or succinimide bonds (Schoenmakers et al., 2004, J. Controlled Release 95:291-300; Rydholm et al., 2007, Acta Biomater. 3:449-455).

The water stability of vinyl sulfone and its ability to form thioether sulfone bonds along with its high reactivity make this functional group highly valuable for biological applications. Hubbell et al. have synthesized a cell-responsive hydrogel from vinyl sulfone functionalized PEGs and thiol containing peptides where the thiol originates from cysteine amino acids in the peptide sequence. The resulting network is degradable by metalloproteinases (Lutolf et al., 2003, Proc. Natl. Acad. Sci. U.S.A. 100:5413-5418; Lutolf et al., 2003, Adv. Mater. 15:888-892). Hiemstra et al. have synthesized a degradable hydrogel from vinyl sulfone functionalized dextrans and multifunctional PEG thiols and achieved precise control over the degradation rate depending on the linker length between the thioether sulfone and degradable moieties (Hiemstra et al., 2007, Macromolecules 40:1165-1173). These approaches have managed to control the degradation properties of the resultant polymer, which was previously challenging with acrylates, as they essentially formed degradable thioether ester bonds. Vinyl sulfones have also been used in optical materials due to the high refractive index of the sulfur-atom containing materials and the stability of the thioether sulfone bond. Okutsu et al. have reported poly(thioether sulfone) with high refractive index and high Abbe numbers up to 1.62 and 45.8, respectively, using thiol-Michael additions with vinyl sulfone functional groups, which also possesses high thermal stability represented by Tg around 110° C. and no coloration up to 200° C. (Okutsu et al., 2008, Macromolecules 41:6165-6168). However, despite vinyl sulfones exhibiting attractive characteristics for polymeric materials synthesized via thiol-Michael addition reactions, limited work has been done in examining the reactivity and selectivity of vinyl sulfone groups in thiol-Michael addition reactions.

When base is used to catalyze thiol-Michael addition and thiol-isocyanate reactions, they proceed rapidly as soon as all reaction components are mixed. It is high $pK_a$ of thiols and their ease of deprotonation along with extremely high nucleophilicity of thiolate anions that makes these reactions very efficient. This means that, if lower reactivity is desired for particular reasons, for instance, in a need of coating, casting or molding of a crosslinking system, it is necessary to decrease concentrations of reagents or catalysts, which would ultimately compromise their reactivity. Therefore, an ability to control an onset of thiol-click reactions is highly desired. Hu et al. have shown that formaldehyde-sulfite clock reaction may be used as a time-lapse base catalyst for thiol-Michael addition reaction (Hu et al., 2010, J. Polym. Sci. Part A: Polym. Chem. 48:2955-2959), and that the urea-urease reaction may be used as a pH switch (Hu et al., 2010, J. Phys. Chem. B 114:14059-14063). However, these reactions were performed under aqueous conditions, which would not be ideal for most crosslinking systems. Photobase generators are widely known for spatiotemporal control of base catalyzed reactions, but are typically not very efficient and require long irradiation time and relatively high power, short wavelength UV (Dietliker et al., 2007, Prog. Org. Coat. 58:146-157; Salmi et al., 2012, J. Photopolym. Sci. Tech. 25:147-151; Suyama et al., 2009, Prog. Polym. Sci. 34:194-209; Sun et al., 2008, J. Am. Chem. Soc. 130:8130-8131).

There is a need in the art to develop novel monomer systems. Further, there is a need in the art for novel thiol-containing dual cure polymeric systems, wherein the crosslinking of the monomeric units may be temporally controlled. The present invention fulfills these needs.

BRIEF SUMMARY OF THE INVENTION

In one aspect, the invention includes a composition comprising a vinyl sulfone monomer, a thiol monomer, and an acrylate monomer.

In another aspect, the invention includes a composition comprising an electrophilic monomer, a nucleophilic monomer, a nucleophilic catalyst and an acid, wherein the concentrations of the nucleophilic catalyst and acid are selected as to provide a specific induction time for the polymerization reaction of the electrophilic monomer and the nucleophilic monomer.

In yet another aspect, the invention includes a method of generating a polymeric material.

In certain embodiments, the composition further comprises at least one catalyst, wherein the catalyst comprises a base or nucleophile. In other embodiments, the catalyst comprises a tertiary amine or phosphine, wherein each substituent on the tertiary amine or phosphine is independently alkyl, substituted alkyl, aryl or substituted aryl.

In certain embodiments, the thiol equivalent concentration is substantially equal to the vinyl sulfone equivalent concentration.

In certain embodiments, the thiol equivalent concentration is substantially equal to the sum of the vinyl sulfone equivalent concentration and the acrylate equivalent concentration.

In certain embodiments, the composition further comprises a polymerization photoinitiator, wherein the photoinitiator promotes photopolymerization of at least a portion of the acrylate monomer upon irradiation with UV radiation. In yet other embodiments, the polymerization photoinitiator is selected from the group consisting of 2,2-dimethoxy-1,2-diphenylethan-1-one, bis(2,4,6-trimethylbenzoyl)-phenylphosphineoxide, 1-hydroxycyclohexyl benzophenone, trimethyl-benzoyl-diphenyl-phosphine-oxide, and any combinations thereof.

In certain embodiments, the nucleophilic monomer comprises a thiol monomer. In other embodiments, the electrophilic monomer comprises an isocyanate monomer or an electron-deficient vinyl monomer. In yet other embodiments, the electron-deficient vinyl monomer comprises an acrylate monomer or a vinyl sulfone monomer. In yet other embodiments, the nucleophilic catalyst comprises a base or nucleophile. In yet other embodiments, the electrophilic monomer comprises an isocyanate monomer, further wherein the composition comprises an electrophilic catalyst. In yet other embodiments, the electrophilic catalyst comprises an electron-deficient vinyl monomer. In yet other embodiments, the electron-deficient vinyl monomer comprises a vinyl sulfone monomer. In yet other embodiments, the catalyst comprises a tertiary amine or phosphine, wherein each substituent on the tertiary amine or phosphine is independently alkyl, substituted alkyl, aryl or substituted aryl.

In certain embodiments, the composition further comprises a polymerization accelerator or inhibitor.

In certain embodiments, the acrylate monomer is selected from the group consisting of ethylene glycoldi(meth)acrylate, tetraethyleneglycol-di(meth)acrylate, poly(ethylene glycol)dimethacrylates, the condensation product of bisphenol A and glycidyl methacrylate, 2,2'-bis[4-(3-methacryloxy-2-hydroxypropoxy)-phenyl]propane, hexanediol di(meth)acrylate, tripropylene glycol di(meth)acrylate, butanediol di(meth)acrylate, neopentyl glycol di(meth)acrylate, diethylene glycol di(meth)acrylate, triethylene glycol di(meth)acrylate, dipropylene glycol di(meth)acrylate, allyl(meth)acrylate trimethylolpropane triacrylate, tricyclodecane dimethanol diacrylate, and any combinations thereof.

In certain embodiments, the thiol monomer is selected from the group consisting of 2,5-dimercaptomethyl-1,4-dithiane, 2,3-dimercapto-1-propanol, 2-mercapto-ethylsulfide, 2,3-(dimercaptoethylthio)-1-mercaptopropane, 1,2,3-trimercaptopropane, ethylene glycol bis(thioglycolate), ethylene glycol bis(3-mercaptopropionate), pentaerythritol tetra(3-mercaptopropionate), trimethylolpropane tris(3-mercaptopropionate), pentaerythritol tetra(2-mercaptoacetate), trimethylolpropane tris(2-mercaptoacetate), 1,6-hexanedithiol, 1,2-benzenedithiol, 1,3-benzenedithiol, isophorone diurethane thiol, and any combinations thereof.

In certain embodiments, the vinyl sulfone monomer is selected from the group consisting of ethyl vinyl sulfone, divinyl sulfone, the compounds depicted in FIG. 45, and any combinations thereof. In other embodiments, the vinyl sulfone monomer is selected from the group consisting of ethyl vinyl sulfone, divinyl sulfone, and combinations thereof.

In certain embodiments, the method of the invention comprises providing a composition comprising a vinyl sulfone monomer, a thiol monomer, an acrylate monomer, and at least one catalyst, wherein the catalyst comprises a base or nucleophile. In other embodiments, the method of the invention further comprises submitting the composition to a first polymerization process, whereby the vinyl sulfone monomer is substantially polymerized and the acrylate monomer is substantially not polymerized. In yet other embodiments, the method of the invention further comprises submitting the composition to a second polymerization process, whereby the acrylate monomer is substantially polymerized; thereby generating the polymeric material.

In certain embodiments, the method of the invention comprises providing a composition comprising an electrophilic monomer, a nucleophilic monomer, a nucleophilic catalyst and an acid, wherein the concentrations of the nucleophilic catalyst and acid are selected as to provide a specific induction time for the polymerization reaction of the electrophilic monomer and the nucleophilic monomer. In other embodiments, the method of the invention further comprises shaping the composition to a desired form or shape within the specific induction time. In yet other embodiments, the method of the invention further comprises allowing the composition to undergo polymerization, thereby generating the polymeric material.

In certain embodiments, the second polymerization process comprises photopolymerization and the composition further comprises a polymerization photoinitiator.

BRIEF DESCRIPTION OF THE DRAWINGS

The following detailed description of specific embodiments of the invention will be better understood when read in conjunction with the appended drawings. For the purpose of illustrating the invention, there are shown in the drawings specific embodiments. It should be understood, however, that the invention is not limited to the precise arrangements and instrumentalities of the embodiments shown in the drawings.

FIG. 1 illustrates non-limiting examples of thiol, isocyanate and vinyl monomers, as well as catalysts, acids and solvents contemplated within the invention.

FIG. 4, comprising FIG. 4B with doubled amount of [EVS] showed less induction time compared to FIG. 4A and FIG. 4C, indicating that [EVS] affects the initial reaction step, which is the attack of a nucleophile on a vinyl.

FIG. 6, comprising FIG. 6A: When thiol:vinyl sulfone:acrylate=1:1:1 was used, conversions of HT and EVS went up to 80% in 15 minutes with almost no consumption of HA, and the reaction ended up with 90% EVS and 10% HA conversions confirmed from $^1$H NMR taken 1.5 hours after the reaction started. FIG. 6B: When thiol:vinyl sulfone:acrylate=2:1:1 was used, the conversion of EVS was 100% in 10 minutes, followed by reaction of HA. The reaction ended up with 100% EVS and 80% HA conversions confirmed from $^1$H NMR taken 2.5 hours after the reaction started.

FIG. 7, comprising FIGS. 7A-7B, is a series of schematic illustrations of the network formation in (FIG. 7A) PETMP:HDDA:EGMEA=1:3:3 and (FIG. 7B) PETMP:DVS:EGMEA=1:3:3 systems. For the system depicted in FIG. 7A, addition of the monofunctional EGMEA monomer prevents network formation and gelation. In contrast, gelation occurs for the system depicted in FIG. 7B since vinyl sulfones are much more reactive to the thiol-Michael addition reaction and the effect of EGMEA addition is minimal.

FIG. 8, comprising FIG. 8A: Rate of thiol-Michael addition reaction clearly increases with higher concentration of TPP, although still within a time scale observable by FT-IR. FIG. 8B: Addition of MsOH generates induction time, which increases with higher concentration of MsOH.

FIG. 10, comprising

0.033 system with 0.019 M of MsOH. Diethyleneglycol diethylether was used as a solvent for all systems. FIG. 10A: Rate of the thiol•Michael addition reaction increases with higher concentration of TEA. TEA showed higher rate of reaction compared to TPP with same concentration (see FIG. 8A). FIG. 10B: Addition of MsOH significantly decreased the reaction rate, however, it did not generate an induction time like TPP/MsOH system (see FIG. 8B) and the observed kinetic behavior was different.

FIG. 11 is a series of graphs illustrating conversion as a function of time plots for [TMPTMP]:[EVS]=4.0:4.0 systems with varying amounts of TPP and MsOH. Duration of induction time could be adjusted by TPP concentration. Rate of the thiol-Michael addition reaction also increases with the concentration of TPP.

FIG. 13, comprising FIG. 13A: Almost no reaction could be observed from EVS and TPP. FIG. 13B: Double bond peak disappeared completely, which shows that EVS reacted with DMPP. Green arrow indicates the generation of a zwitterion, whereas purple arrow indicates the generation of an addition byproduct between a zwitterion and EVS. Therefore, TPP conversion was lower than 100%.

FIG. 14 illustrates chemical equations and kinetic constants used for the modeling of the thiol-Michael addition reaction. Thiol:vinyl sulfone:TPP:MsOH system was used as a model.

FIG. 15, comprising FIGS. 15A-15B, is a series of graphs illustrating the kinetic profile simulation for the reaction system used in (FIG. 15A) FIG. 8B and (FIG. 15B) FIG. 11 (left, experimental plots; right, simulation plots). Each kinetic profile could be simulated with high reproducibility.

FIG. 17, comprising

FIG. 19, comprising FIGS. 19A-19B, is a series of graphs illustrating a kinetic profile simulation of the reaction systems illustrated in FIGS. 16-17. RSH, VS and ACR represent thiol, vinyl sulfone and acrylate, respectively. Each kinetic profile could be simulated with high reproducibility.

FIG. 20 is a series of graphs illustrating the properties of thiol/vinyl sulfone network polymers. Thiol/vinyl sulfone polymers exhibit significantly higher $T_g$ than similar thiol/acrylates.

FIG. 22 is a table illustrating the mechanical properties of vinyl sulfone containing networks. Functional group ratios are all 1:1 stoichiometry.

FIG. 23 is a graph illustrating the relative reactivity of vinyl sulfones to acrylates. Conditions: PETMP:DVS:TMPTA=1:1:1; 4.6 wt % triphenylphosphine (TPP), 1.4 wt % methanesulfonic acid (MsOH). Vinyl sulfones reacted selectively with minimal consumption of acrylates (<10%).

FIG. 24 is a table illustrating the relative reactivity of selected thiols. Thiol A:Thiol B:Ethyl vinyl sulfone (EVS)= 1:1:1. (0.05 wt % methyldiphenyl phosphine (MDPP)). MDPP was added to the mixture, mixed by vortex for 10 sec and left for 0.5-1 hr before $^1$H NMR. Percentage of thiol A Michael addition product is illustrated in the table. For example, BT/HT/EVS system ended up with 95% BT adduct and 5% HT adduct. Reaction conversions were almost 100%. Good selectivity between thiols with different $pK_a$'s.

FIG. 26, comprising FIGS. 26A-26B, illustrates a selective network formation, wherein a polymer with two distinct $T_g$'s is formed. PETMA:PETMP:DVS:TMPTA=1:1:1:1 (0.5 wt % TPP, 0.04 wt % MsOH). A triple shape memory behavior could be observed. Additional systems with two distinct $T_g$'s are summarized in the table in FIG. 26B.

FIG. 28, comprising FIGS. 28A-28D, is a series of graphs illustrating TPP mediated reaction with vinyl sulfones and/or acrylates. [Thiol]:[Alkene]:[TPP]:[MsOH] in diethyleneglycol diethyl ether (DEGDE). TMPTMP/EVS/EA; [—SH]:$[C=C]_{EVS}$:$[C=C]_{EA}$:[TPP]:[MsOH].

FIG. 34, comprising FIGS. 34A-34B, is a series of graphs illustrating modeling of TMPTMP/EA/TPP/MsOH systems with various [TPP] and [MsOH]. As [MsOH] increased, induction time also increased.

FIG. 35, comprising FIGS. 35A-35B, is a series of graphs illustrating modeling of TMPTMP/EVS/TPP/MsOH systems with various [MsOH]. As [MsOH] increased, induction time also increased.

FIG. 36, comprising FIGS. 36A-36B, is a series of graphs illustrating experimental results relating to thiol-isocyanate reaction rates and order. Doubling isocyanate (or thiol) concentration approximately increased reaction rate by a factor of 2, implying a second-order reaction.

FIG. 37 is a series of graphs illustrating experimental results relating to co-catalyst efficiency in thiol-isocyanate reaction.

FIG. 38 is a series of graphs illustrating experimental results relating to effect of catalyst concentration on reaction kinetics.

FIG. 39 is a series of graphs illustrating experimental results relating to quaternary thiol-isocyanate-vinylsulfone-acrylate systems.

FIG. 40, comprising

FIG. 41 is a series of $^1$H NMR spectra relating to an one-pot dual functionalization experiment. Top spectrum: acquired before reaction. Middle spectrum: acquired 10 minutes after addition of hexanethiol (2 eq), 0.1 wt % methyldiphenylphosphine; 90% vinyl sulfone conversion, 10-20% acrylate conversion. Bottom spectrum: acquired after further addition of hexanethiol (2 equivalents); all alkenes had reacted.

FIG. 42, comprising FIGS. 42A-42C, is a series of graphs illustrating conversion results for a PETMP/HMDI/DVS ternary system.

FIG. 43 is a series of graphs illustrating shrinkage stress results for a PETMP/HMDI/DVS ternary system.

FIG. 45, comprising FIGS. 45A-45B, illustrates non-limiting examples of vinyl sulfone monomers contemplated within the invention.

DETAILED DESCRIPTION OF THE INVENTION

Figure 2:
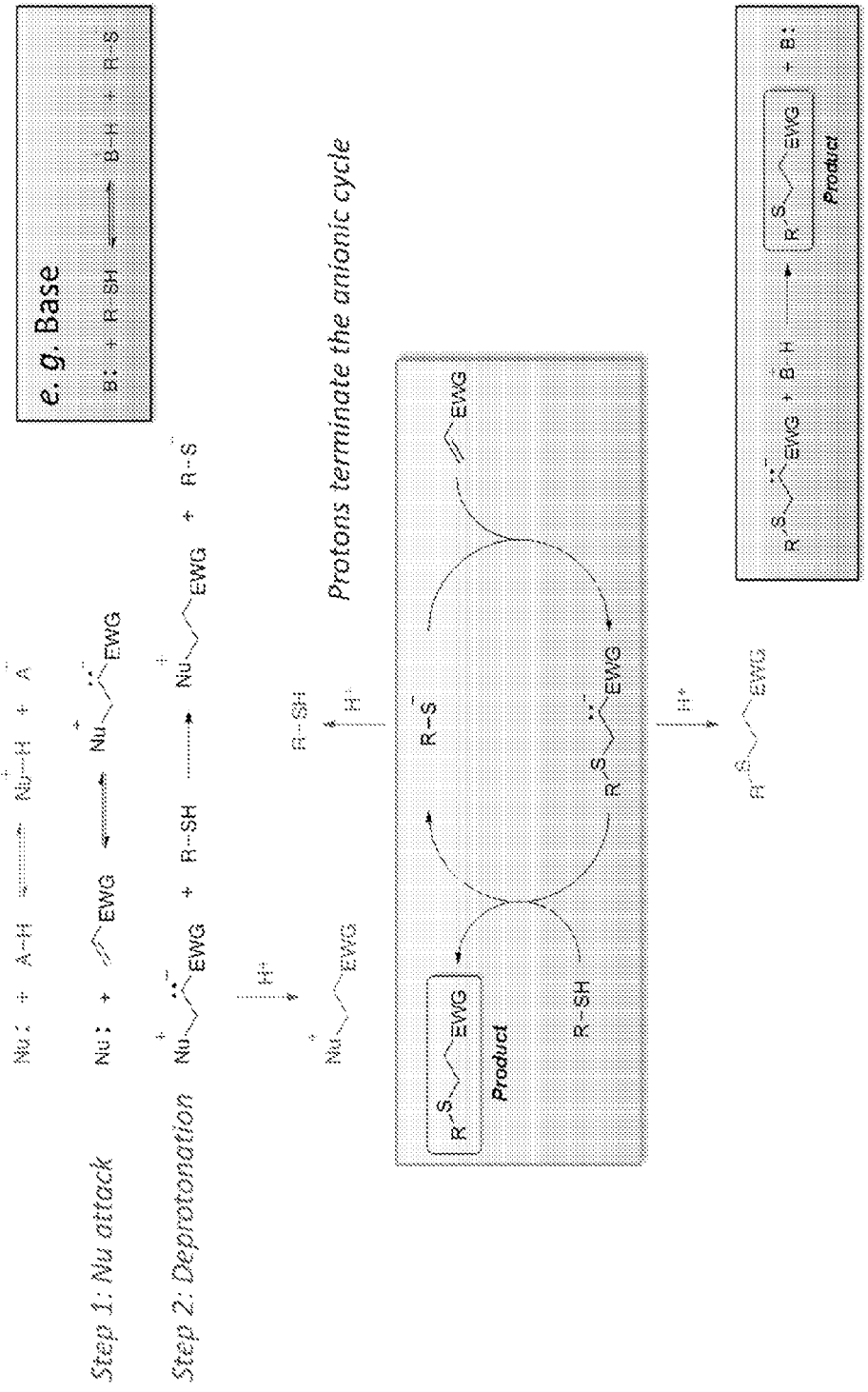
FIG. 2 is a schematic illustration of mechanisms for base-catalyzed and nucleophile-catalyzed thiol-Michael addition reactions.

The invention relates to the unexpected discovery of the differential reactivity and selectivity of vinyl sulfones and acrylates towards the thiol-Michael addition and polymerization reactions. As described herein, due to their high reactivity, vinyl sulfones may be selectively reacted (>80%) with minimal consumption of acrylates in a thiol:vinyl sulfone: acrylate=1:1:1 ternary system. This differential selectivity may be implemented to control the architecture of crosslinking polymer networks based on vinyl sulfones and acrylates.

The invention further relates to the unexpected discovery that the induction time of the nucleophile-initiated thiol-Michael addition reaction may be finely tuned. As described herein, the thiol-Michael addition reaction proceeds via a nucleophilic addition pathway, which may be controlled through addition of a protic species to the polymerization mixture. Using such discovery, it is possible to generate a monomer mixture (such as a thiol-isocyanate or thiol-vinyl sulfone mixture) that remains substantially unpolymerized for a programmed period of time, so that the monomer mixture may be handled as a malleable liquid for the programmed period of time for processing like coating, casting and molding, followed by rapid crosslinking polymerization. This catalyst system is not limited to thiol-isocyanate or thiol-vinyl sulfone reactions but also applicable to a wide range of chemical reactions comprising a nucleophile reagent and an electron deficient reagent (such as an electron deficient vinyl reagent).

The present invention includes novel monomer systems. In one embodiment, a first monomer is selectively polymerized in the presence of a second monomer using a first polymerization condition, wherein the first polymerization condition does not significantly polymerize the second monomer; the second monomer may then be polymerized at a later time using a second polymerization condition. In another embodiment, a first monomer is polymerized at a faster rate than a second monomer present in the system.

The present invention also includes novel thiol-containing dual cure polymeric systems, wherein the crosslinking of the monomeric units may be temporally controlled. In one embodiment, the unpolymerized mixture may be easily manipulated in its fluid state, and may then undergo rapid crosslinking polymerization.

DEFINITIONS

Unless defined otherwise, all technical and scientific terms used herein generally have the same meaning as commonly understood by one of ordinary skill in the art to which this invention belongs. Generally, the nomenclature used herein and the laboratory procedures in organic chemistry, and polymer chemistry are those well known and commonly employed in the art.

As used herein, the articles "a" and "an" refer to one or to more than one (i.e. to at least one) of the grammatical object of the article. By way of example, "an element" means one element or more than one element.

As used herein, the term "about" will be understood by persons of ordinary skill in the art and will vary to some extent on the context in which it is used. As used herein when referring to a measurable value such as an amount, a temporal duration, and the like, the term "about" is meant to encompass variations of ±20% or ±10%, for example ±5%, for example ±1%, for example ±0.1% from the specified value, as such variations are appropriate to perform the disclosed methods.

As used herein, the term "MsOH" refers to methanesulfonic acid.

As used herein, the term "EVS" refers to ethyl vinyl sulfone.

As used herein, the term "DVS" refers to divinyl sulfone.

As used herein, the term "HA" refers to hexyl acrylate.

As used herein, the term "HT" refers to hexanethiol.

As used herein, the term "MMP" refers to methyl 3-mercaptopropionate.

As used herein, the term "TEA" refers to triethylamine.

As used herein, the term "DMPP" refers to dimethylphenylphosphine.

As used herein, the term "DEGDE" refers to diethyleneglycol diethyl ether.

As used herein, the terms "comprising," "including," "containing," and "characterized by" are exchangeable, inclusive, open-ended and does not exclude additional, unrecited elements or method steps. Any recitation herein of the term "comprising," particularly in a description of components of a composition or in a description of elements of a device, is understood to encompass those compositions and methods consisting essentially of and consisting of the recited components or elements.

As used herein, "consisting of" excludes any element, step, or ingredient not specified in the claim element.

As used herein, "consisting essentially of" does not exclude materials or steps that do not materially affect the basic and novel characteristics of the claim.

The term "monomer" refers to any discreet chemical compound of any molecular weight.

As used herein, the term "polymer" refers to a molecule composed of repeating structural units typically connected by covalent chemical bonds. The term "polymer" is also meant to include the terms copolymer and oligomers. In one embodiment, a polymer comprises a backbone (i.e., the chemical connectivity that defines the central chain of the polymer, including chemical linkages among the various polymerized monomeric units) and a side chain (i.e., the chemical connectivity that extends away from the backbone).

As used herein, the term "polymerization" or "crosslinking" refers to at least one reaction that consumes at least one functional group in a monomeric molecule (or monomer), oligomeric molecule (or oligomer) or polymeric molecule (or polymer), to create at least one chemical linkage between at least two distinct molecules (e.g., intermolecular bond), at least one chemical linkage within the same molecule (e.g., intramolecular bond), or any combinations thereof. A polymerization or crosslinking reaction may consume between about 0% and about 100% of the at least one functional group available in the system. In one embodiment, polymerization or crosslinking of at least one functional group results in about 100% consumption of the at least one functional group. In another embodiment, polymerization or crosslinking of at least one functional group results in less than about 100% consumption of the at least one functional group.

As used herein, the term "orthogonal," as applied to the conditions required to run at least two distinct chemical reactions, indicates that the conditions used to perform one of the chemical reactions do not significantly affect the ability to perform the subsequent other(s) chemical reaction(s). In a non-limiting example, reactions R1 and R2 may be performed in a system, wherein R1 is run first and R2 is run second; reactions R1 and R2 are performed under "orthogonal" conditions if reaction R1 may be performed in the system under conditions that do not affect the ability to subsequently perform reaction R2 in the system.

As used herein, the term "curable" as applied to a material refers to a material comprising at least one functional group that may undergo polymerization. The curable material may be non-polymerized (i.e., non-cured material), or may be submitted to polymerization conditions (such as chemical reagents or physical conditions) that induce polymerization of at least a fraction of the at least one polymerizable functional group (i.e., partially or fully cured material). In one embodiment, polymerization or crosslinking of the curable material results in about 100% consumption of the at least one functional group (i.e., fully cured). In another embodiment, polymerization or crosslinking of the curable material results in less than about 100% consumption of the at least one functional group (i.e., partially cured).

As used herein, the term "reaction condition" refers to a physical treatment, chemical reagent, or combination thereof, which is required or optionally required to promote a reaction. Non-limiting examples of reaction conditions are electromagnetic radiation, heat, a catalyst, a chemical reagent (such as, but not limited to, an acid, base, electrophile or nucleophile), and a buffer.

As used herein, the term "reactive" as applied to thiol, alcohol, isocyanate, vinyl, acrylate or ene groups indicate that these groups, when submitted to appropriate conditions, may take part in the reaction in question.

As used herein, the term "thiol monomer" corresponds to a compound having a discrete chemical formula and comprising at least a sulfhydryl or thiol group (—SH), or a reactive oligomer or reactive polymer or pre-polymer having at least one thiol group. Suitable thiol monomers have one or more than one functional thiol groups and may be of any molecular weight. In one embodiment, the thiol monomer may be selected from one or more of aliphatic thiols, thiol glycolate esters, thiol propionate esters. Examples of suitable thiol bearing monomers include: pentaerythritol tetra(3-mercaptopropionate) (PETMP); 1-Octanethiol; Butyl 3-mercaptopropionate; 2,4,6-trioxo-1,3,5-triazina-triy(triethyl-tris(3-mercapto propionate); 1,6-Hexanedithiol; 2,5-dimercaptomethyl-1,4-dithiane, pentaerythritol tetramercaptoacetate, trimethylolpropane trimercaptoacetate, 2,3-dimercapto-1-propanol, 2-mercaptoethylsulfide, 2,3-(dimercaptoethylthio)-1-mercaptopropane, 1,2,3-trimercaptopropane, toluenedithiol, xylylenedithiol, 1,8-octanedithiol, 1-hexanethiol (Sigma-Aldrich, Milwaukee, Wis.); and trimethylolpropane tris(3-mercaptopropionate), and glycol dimercaptopropionate (Evans Chemetics LP, Iselin, N.J.).

As used herein, the term "thiol equivalent concentration" for a thiol monomer in a sample corresponds to the concentration of reactive thiol groups in the sample related to the thiol monomer. In a non-limiting example, the thiol equivalent concentration of a thiol monomer in a solution corresponds to the product of the average number of reactive thiol groups in a thiol monomer and the average concentration of the thiol monomer in the solution.

As used herein, the term "nucleophile equivalent concentration" for a nucleophile monomer in a sample corresponds to the concentration of reactive nucleophilic groups in the sample related to the nucleophile monomer. In a non-limiting example, the nucleophile equivalent concentration of a nucleophile monomer in a solution corresponds to the product of the average number of reactive nucleophile groups in a nucleophile monomer and the average concentration of the nucleophile monomer in the solution. In one embodiment, the nucleophile group is an alcohol hydroxyl, phenol hydroxyl or thiol.

As used herein, the term "acrylate monomer" corresponds to a compound having a discrete chemical formula and comprising at least one acrylate group (exemplified as —C($R^1$)=C($R^2$)—C(=O)—), wherein $R^1$ and $R^2$ are independently hydrogen or alkyl), or a reactive oligomer or reactive polymer or pre-polymer having at least one acrylate group In a non-limiting embodiment, the term "acrylate" encompass a methacrylate, wherein $R^2$ is methyl.

As used herein, the term "acrylate equivalent concentration" for an acrylate monomer in a sample corresponds to the concentration of reactive acrylate groups in the sample related to the acrylate monomer. In a non-limiting example, the acrylate equivalent concentration of an acrylate monomer in a solution corresponds to the product of the average number of reactive acrylate groups in an acrylate monomer and the average concentration of the acrylate monomer in the solution.

As used herein, the term "vinyl sulfone monomer" corresponds to a compound having a discrete chemical formula and comprising at least one vinyl sulfone group (exemplified as —C(R$^1$)=C(R$^2$)—S(=O)$_2$—), wherein R$^1$ and R$^2$ are independently hydrogen or alkyl), or a reactive oligomer or reactive polymer or pre-polymer having at least one vinyl sulfone group.

As used herein, the term "vinyl sulfone concentration" for a vinyl sulfone monomer in a sample corresponds to the concentration of reactive vinyl sulfone groups in the sample related to the vinyl sulfone monomer. In a non-limiting example, the vinyl sulfone equivalent concentration of a vinyl sulfone monomer in a solution corresponds to the product of the average number of reactive vinyl sulfone groups in a vinyl sulfone monomer and the average concentration of the vinyl sulfone monomer in the solution.

Monomers having "-ene" or vinyl functional groups suitable for embodiments of the present invention include any monomer having one, or more than one functional vinyl groups, i.e., reacting "C=C" or "C≡C" groups. The ene monomer can be selected from one or more compounds having vinyl functional groups. Vinyl functional groups can be selected from, for example, vinyl sulfone, vinyl ether, vinyl ester, allyl ether, norbornene, diene, propenyl, alkene, alkyne, N-vinyl amide, unsaturated ester, N-substituted maleimides, and styrene moieties. Examples of suitable ene monomers include triallyl-1,3,5-triazine-2,4,6-trione (TATATO); Triethyleneglycol divinyl ether (TEGDVE); Trimethylolpropane diallyl ether; 1,6-heptadiyne; 1,7-octadiyne; and Dodecyl vinyl ether (DDVE) and norbornene monomers. In one specific embodiment, the ene monomer is selected from triallyl-1,3,5-triazine-2,4,6-trione (TATATO), 1-octanethiol 1,6-hexanedithiol triethyleneglycol divinyl ether (TEGDVE), and dodecyl vinyl ether (DDVE). In one embodiment, the ene monomer is triallyl-1,3,5-triazine-2,4,6-(1H,3H,5H)-trione (TATATO).

The term "aliphatic" or "aliphatic group" as used herein means a straight-chain or branched hydrocarbon chain that is completely saturated or that contains one or more units of unsaturation, or a monocyclic hydrocarbon or bicyclic hydrocarbon that is completely saturated or that contains one or more units of unsaturation, but which is not aromatic (also referred to herein as "carbocycle" or "cycloalkyl"), that has a single point of attachment to the rest of the molecule wherein any individual ring in said bicyclic ring system has 3-7 members. For example, suitable aliphatic groups include, but are not limited to, linear or branched or alkyl, alkenyl, alkynyl groups and hybrids thereof such as (cycloalkyl)alkyl, (cycloalkenyl)alkyl or (cycloalkyl)alkenyl.

The terms "alkyl" and "alkoxy," used alone or as part of a larger moiety include both straight and branched carbon chains. The terms "alkenyl" and "alkynyl" used alone or as part of a larger moiety shall include both straight and branched carbon chains.

The terms "haloalkyl," "haloalkenyl" and "haloalkoxy" means alkyl, alkenyl or alkoxy, as the case may be, substituted with one or more halogen atoms. The term "halogen" or "halo" means F, Cl, Br or I.

The term "heteroatom" means nitrogen, oxygen, or sulfur and includes any oxidized form of nitrogen and sulfur, and the quaternized form of any basic nitrogen.

The terms "mercapto" or "thiol" refer to an —SH substituent, or are used to designate a compound having an —SH substituent.

The term "aryl" used alone or in combination with other terms, refers to monocyclic, bicyclic or tricyclic carbocyclic ring systems having a total of five to fourteen ring members, wherein at least one ring in the system is aromatic and wherein each ring in the system contains 3 to 8 ring members. The term "aryl" may be used interchangeably with the term "aryl ring".

The term "aralkyl" refers to an alkyl group substituted by an aryl. The term "aralkoxy" refers to an alkoxy group. The term "heterocycloalkyl," "heterocycle," "heterocyclyl" or "heterocyclic" as used herein means monocyclic, bicyclic or tricyclic ring systems having five to fourteen ring members in which one or more ring members is a heteroatom, wherein each ring in the system contains 3 to 7 ring members and is non-aromatic.

As used herein, the term "electromagnetic radiation" includes radiation of one or more frequencies encompassed within the electromagnetic spectrum. Non-limiting examples of electromagnetic radiation comprise gamma radiation, X-ray radiation, UV radiation, visible radiation, infrared radiation, microwave radiation, radio waves, and electron beam (e-beam) radiation. In one aspect, electromagnetic radiation comprises ultraviolet radiation (wavelength from about 10 nm to about 400 nm), visible radiation (wavelength from about 400 nm to about 750 nm) or infrared radiation (radiation wavelength from about 750 nm to about 300,000 nm). Ultraviolet or UV light as described herein includes UVA light, which generally has wavelengths between about 320 and about 400 nm, UVB light, which generally has wavelengths between about 290 nm and about 320 nm, and UVC light, which generally has wavelengths between about 200 nm and about 290 nm. UV light may include UVA, UVB, or UVC light alone or in combination with other type of UV light. In one embodiment, the UV light source emits light between about 350 nm and about 400 nm. In some embodiments, the UV light source emits light between about 400 nm and about 500 nm.

As used herein, the term "instructional material" includes a publication, a recording, a diagram, or any other medium of expression that may be used to communicate the usefulness of the compositions of the invention. In some instances, the instructional material may be part of a kit useful for generating a shape memory polymer system. The instructional material of the kit may, for example, be affixed to a container that contains the compositions of the invention or be shipped together with a container that contains the compositions. Alternatively, the instructional material may be shipped separately from the container with the intention that the recipient uses the instructional material and the compositions cooperatively. For example, the instructional material is for use of a kit; instructions for use of the compositions; or instructions for use of a formulation of the compositions.

Throughout this disclosure, various aspects of the invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Compositions

The invention includes a composition comprising a vinyl sulfone monomer, a thiol monomer, and an acrylate monomer.

In one embodiment, the composition further comprises at least one catalyst, wherein the catalyst comprises a base or nucleophile. In another embodiment, the catalyst comprises a tertiary amine or phosphine, wherein each substituent on the tertiary amine or phosphine is independently alkyl, substituted alkyl, aryl or substituted aryl.

In one embodiment, the thiol equivalent concentration is substantially equal to the vinyl sulfone equivalent concentration.

In one embodiment, the thiol equivalent concentration is substantially equal to the sum of the vinyl sulfone equivalent concentration and the acrylate equivalent concentration.

In one embodiment, the acrylate monomer is selected from the group consisting of ethylene glycoldi(meth)acrylate, tetraethyleneglycol-di(meth)acrylate, poly(ethylene glycol) dimethacrylates, the condensation product of bisphenol A and glycidyl methacrylate, 2,2'-bis[4-(3-methacryloxy-2-hydroxypropoxy)-phenyl]propane, hexanediol di(meth)acrylate, tripropylene glycol di(meth)acrylate, butanediol di(meth)acrylate, neopentyl glycol di(meth)acrylate, diethylene glycol di(meth)acrylate, triethylene glycol di(meth)acrylate, dipropylene glycol di(meth)acrylate, allyl(meth)acrylate trimethylolpropane triacrylate, tricyclodecane dimethanol diacrylate, and combinations thereof.

In one embodiment, the thiol monomer is selected from the group consisting of 2,5-dimercaptomethyl-1,4-dithiane, 2,3-dimercapto-1-propanol, 2-mercapto-ethylsulfide, 2,3-(dimercaptoethylthio)-1-mercaptopropane, 1,2,3-trimercaptopropane, ethylene glycol bis(thioglycolate), ethylene glycol bis(3-mercaptopropionate), pentaerythritol tetra(3-mercaptopropionate), trimethylolpropane tris(3-mercaptopropionate), pentaerythritol tetra(2-mercaptoacetate), trimethylolpropane tris(2-mercaptoacetate), 1,6-hexanedithiol, 1,2-benzenedithiol, 1,3-benzenedithiol, isophorone diurethane thiol, and combinations thereof.

Figure 45B:
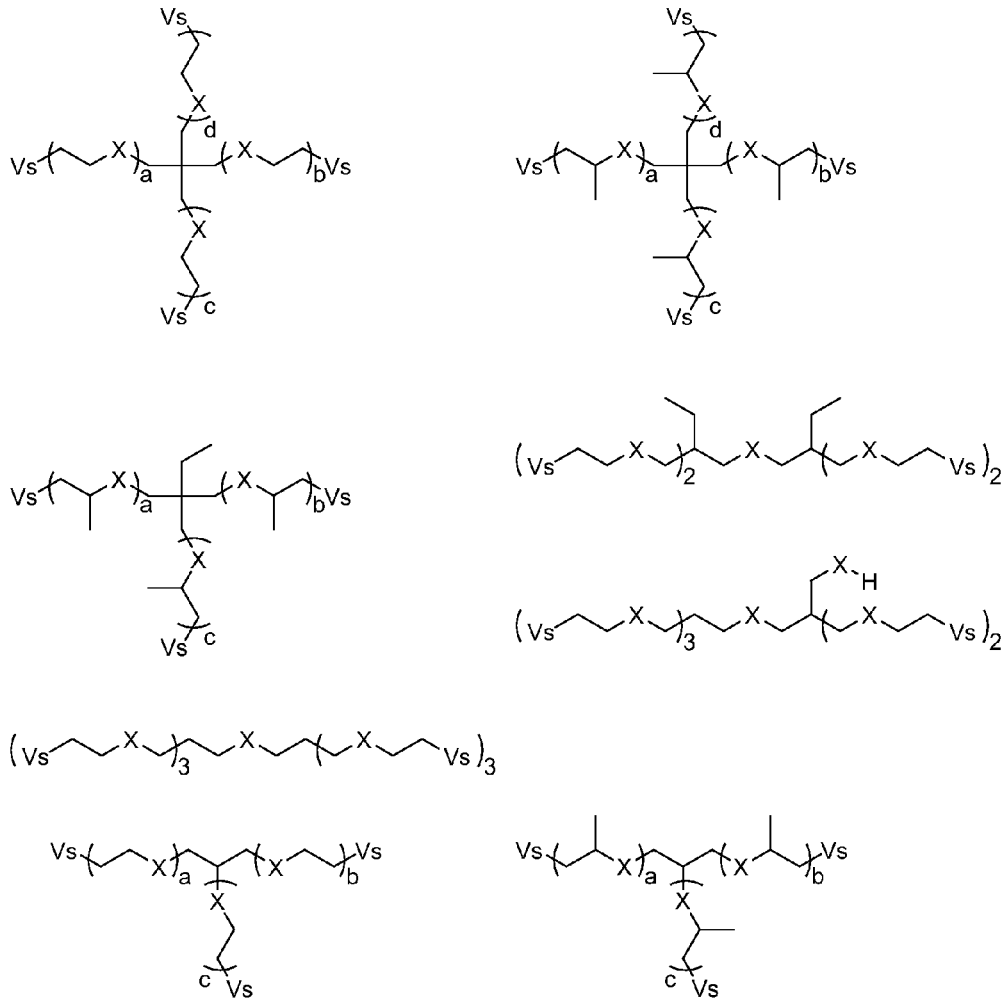

In one embodiment, the vinyl sulfone monomer is selected from the group consisting of ethyl vinyl sulfone, divinyl sulfone, the compounds depicted in FIG. 45, and combinations thereof.

The invention further includes a composition comprising an electrophilic monomer, nucleophilic monomer, nucleophilic catalyst and acid, wherein the concentrations of the nucleophilic catalyst and acid are selected as to provide a specific induction time for the polymerization reaction of the composition.

In one embodiment, the nucleophilic monomer comprises a thiol monomer.

In one embodiment, the electrophilic monomer comprises an isocyanate monomer or an electron-deficient vinyl monomer. In another embodiment, the electron-deficient vinyl monomer comprises an acrylate monomer or vinyl sulfone monomer. In yet another embodiment, the electrophilic monomer comprises an isocyanate monomer, further wherein the composition comprises an electrophilic catalyst.

In one embodiment, the nucleophilic catalyst comprises a base or nucleophile. In another embodiment, the catalyst comprises a tertiary amine or phosphine, wherein the substituents on the tertiary amine or phosphine are independently alkyl, substituted alkyl, aryl or substituted aryl.

In one embodiment, the electrophilic catalyst comprises an electron-deficient vinyl monomer. In another embodiment, the electron-deficient vinyl monomer comprises a vinyl sulfone monomer. In yet another embodiment, the vinyl sulfone monomer is selected from the group consisting of ethyl vinyl sulfone, divinyl sulfone, and combinations thereof.

In one embodiment, the resin further comprises a polymerization photoinitiator. In another embodiment, a photoinitiator responsive to visible light is employed. In yet another embodiment, the polymerization photoinitiator is selected from the group consisting of 2,2-dimethoxy-1,2-diphenylethan-1-one, bis(2,4,6-trimethylbenzoyl)-phenylphosphineoxide, 1-hydroxycyclohexyl benzophenone, trimethyl-benzoyl-diphenyl-phosphine-oxide, and combinations thereof. In yet another embodiment, the photoinitiator is a bisacyl phosphine oxide (BAPO). In yet another embodiment, the BAPO photoinitiator is phenyl bis(2,4,6-trimethyl benzoyl) phosphine oxide (Irgacure 819, Ciba). In yet another embodiment, the photoinitiator is a metallocene initiator. In yet another embodiment, the metallocene initiator is Bis(eta 5-2, 4-cyclopentadien-1-yl) Bis[2,6-difluoro-3-(1H-pyrrol-1-yl) phenyl]titanium (Irgacure 784, Ciba). In yet another embodiment, if photopolymerization using visible light is desired, camphorquinone (CQ) may be used as an initiator, in combination with an accelerator, such as, for example, ethyl 4-dimethylaminobenzoate (EDAB). Alternatively, if ultraviolet (UV) photopolymerization is desired, then an appropriate UV light activated photoinitiator may be employed. For example, the photoinitiator can be selected from an alpha-hydroxyketone, such as 1-hydroxy-cyclohexylphenylketone (Irgacure 184, Ciba); a benzyldimethyl-ketal, such as 2,2-dimethoxy-2-phenylacetophenone (DMPA, e.g. Irgacure 651, Ciba), or a number of other commercially available photoinitiators may be used as an initiator. Photoinitiators can be used in amounts ranging from about 0.01 to about 5 weight percent (wt %). In one specific embodiment, 0.25 wt % (2,4,6-trimethyl benzoyl)phosphine oxide (Irgacure 819) is used as the photoinitiator. In another specific embodiment, 0.3 wt % CQ is used as an initiator for visible light experiments, along with 0.8 wt % ethyl 4-(dimethylamino)benzoate (commonly known as EDMAB or EDAB). In another specific embodiment, 0.2 wt % DMPA is used as an initiator for UV polymerization.

In one embodiment, the free radical initiated photopolymerization is photoinitiated by any light wavelength range within the ultraviolet (about 200 to about 400 nm) and/or visible light spectrum (about 380 to about 780 nm). The choice of the wavelength range can be determined by the photoinitiator employed. In one embodiment, a full spectrum light source, e.g. a quartz-halogen xenon bulb, may be utilized for photopolymerization. In another embodiment, a wavelength range of about 320 to about 500 nm is employed for photopolymerization.

In one embodiment, one or more accelerators are utilized in the photopolymerization. Amine accelerators may be used as polymerization accelerators, as well as other accelerators. Polymerization accelerators suitable for use are the various organic tertiary amines well known in the art. In visible light curable compositions, the tertiary amines are generally acrylate derivatives such as dimethylaminoethyl methacrylate and, particularly, diethylaminoethyl methacrylate (DEAEMA), EDAB and the like, in an amount of about 0.05 to about 0.5 wt %. The tertiary amines are generally aromatic tertiary amines, such as tertiary aromatic amines such as EDAB, 2-[4-(dimethylamino)phenyl]ethanol, N,N-dimethyl-p-toluidine (commonly abbreviated DMPT), bis(hydroxyethyl)-p-toluidine, triethanolamine, and the like. Such accelerators are generally present at about 0.5 to about 4.0 wt % in the polymeric component. In one embodiment, 0.8 wt % EDAB is used in visible light polymerization.

In one embodiment, the composition further comprises one or more fillers. In one embodiment, the filler is used to modulate the viscosity, hydrophilicity and stiffness (rubbery modulus) of the unpolymerized or polymerized composition. Non-limiting examples of fillers include inorganic filler compounds such as barium, ytterbium, strontium, zirconia silicate, amorphous silica. The filler may be silanized and typically presented in the form of particles with a size ranging from 0.01 to 5.0 micrometers. In one embodiment, the filler is a hydrophobic fumed silica. In another embodiment, the hydrophobic fumed silica filler is composed of nanoparticles or nanoclusters.

A nanoparticle is defined as any particle less than 100 nanometers (nm) in diameter. A nanocluster is an agglomeration of nanoparticles. In one embodiment, utilization of nanoclusters in a nanosized filler can be exploited to increase the load and improve some mechanical properties. Other suitable fillers are known in the art, and include those that are capable of being covalently bonded to the impression material itself or to a coupling agent that is covalently bonded to both. Examples of suitable filling materials include but are not limited to, barium glass, ytterbium nanoglasses and nanoclusters, fumed silica, silica, silicate glass, quartz, barium silicate, strontium silicate, barium borosilicate, strontium borosilicate, borosilicate, lithium silicate, lithium alumina silicate, amorphous silica, ammoniated or deammoniated calcium phosphate and alumina, zirconia, tin oxide, and titania. Some of the aforementioned inorganic filling materials and methods of preparation thereof are disclosed in U.S. Pat. Nos. 4,544,359 and 4,547,531; pertinent portions of each of which are incorporated herein by reference. In one embodiment, the filler is a mixture of barium glass, ytterbium nanoglasses and nanoclusters, and fumed silica. In one embodiment, the filler is 85 wt % 0.5 micron barium glass, 10 wt % ytterbium 40 nm nanoglass and nanoclusters, 2.5 wt % Aerosil fumed silica, and 2.5 wt % Cabosil fumed silica. In another embodiment, the filler is a mixture of 90% 0.4 μm Schott glass and 10 wt % Aerosol OX-50. The above described filler materials may be combined with the resins of the disclosure to form a dental composite material with high strength along with other beneficial physical and chemical properties.

In one embodiment, suitable fillers are those having a particle size in the range from about 0.01 to about 5.0 micrometers, mixed with a silicate colloid of about 0.001 to about 0.07 micrometers. The filler may be utilized in the filled resin compositions of the disclosure in the amount of from about 40 wt % to about 90 wt %; for example about 60 wt % to 85 wt %; for example about 70 wt % to about 80 wt % of the total weight of the composition. In one specific embodiment, 72.5 wt % filler is utilized in the filled resin composition. In another specific embodiment, 60 wt % filler is utilized in the filled resin composition.

In another embodiment, the resin composition further comprises a polymerization inhibitor, or stabilizer. Examples of inhibitors include hydroquinone monomethyl ether (MEHQ), aluminum-N-nitrosophenylhydroxylamine, and 2,6-di-tertbutyl-4-methylphenol (BHT). In a specific embodiment, the inhibitor is aluminum-N-nitrosophenylhydroxylamine (Q1301, Wako Pure Chemical, Osaka, Japan). The optional inhibitor may be utilized in the amount of from about 0.001 wt % to about 0.5 wt %, or about 0.01 wt % to about 0.1 wt % of the resin composition. In one specific embodiment, the inhibitor aluminum-N-nitrosophenylhydroxylamine is utilized as 0.035 wt % of the resin. In another specific embodiment, aluminum-N-nitrosophenylhydroxylamine is utilized at 0.075 wt % of the total weight of the filled resin composition.

In one embodiment, the resin composition further comprises a UV absorber. The UV absorber can be selected from, for example, 5-benzoyl-4-hydroxy-2-methoxy-benzenesulfonic acid, Uvinul® 3000 from BASF Corp., and other various benzophenones, e.g. UV-5411 from American Cyanamid. The UV absorber can be present in from about 0.05 to about 5 wt %; for example less than about 0.5 wt % of the weight of the total weight of the filled composition. In one specific embodiment, Uvinul® 3000 is present in 0.10 wt % of the total weight of the filled composition.

Methods

The invention includes a method of generating a polymeric material, comprising the steps of: providing a composition comprising a vinyl sulfone monomer, a thiol monomer, an acrylate monomer, and at least one catalyst, wherein the catalyst comprises a base or nucleophile; submitting the composition to a first polymerization process, whereby the vinyl sulfone monomer is substantially polymerized and the acrylate monomer is substantially not polymerized; and, submitting the composition to a second polymerization process, whereby the acrylate monomer is substantially polymerized; thereby generating the polymeric material.

In one embodiment, the second polymerization process comprises photopolymerization and the composition further comprises a polymerization photoinitiator.

The invention further includes a method of generating a polymeric material, comprising the steps of: providing a composition comprising an electrophilic monomer, thiol monomer, nucleophilic catalyst and acid, wherein the concentrations of the nucleophilic catalyst and acid are selected as to provide a specific induction time for the polymerization reaction of the composition; shaping the composition to a desired form or shape within the specific induction time; and, allowing the composition to undergo polymerization, thereby generating the polymeric material.

In one embodiment, the electrophilic monomer comprises an isocyanate monomer or an electron-deficient vinyl monomer. In another embodiment, the electrophilic monomer comprises an isocyanate monomer, further wherein the composition comprises an electrophilic catalyst.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only, and the invention is not limited to these Examples, but rather encompasses all variations that are evident as a result of the teachings provided herein.

Experimental work on the methacrylate-thiol-ene polymer embodiments as dental restorative materials was performed to demonstrate the feasibility and advantages of these polymers over currently used dental restorative materials. Values in parenthesis in all Tables represent standard deviations.

Materials

1-Hexanethiol (HT), methyl 3-mercaptopropionate (MMP), hexyl acrylate (HA), dimethylphenylphosphine (DMPP), methyldiphenylphosphine (MDPP), triethylamine (TEA), triphenylphosphine (TPP), methanesulfonic acid (MsOH), ethyl acrylate (EA), diethyleneglycol diethyl ether (DEGDE), triethylamine (TEA), hexamethylene diisocyanate (HMDI) and DMSO-$d_6$ were purchased from Sigma-Aldrich and used as received unless otherwise noted.

Ethyl vinyl sulfone (EVS) and divinyl sulfone (DVS) was purchased from Oakwood Chemicals. Trimethylolpropane tris(3-mercaptopropionate) (TMPTMP) and pentaerythritol tetrakis(3-mercaptopropionate) (PETMP) were donated.

Methods

Fourier Transform Infrared Spectroscopy (FT-IR):

FT-IR experiments were performed using a Nicolet Magna 760. The thiol peak absorbance was measured at 2,570 cm$^{-1}$, vinyl sulfone peak at 3,054 or 700 cm$^{-1}$ and acrylate peak at 1,636 cm$^{-1}$. All reactions were performed between two sodium chloride crystals under ambient conditions. 0.050 mm thickness spacers were used to keep the sample thickness constant. Conversions were calculated using the ratio of peak areas to the peak area prior to the reaction.

$^1$H NMR Spectroscopy:

NMR spectra were recorded on a Bruker Avance-III 300 NMR spectrometer at 25° C. in CDCl$_3$. All chemical shifts are reported in ppm relative to tetramethylsilane (TMS).

General Procedure for the Thiol-Michael Addition Reaction:

The thiol reactant and the catalyst were added to a glass vial and thoroughly mixed. DEGDE, water or MsOH was added to this mixture if used. Varying stoichiometric amounts of vinyl sulfone and/or acrylate were added to the mixture and mixed vigorously to start the thiol-Michael addition reaction. The mixture was used for FT-IR or $^1$H NMR measurements.

Example 1

Thiol-Vinyl Sulfone Systems

Thiol-vinyl sulfone systems were formulated to study the reactivity of thiols and vinyl sulfones in the Michael addition reactions. Vinyl sulfone is known to be a highly activated vinyl and thus very reactive to thiol-Michael addition reactions. However, establishing the relative reactivity of a vinyl sulfone compared to other vinyls is of a particular interest since the high reactivity of either one would be advantageous for developing orthogonal or nearly orthogonal reaction systems that have several functional groups present within a reacting system.

The relative reactivity of a vinyl sulfone, ethyl vinyl sulfone (EVS), and an acrylate, hexyl acrylate (HA), in a thiol-Michael addition reaction was investigated. The reactions were performed in neat conditions with a stoichiometry of thiol to vinyl of 1 to 1. The general scheme of this reaction is described in Scheme 1.

Scheme 1. General scheme of the tiol-Michael addition reaction where the catalyst can be either a nucleophile or base

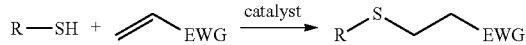

Two thiols, hexanethiol (HT) and methyl 3-mercaptopropionate (MMP), and also two catalysts, triethylamine (TEA, a base catalyst) and dimethylphenylphosphine (DMPP, a nucleophile catalyst) were used to compare the reactivity of vinyl sulfone and acrylate under various conditions. The results are summarized in Table 1.

TABLE 1

The thiol-Michael addition reaction[a] under various reaction conditions

| Entry | Thiol | Ene | Catalyst | Time (min) | Conversion (%)[d] |
|---|---|---|---|---|---|
| 1 | HT | HA | TEA[b] | 30 | 30 |
| 2 | HT | EVS | TEA[b] | 30 | 90 |
| 3 | HT | HA | DMPP[c] | 30 | 70 |
| 4 | HT | EVS | DMPP[c] | 2 | Quant. |
| 5 | MMP | HA | DMPP[c] | 30 | 70 |
| 6 | MMP | EVS | DMPP[c] | 2 | Quant. |

[a]Thiol:vinyl molar ratio was fixed to 1:1.
[b]2.0 wt % catalyst used.
[c]0.05 wt % catalyst used.
[d]Conversions were determined by FT-IR and $^1$H NMR.

In each formulation, the vinyl sulfone moiety was far more reactive than the acrylate (e.g., entry 1 and 2, Table 1). The vinyl sulfone reactivity was not influenced by the thiols used in the formulations and were consistently observed to be more reactive than the acrylate. The reactivity of the vinyl sulfone is likely due to the structure of the vinyl sulfone group, in which the vinyl moiety is more electron deficient compared to the acrylate, as a sulfone group has higher electron withdrawing capability than a carbonyl group. Also, in the nucleophile-mediated thiol-acrylate reaction, the phosphine DMPP catalyzed reactions proceeds much more rapidly than the base-catalyzed TEA reaction (e.g., entry 1 and 3, Table 1) for both vinyl reactants, even though 40-fold less amount of catalyst was used. High conversions in relatively short time-scale were observed even in reactions with hexanethiol, which is known to be a less reactive species for thiol-Michael addition reaction due to its large p$K_a$, by using a highly activated vinyl like vinyl sulfone (entry 2) or a nucleophilic catalyst like DMPP (entry 5 and 6, Table 1).

Based on the results from Table 1, DMPP was the more efficient catalyst when compared to TEA. The DMPP catalyzed reaction has been proposed to have a different mechanism compared to base-catalyzed TEA reaction. Although nucleophile-catalyzed thiol-Michael addition reaction has recently attracted interest due to its extremely high reactivity, it is difficult to control with a propensity of side-reactions (Li et al., 2010, Pol. Chem. 1:1196-1204). The details of the reaction mechanism were studied to further understand the factors that contribute to the undesirable side-reactions, and figure out the conditions under which the thiol-Michael addition reaction can be used as a "click" reaction.

The previously proposed mechanism for the nucleophile-catalyzed thiol-Michael addition reaction is described in FIG. 2B, and the reaction mechanism for a base-catalyzed mechanism is illustrated in FIG. 2A. There are two major differences between these two mechanisms. For a base-catalyzed reaction, the thiolate anion is formed by a direct deprotonation of a thiol by a base catalyst, whereas for a nucleophile-catalyzed reaction, the initial step is an attack of a nucleophile on an electron deficient vinyl, which then produces an extremely basic enolate zwitterion that acts as a base to deprotonate a thiol. The second difference between the two mechanisms lies in the type of proton sources that exist in the system. The base-catalyzed system has two such species, which are a protonated base and a thiol, whereas for the nucleophile-catalyzed system the thiol acts efficiently as the sole proton source. These differences cause the nucleophile-catalyzed thiol-Michael addition that proceeds via an anionic cycle to have an extremely high reaction rate.

Figure 3:
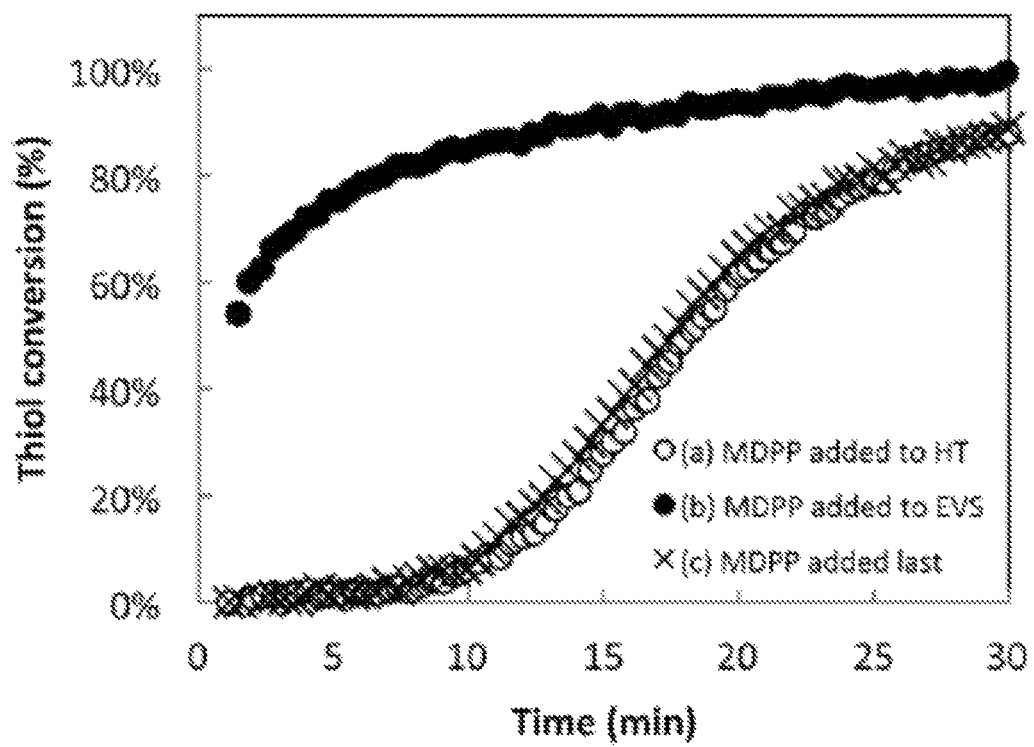
FIG. 3 is a graph illustrating the conversion as a function of time plots for [HT]:[EVS]:[MDPP]=0.5:0.5:0.0055 systems. (a) MDPP was added to HT, mixed for 15 min and then added to EVS to start the reaction (open circle). (b) MDPP was added to EVS, mixed for 15 min and then added to HT to start the reaction (filled circle). (c) MDPP was added to a mixture of HT and EVS to start the reaction (cross). Induction time was observed for (a) and (c). However, this induction time was dramatically decreased for (b), by allowing MDPP and EVS to react before adding HT.

As the initial step of a nucleophile-catalyzed reaction is one in which the nucleophile attacks the vinyl, the reaction kinetics are affected by adding a nucleophile to a vinyl prior to mixing of the other reactive components together. In order to perform a reaction that had an initiation mechanism that was less rapid than the DMPP mediated reaction, a less reactive phosphine, methyldiphenylphosphine (MDPP) was selected as the catalyst. Additionally, a solvent diethyleneglycol diethyl ether (DEGDE) was used to reduce the reactant concentrations. The time-conversion plot for [HT]:[EVS]:[MDPP]=0.5:0.5:0.0055 systems with DEGDE used as a solvent are shown in FIG. 3.

Interestingly, an induction time in the reaction was observed in two separate instances—(a) when MDPP was mixed with HT prior to the reaction (FIG. 3A), and (b) when all components were mixed at once to start the reaction (FIG. 3C). In contrast, this induction time was not observed when MDPP was added to EVS 15 minutes prior to the reaction (FIG. 3B). The induction time for a nucleophile-catalyzed thiol-Michael addition reaction has not been reported in previous studies. For example, Chan et al. have shown kinetic profiles of the thiol-Michael addition of 2.0 M hexanethiol and 2.0 M hexyl acrylate using either DMPP or MDPP as a catalyst with a concentration of 0.0004 mol %. However, the reaction rate using DMPP was very rapid and no induction time was reported whereas the reaction using MDPP was very slow and approximately 10% conversion was reported after 10 minutes of reaction (Chan et al., 2010, Macromol. 43:6381-6388). A possible reason as to why an induction time was not observed in previous studies could be that the reaction conditions under which the experiments were performed were insufficient to capture the initial induction time in the reaction.

Figure 4A:
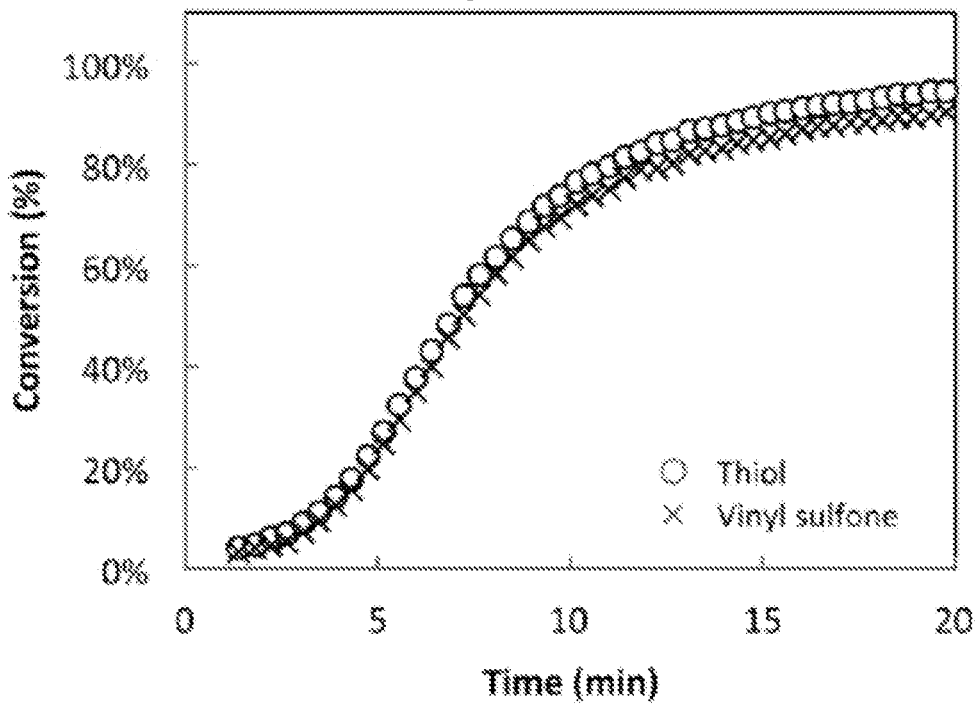
FIGS. 4A-4C, is a series of graphs illustrating conversion as a function of time plots for (FIG. 4A) [HT]:[EVS]:[MDPP]=1.0:1.0:0.0055, (FIG. 4B) [HT]:[EVS]:[MDPP]=1.0:2.0:0.0055 and (FIG. 4C) [HT]:[EVS]:[MDPP]=2.0:1.0:0.0055 systems. DEGDE was used as a solvent. Reaction rate almost doubled when [HT] or [EVS] was increased in a factor of 2 for FIGS. 4B-4C.

It was also observed that a mixture of MDPP and EVS gradually turned to a dark red color in 10 minutes, which implied that the formation of a zwitterion, responsible for the color change, was relatively slow. From these observations, it is likely that the first step of the reaction is indeed an attack of a nucleophile to an electron deficient vinyl, which must be a relatively slow reaction compared to the following relatively rapid anionic cycle. Furthermore, these results indicate that the nucleophilic catalysts should not be mixed together with the vinyl long before the thiol-Michael addition reaction is allowed to proceed, since the longer they are mixed together the more zwitterions are formed, which is essentially a by-product of the reaction and not a thiol-Michael addition product. The zwitterions are strong bases and could potentially start side reactions, and ideally, zwitterions should be formed in situ to achieve the highest conversion with minimal side reactions. To further verify this initial reaction step, experiments with different initial HT and EVS concentrations were performed (FIG. 4).

Figure 4B:
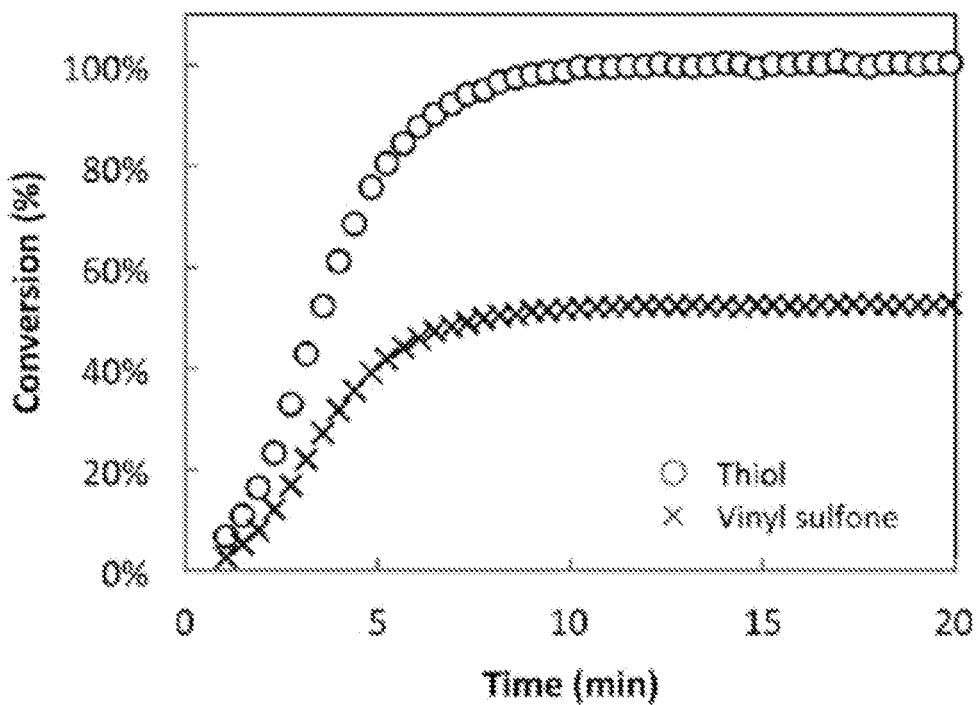
Figure 4C:
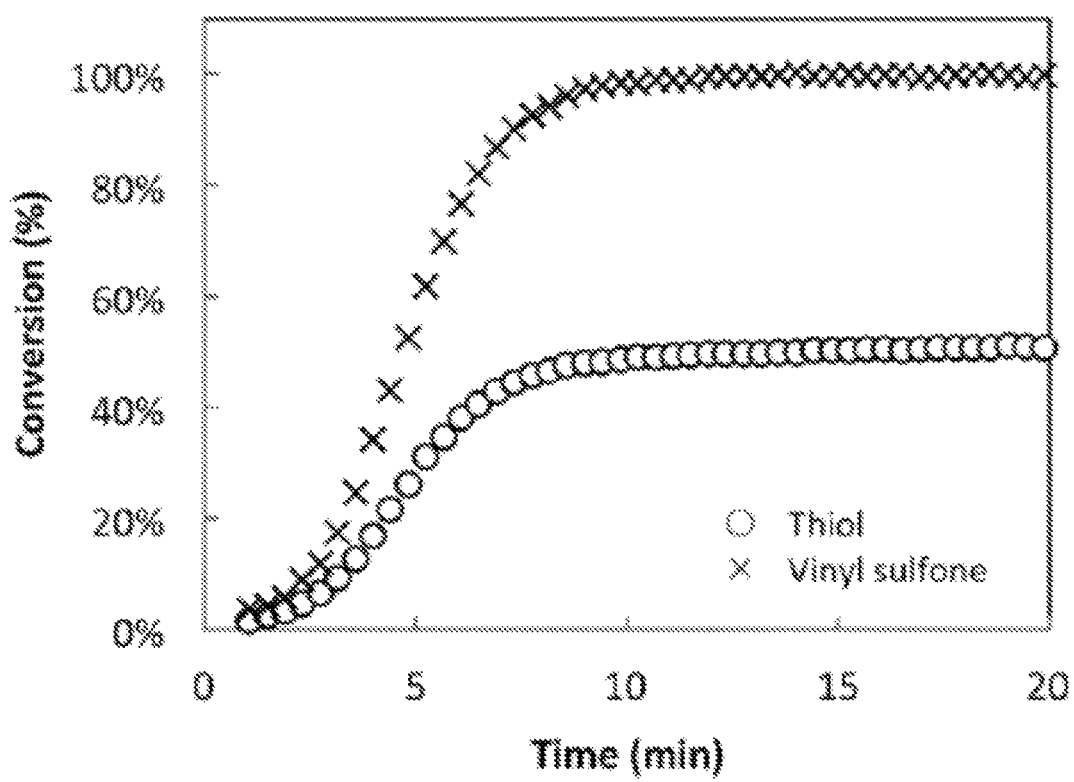

The reaction rate doubled when increasing either reactant concentration by a factor of 2 ((FIG. 4A) $2.2 \times 10^{-3}$ M s$^{-1}$, (FIG. 4B) $4.1 \times 10^{-3}$ M·s$^{-1}$, (FIG. 4C) $3.9 \times 10^{-3}$ M·s$^{-1}$). Therefore, this reaction appears to be first-order in both the HT and EVS concentrations. An induction time was observed under all reaction conditions, and by doubling EVS concentration, the induction time was decreased (FIG. 4B). However, doubling the HT concentration had a minimal effect on the induction time (FIG. 4C). These results imply that the initial step of the reaction, an attack of a nucleophile to an electron deficient vinyl, was accelerated by the higher concentration of EVS, again consistent with the proposed mechanism.

Next, the anionic cycle of the reaction was studied. The anionic cycle should be affected by protic species such as water and Brønsted acids as these protic species can then react with the intermediate enolate anion to prevent the anionic cycle from proceeding, which would be detrimental for a high reaction rate. To confirm this hypothesis, water and acid were each added to the reaction system, [HT]:[EVS]:[MDPP]=0.5:0.5:0.0055, to determine the effects on the reaction kinetics. Concentrations of water or acid used were almost 12 times larger than that of MDPP (i.e., approximately 0.06 M).

Figure 5:
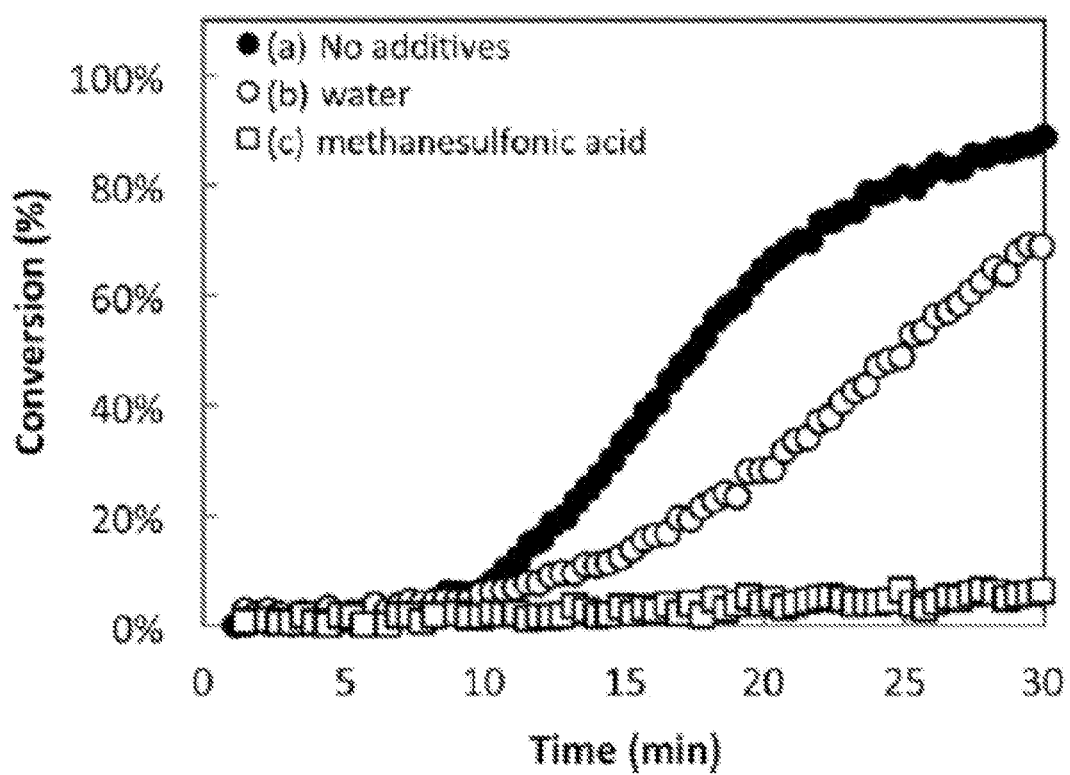
FIG. 5 is a graph illustrating conversion as a function of time plots for (a) [HT]:[EVS]:[MDPP]=0.5:0.5:0.0055 reaction mixture (filled circle) with an addition of (b) 0.064 M of water (open circle) and (c) 0.057 M of methanesulfonic acid (open square). An addition of water (b) decreased the reaction rate, while an addition of methanesulfonic acid (c) essentially prevented the reaction.

It was observed that both addition of water and acid affected the reaction (FIG. 5). The addition of water decreased the reaction rate with a corresponding marginal increase of the induction time (FIG. 5B), while the addition of acid almost completely stopped the reaction (FIG. 5C). This observation could be explained by the protonation of either a zwitterion or an intermediate enolate anion ($pK_a$~25). Protonation by water ($pK_a$~15.7) results in the simultaneous formation of hydroxide ions, which are still capable, though with reduced reactivity, of acting as a base catalyst since the $pK_a$ of HT is approximately 10.7. However, the reaction rate would be lowered as the $pK_a$ of water is significantly lower than that of an enolate anion, which implies that the reaction would still be more likely to follow a base-catalyzed mechanism as opposed to a nucleophilic Michael addition pathway. On the other hand, protonation by methanesulfonic acid ($pK_a$~−2) results in the formation of the methanesulfonate ion, which is not sufficiently basic to promote any additional reaction.

The ability of the nucleophilic Michael addition reaction to proceed to high conversions in an efficient manner with relatively low concentrations of the catalyst is one of the advantages for using a nucleophile as a thiol-Michael addition reaction catalyst. However, the existence of protic species other than a thiol would strongly affect the reaction rate and even stop the reaction under extreme conditions. The observation of an induction time, as well as the observed variability in reactivity in the Michael addition reactions, might be due to the presence of trace levels of protic species that were contained in the initial monomer mix as impurities.

Figure 6A:
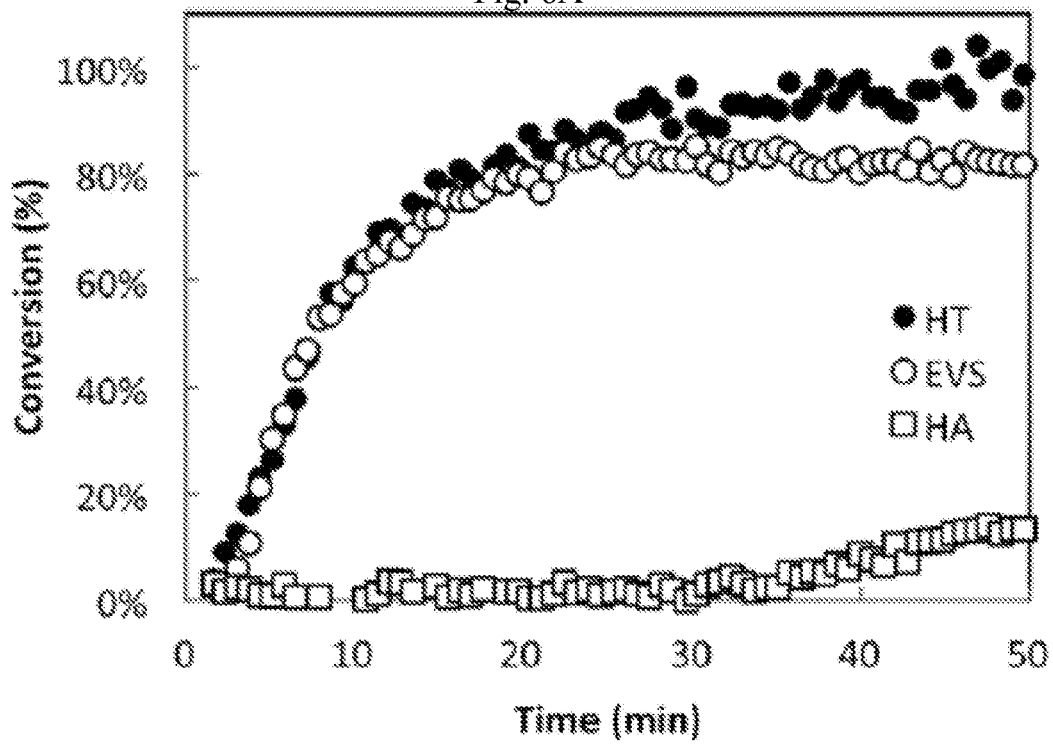
FIGS. 6A-6B, is a series of graphs illustrating conversion as a function of time plots for (FIG. 6A) HT:EVS:HA=1:1:1 molar ratio mixture with 0.05 wt % MDPP as a catalyst and (FIG. 6B) HT:EVS:HA=2:1:1 molar ratio mixture with 0.05 wt % MDPP as a catalyst. Each plot corresponds to conversion of HT (filled circle), EVS (open circle) and HA (filled square).
Figure 6B:
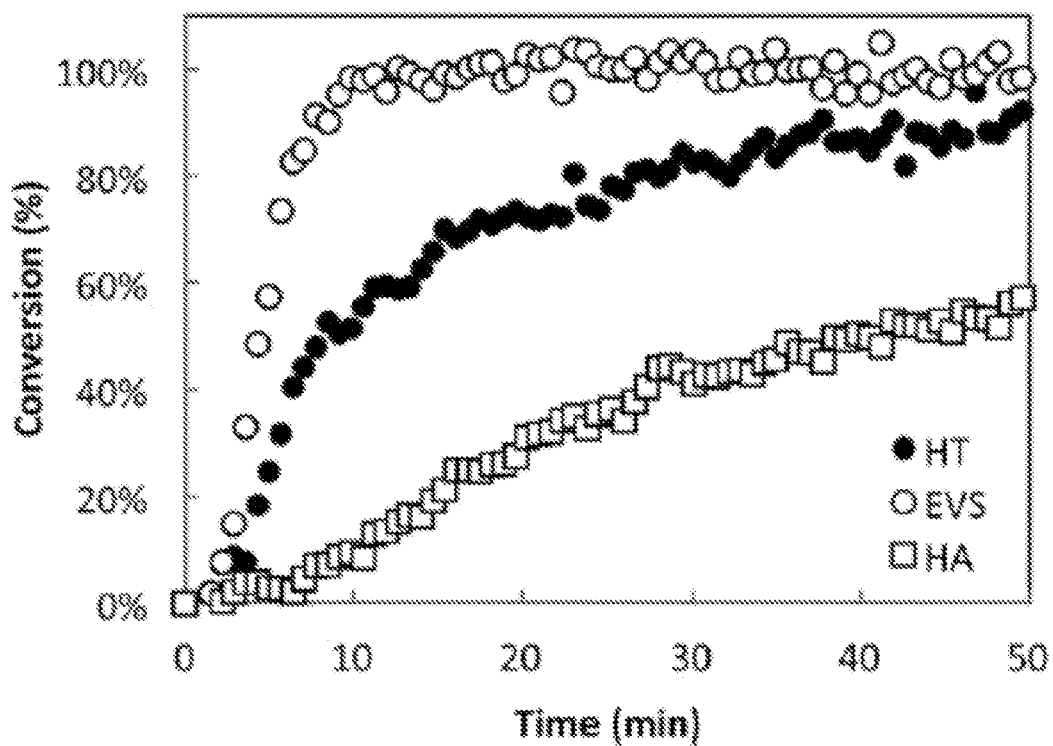

High selectivity of one functional group over another in a particular reaction is very useful in formulating a system that has several potentially reactive functional groups or for implementing multistage, one pot reactions. Since vinyl sulfones have relatively high reactivity as compared to acrylates in the thiol-Michael addition reaction, a nucleophile-catalyzed thiol-Michael addition reaction using one thiol and two different vinyls was studied. A vinyl sulfone and an acrylate in the same mixture were used to observe if a vinyl sulfone could be reacted preferentially over an acrylate to accomplish a selective thiol-Michael addition reaction. A nucleophilic catalyst, MDPP was used and was not mixed in with the vinyl reactants prior to the thiol-Michael addition reaction to eliminate the possibility of any side reactions from occurring. No solvent was used in the reaction mix to minimize the amount of initial protic species that could affect the reaction. Two different stoichiometric ratios of thiols, vinyl sulfones and acrylates were examined, in which the relative reactants were thiol:vinyl sulfone:acrylate=1:1:1 and 2:1:1 as illustrated in FIGS. 6A and 6B, respectively.

The vinyl sulfones are found to react almost exclusively with thiols even in the presence of acrylates in the system. When a mixture of thiol:vinyl sulfone:acrylate at a ratio of 1:1:1 was reacted, the conversion of vinyl sulfone was 80% after 20 minutes whereas there was almost no conversion of acrylates observed. $^1$H NMR results taken after the depletion of thiols show that approx. 90% of vinyl sulfone ($\delta$=6.67-6.58, 6.48-6.43, 6.21-6.18) and 10% of acrylate ($\delta$=6.43-6.37, 6.17-6.08, 5.83-5.79) were reacted under these reaction conditions (FIG. 6A). When a mixture of thiol:vinyl sulfone:acrylate in the ratio of 2:1:1 was reacted, the conversion of EVS reached 100% after 10 minutes (FIG. 6B). The final conversions calculated from $^1$H NMR after 2.5 hours of reaction were 100% and 80% for vinyl sulfone and acrylate, respectively. Reaction rate of EVS to HT was approximately 7 times higher than that of HA. These results imply that, in spite of the high reactivity of both vinyl sulfone and acrylate towards thiol-Michael addition reaction, high selectivity between these two species is achievable as the vinyl sulfone is significantly more reactive than the acrylate. This result can be used to implement the selective functionalization of molecules that have both vinyl sulfone and acrylate moieties, by preferential crosslinking of a network that bears both moieties, or to design dual cure systems in which vinyl sulfones can react with thiols preferentially, before the acrylates can be reacted in a subsequent polymerization step.

High selectivity of the vinyl sulfone over the acrylate was utilized to control the gelation behavior of a crosslinking polymer network. The gel point conversion for a step-growth polymerization between two monomers with degrees of functionality $f_A$ and $f_B$ is predicted by the Flory-Stockmayer equation (equation (1)), where $P_{gel}$ is the gel point conversion and r is the stoichiometric ratio of the two functional groups.

$$P_{gel} = \frac{1}{\sqrt{r(f_A - 1)(f_B - 1)}} \quad (1)$$

In a system in which the monomer A is a thiol and monomer B is a vinyl, gelation behavior is expected to be much different for the following two systems—(a) monomer B being a mixture of multifunctional and monofunctional acrylate, and (b) monomer B being a mixture of multifunctional vinyl sulfone and monofunctional acrylate. Differences in the polymer network evolution are expected to occur due to the high selectivity of vinyl sulfone over acrylate. Several formulations using a tetrafunctional thiol (PETMP), a bifunctional vinyl (either DVS or HDDA) and a monofunctional acrylate (EGMEA) were reacted to determine their gelation behavior and assess whether the difference in reactivity could be used to control the molecular weight evolution and gelation behavior (Table 2).

TABLE 2

Calculated r, $f_B$ and $P_{gel}$ values and gelation behaviors of PETMP:HDDA (or DVS):EGMEA systems

| Molar ratio of monomers | | | | | | Gelation | |
|---|---|---|---|---|---|---|---|
| PETMP | HDDA or DVS | EGMEA | r | $f_B$ | $P_{gel}$ | HDDA | DVS |
| 1 | 3 | 0 | 0.67 | 2.00 | 0.71 | Yes | Yes |
| 1 | 3 | 1 | 0.57 | 1.86 | 0.82 | No | Yes |
| 1 | 3 | 2 | 0.50 | 1.75 | 0.94 | No | Yes |
| 1 | 3 | 3 | 0.44 | 1.67 | 1.06 | No | Yes |

First, PETMP:HDDA:EGMEA systems with the monomer ratios of 1:3:0, 1:3:1, 1:3:2 and 1:3:3 (in other words, the functional group ratios of 4:6:0, 4:6:1, 4:6:2 and 4:6:3) were reacted using 0.1 wt % MDPP as a catalyst and left overnight to allow complete reaction to be achieved. Presuming that all acrylates have the same reactivity, $P_{gel}$ was calculated as 0.71, 0.82, 0.94 and 1.06, respectively. Experimental results showed that only the 1:3:0 system formed a gel, which was possibly due to the known underestimation of $P_{gel}$ from the Flory-Stockmayer equation, and also due to the actual conversion not achieving 100%. As could be seen from this result, increasing the amount of a monofunctional monomer leads to a decrease of both r and $f_B$, thus eventually preventing the system from gelation. However, PETMP:DVS:EGMEA systems with the same monomer ratios as above exhibited completely different gelation behavior. All monomer ratios ranging from 1:3:0 to 1:3:3 formed a gel. This result is attributed to the high reactive selectivity of the vinyl sulfone over the acrylate, which causes the difference in the observed $P_{gel}$ between PETMP:DVS:EGMEA and PETMP:HDDA:EGMEA systems since the vinyl sulfone and the acrylate do not have the same reactivity. Schematic illustrations of these two reactive systems are illustrated in FIG. 7. In the case of PETMP:DVS:EGMEA=1:3:3 (FIG. 7B), addition of a monofunctional acrylate does not significantly impact the gelation behavior since the thiols predominantly have reacted with vinyl sulfones. Delayed gelation could also be achieved by using a combination of multifunctional acrylate and a monofunctional vinyl sulfone. Thus, combinations of vinyl sulfone and acrylate can be used to control gelation behavior in crosslinked polymer networks formed by thiol-Michael addition reactions. This result represent just one of the many examples which take advantage of the nearly orthogonal reaction systems which include several functional groups simultaneously present within a single reacting system.

The result presented herein indicate the high reactivity and selectivity of vinyl sulfone in a nucleophile-catalyzed thiol-Michael addition reaction in which both vinyl sulfones and acrylate are present. The conditions under which a thiol-Michael addition reaction between thiols and vinyl sulfones can be used as a click reaction have been studied. The presence of anionic species has been shown to be key to the nucleophile-catalyzed reaction, as the presence of competing protic species other than a thiol strongly impacts the reaction kinetics and in extreme cases, inhibits the Michael addition reaction. The high reactivity and selectivity of vinyl sulfones, together with the hydrolytically and thermally stable thioether sulfone bond formation indicate that reactions between thiols and the vinyl sulfones are a powerful tool to implement in synthetic and polymer chemistry to obtain molecules and polymers with distinct functionality and properties.

Example 2

Temporal Control of Thiol-Click Chemistry

As discussed elsewhere herein, the nucleophile mediated thiol-Michael addition reaction has an induction time, as evidenced by using low nucleophile concentration. Also, a presence of protic species showed a large impact on reaction kinetics and slowed down or even stopped the reaction. In one embodiment, it should be possible to control the duration of an induction time by using a combination of nucleophile mediated mechanism and a proton inhibition by using appropriate concentrations of each species.

Firstly, a reaction between trimethylolpropane tetrakis(3-mercapto propionate) (TMPTMP) and ethyl vinyl sulfone (EVS) was chosen to test this hypothesis. Initial studies with dimethylphenylphosphine (DMPP, $pK_a=6$) and methyldiphenylphosphine (MDPP, $pK_a=4$) as nucleophilic species, with methanesulfonic acid (MsOH, $pK_a=-2$) as an acid reagent lead to almost no control of the reaction, either instantaneous reaction or no observable reaction depending on the amount of MsOH added. These observations were attributed to extremely high nucleophilicities of DMPP and MDPP, which could catalyze the reaction almost instantaneously even with a concentration less than 0.05 mol %. A slight excess of acid to nucleophile molar ratio lead to protonation of most phosphines and stopped the reaction, whereas a slight deficiency in the ratio lead to instant reaction by remaining unprotonated nucleophiles. Therefore, less nucleophilic triphenylphosphine (TPP, $pK_a=2$) was considered.

Figure 8A:
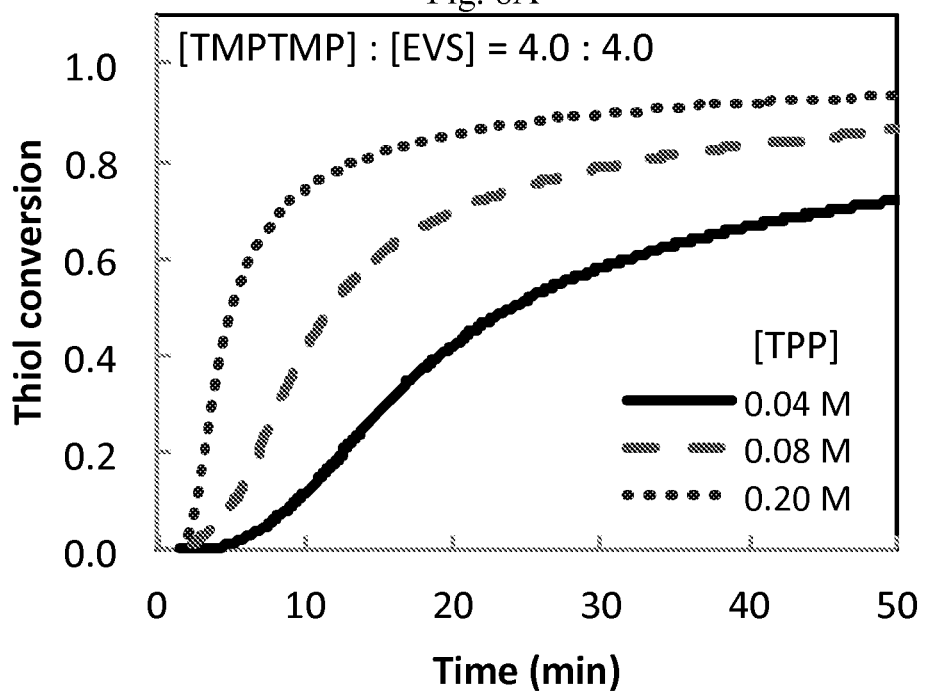
FIGS. 8A-8B, is a series of graphs illustrating conversion as a function of time plots for (FIG. 8A) [TMPTMP]:[EVS]=4.0:4.0 systems with 0.04, 0.08 and 0.20 M of TPP, (FIG. 8B) [TMPTMP]:[EVS]:[TPP]=4.0:4.0:0.20 systems with 0.010, 0.022 and 0.041 M of MsOH. Diethyleneglycol diethylether was used as a solvent for all systems.
Figure 8B:
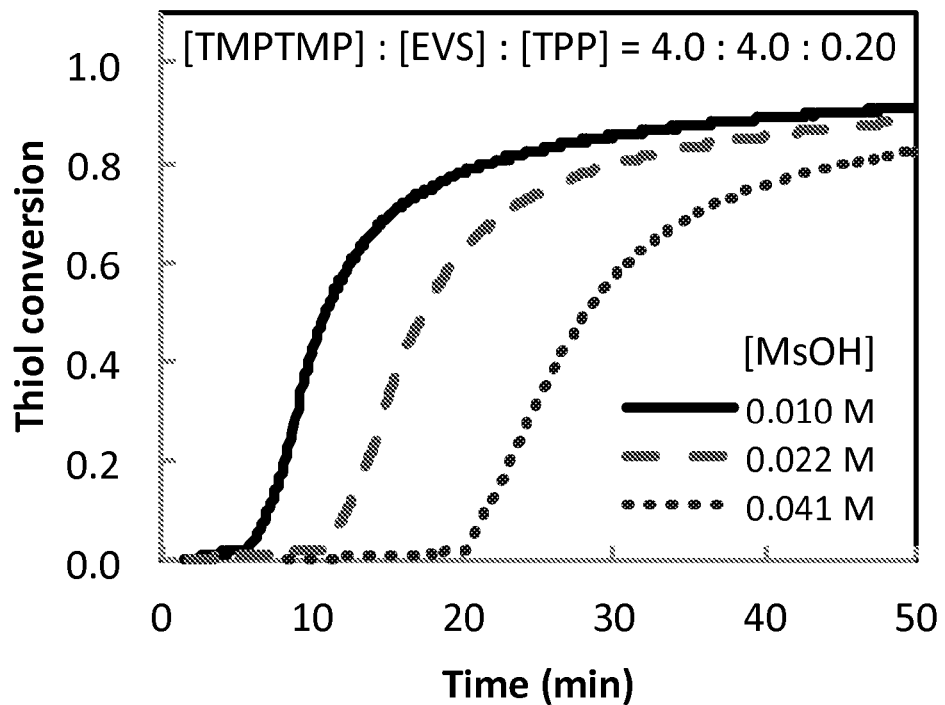
Figure 10A:
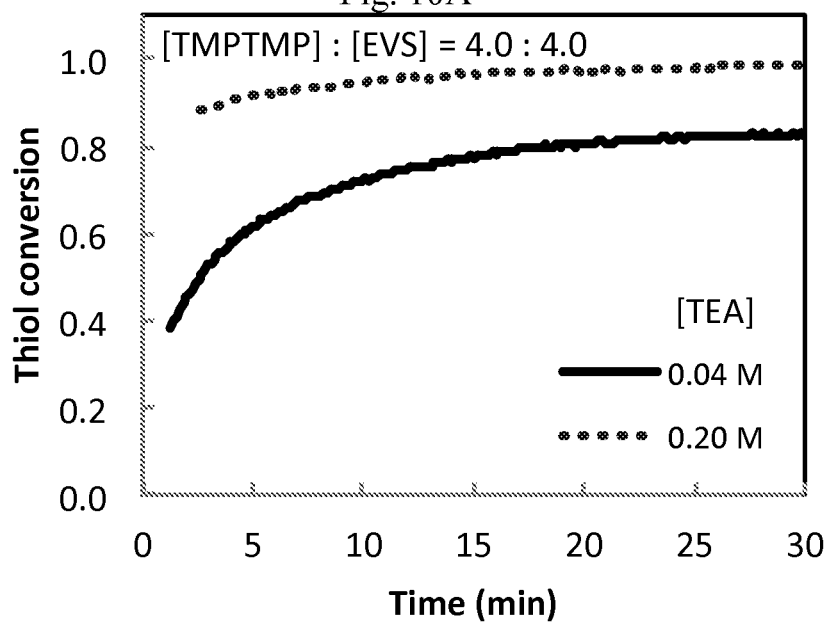
FIGS. 10A-10B, is a series of graphs illustrating conversion as a function of time plots for (FIG. 10A) [TMPTMP]:[EVS]=4.0:4.0 systems with 0.04 and 0.20 M of TEA, (FIG. 10B) [TMPTMP]:[EVS]:[TEA]=4.0:4.0.
Figure 10B:
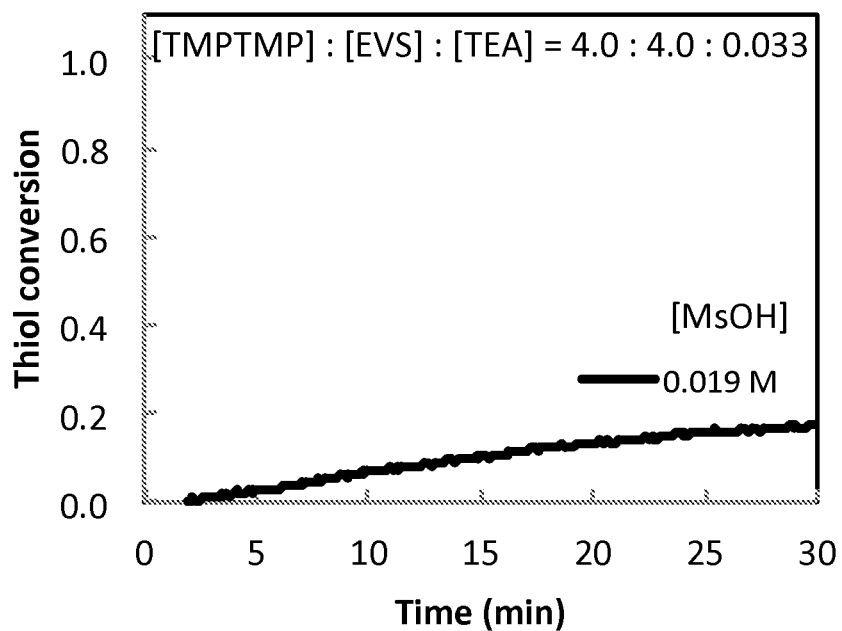

FIG. 8 illustrates the kinetic profiles of TPP mediated reaction of TMPTMP and EVS. The reaction was easily controlled in order of minutes by using moderate concentrations of TPP (0.04-0.20 M). FIG. 8B shows the kinetic profiles of the same reaction using 0.20 M TPP and various concentrations of MsOH (0.010-0.041 M). Induction times were clearly observed in all systems varying from 5 to 20 minutes, and there was a direct correlation between MsOH concentration and induction time duration. Another interesting aspect of this catalyst system was that even though there are considerable amount of induction time, the rate of reaction was comparable to that of no MsOH system once the reaction was initiated. This kind of kinetic behavior could not be observed using a combination of base (triethylamine, TEA) and MsOH, in which an addition of MsOH just lead to decrease of the rate of the reaction and does not generate any induction time (FIG. 10). Kinetic studies with various amounts of TPP and MsOH revealed that induction time and the rate of thiol-Michael addition reaction could be easily tuned by the concentration of both species (FIG. 11).

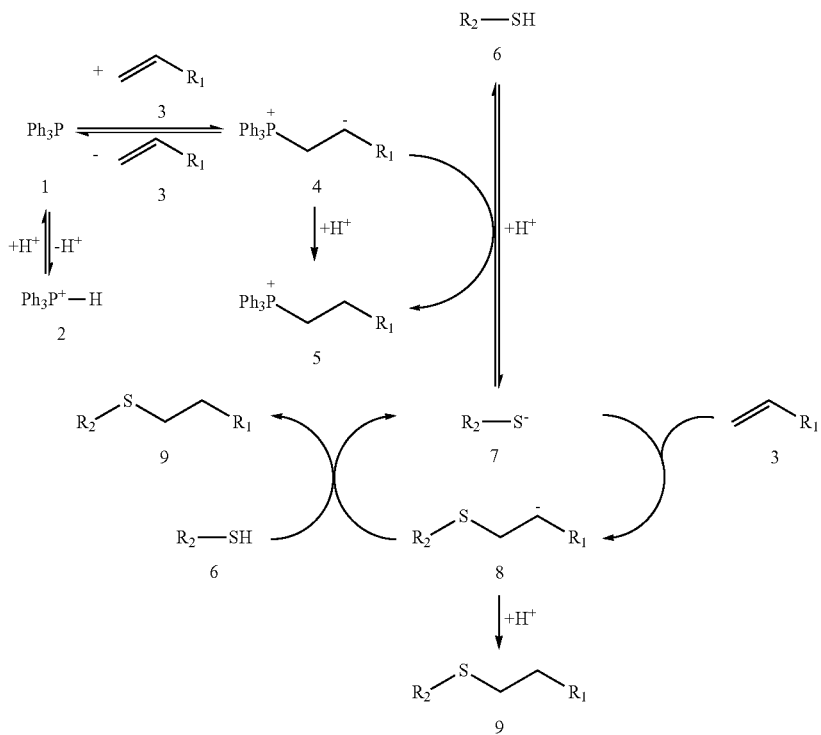

Scheme 2. Proposed mechanism of thiol-Michael addition reaction with an induction time.

Figure 12:
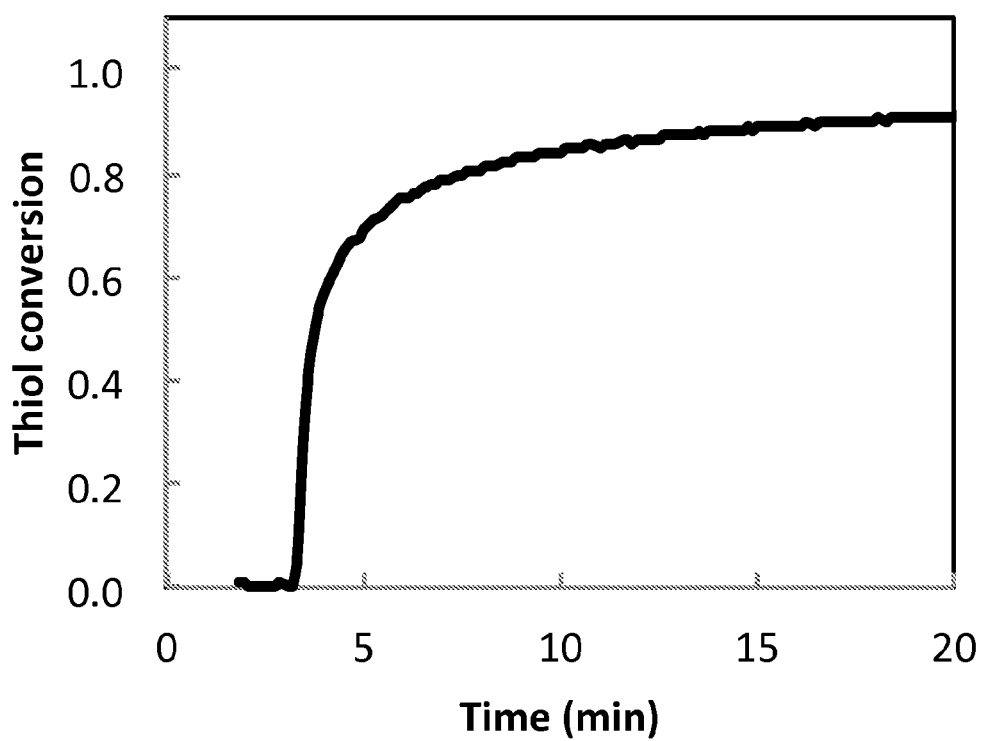
FIG. 12 is a graph illustrating conversion as a function of time plot for a reaction between TMPTMP and DVS. Thiol to vinyl sulfone ratio was 1 (stoichiometry). 1.0 wt % TPP and 0.3 wt % MsOH were used. Almost no viscosity change was observed until 3 minutes after mixing all reagents together. Extremely rapid polymerization occurred after 3 minutes to form a crosslinked polymer, which could be clearly observed from the kinetic profile.

Generation of induction time was also confirmed in a crosslinking system, using TMPTMP and divinyl sulfone (DVS). Thiol-Michael addition reaction did not start until 3 minutes after mixing, when the thiol conversion rapidly increased up to 80% in next 5 minutes (FIG. 12). This behavior is extremely useful for processing crosslinking systems and provides sufficient time for coating, casting and molding liquid monomers without sacrificing the efficiency of the reaction.

Figure 13A:
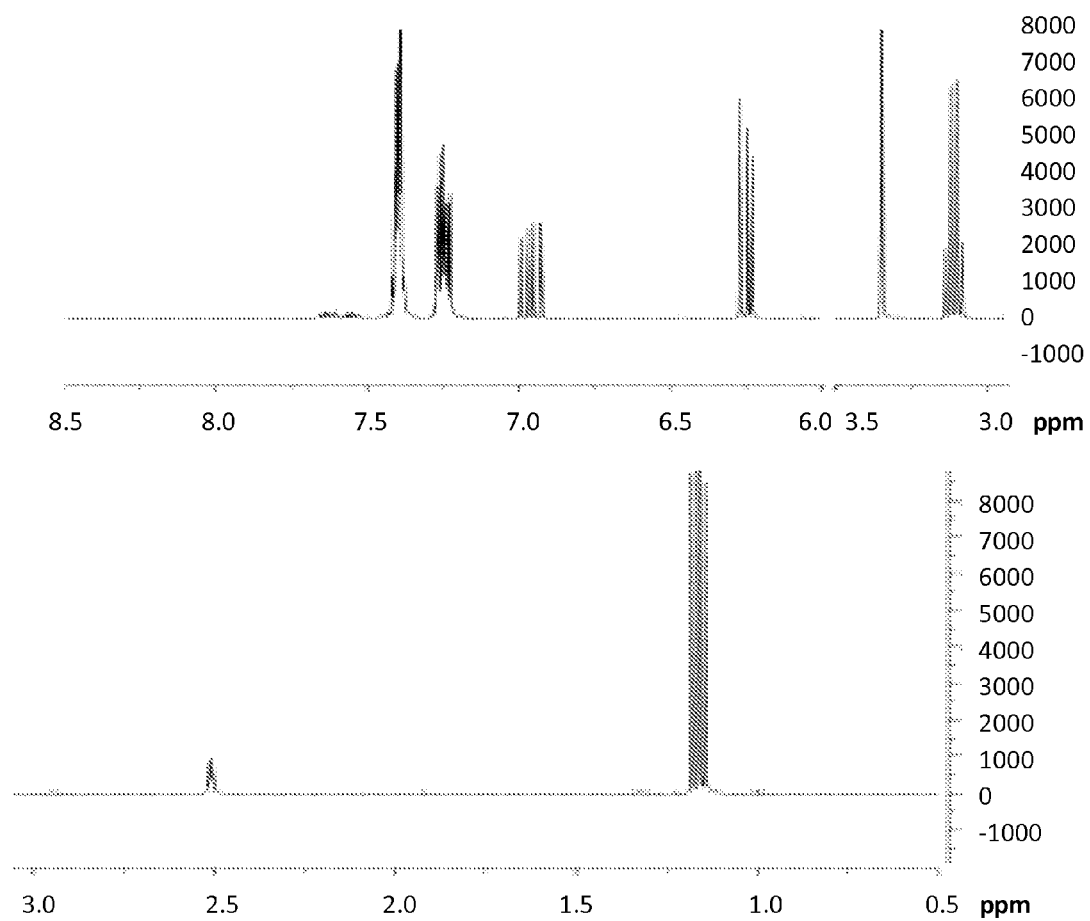
FIGS. 13A-13B, is a series of $^1$H NMR spectra for (FIG. 13A) [EVS]:[TPP]=0.1:0.1 in DMSO-$d_6$ after 14 hours of reaction and (FIG. 13B) [EVS]:[DMPP]=0.1:0.1 in DMSO-$d_6$ after 14 hours of reaction.
Figure 13B:
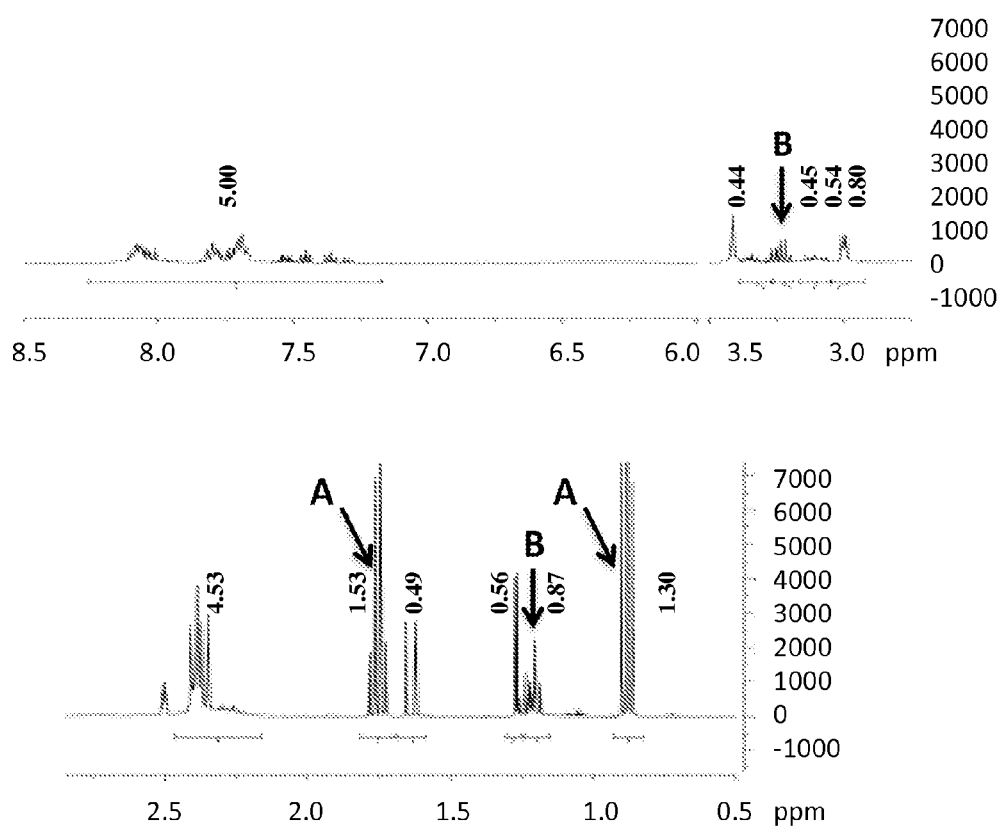

Scheme 2 illustrates the proposed mechanism of the generation of an induction time. First of all, MsOH reacts with TPP 1 and forms a conjugated acid 2. This results in a decrease of TPP 1 and consequently reduces the rate of zwitterion 4 formation. Another role of acid is to inhibit the whole process by protonating active anionic intermediates throughout the reaction cycle. Zwitterion 4, thiolate anion 7 and thiol-Michael reaction intermediate 8 are all much more basic compared to MsOH or conjugate acid 2, which mean that they could easily get protonated to 5, 6 and 9, respectively. These protonation reactions functions to inhibit the anionic cycle of thiol-Michael addition reaction, thus, leading to almost no reaction conversion until most acid have got depleted. Moderate nucleophilicity of TPP 1 is also important, since it does not generate zwitterion 4 instantly and allows acids to be consumed in an order of minutes. To further clarify the rate of nucleophilic attack between TPP and EVS, $^1$H and $^{31}$P NMR were conducted using a mixture of 0.1 M EVS and 0.1 M TPP in DMSO-$d_6$. No formation of zwitterion was observed even after 10 hours (FIG. 13), however, DMPP under same condition lead to full conversion of EVS (FIG. 13). In the presence of MsOH with higher TPP concentration, EVS eventually reached full conversion after 1 week of reaction, which supports that TPP could act as a nucleophile although its reaction rate between vinyl group is very low. Generation of induction time was successfully reproduced by solving the kinetic equations derived from this proposed mechanism with estimation of kinetic constants (FIGS. 14-15).

Figure 16:
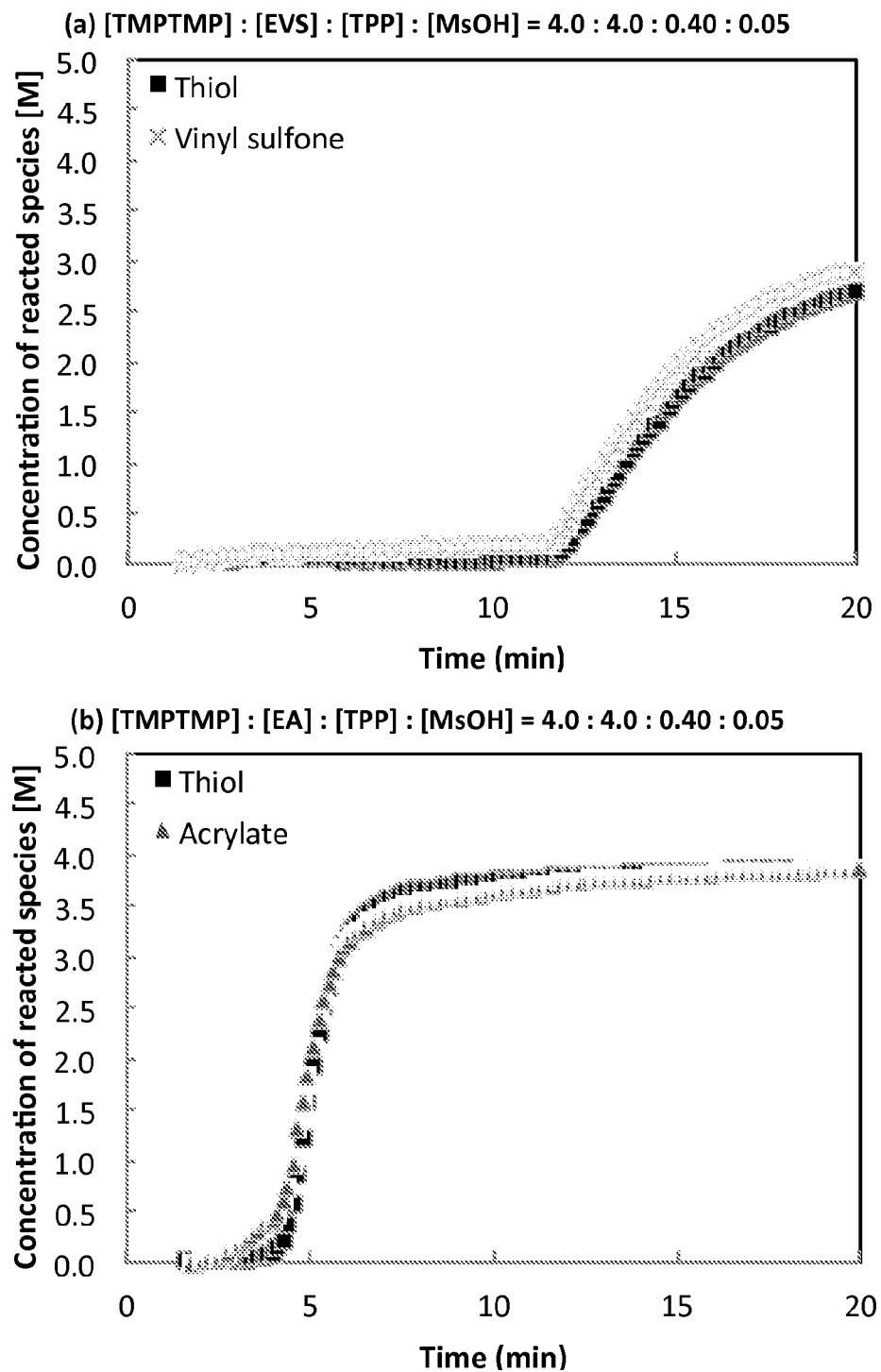
FIG. 16 is a series of graphs illustrating conversion as a function of time plot for (a) [TMPTMP]:[EVS]:[TPP]:[MsOH]=4.0:4.0:0.40:0.05 system and (b) [TMPTMP]:[EA]:[TPP]:[MsOH]=4.0:4.0:0.40:0.05 system. Unexpectedly, acrylate showed much shorter induction time and higher reaction rate.
Figure 17A:
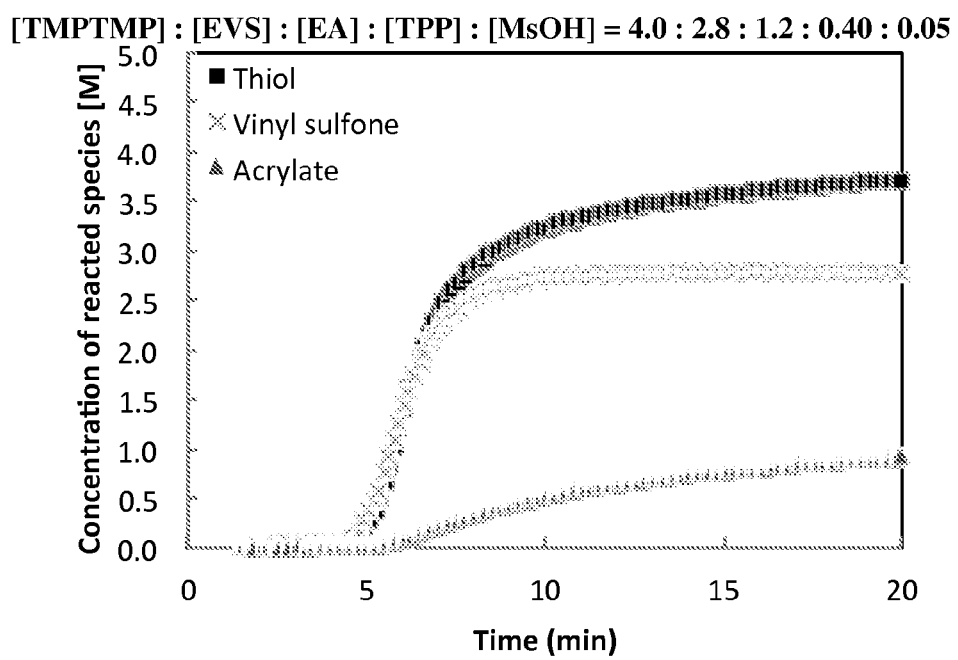
FIGS. 17A-17C, is a series of graphs illustrating conversion as a function of time plot for (FIG. 17A) [TMPTMP]:[EVS]:[EA]:[TPP]:[MsOH]=4.0:2.8:1.2:0.40:0.05 system, (FIG. 17B) [TMPTMP]:[EVS]:[EA]:[TPP]:[MsOH]=4.0:2.0:2.0:0.40:0.05 system and (FIG. 17C) [TMPTMP]:[EA]:[TPP]:[MsOH]=4.0:1.2:2.8:0.40:0.05 system. Vinyl sulfones reacted much faster than acrylate in all systems.
Figure 17B:
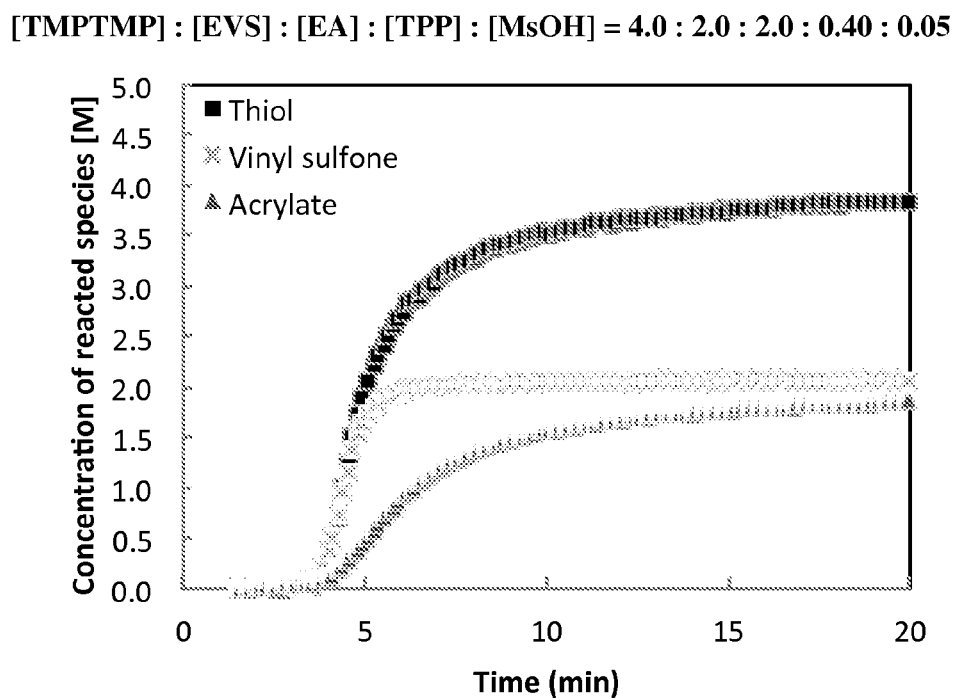
Figure 17C:
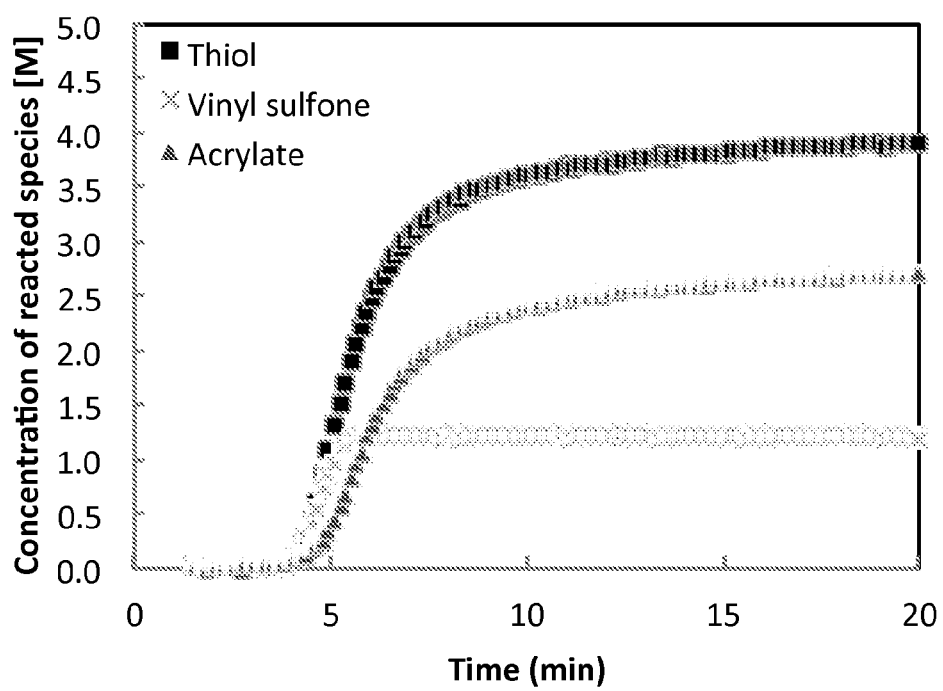
Figure 18:
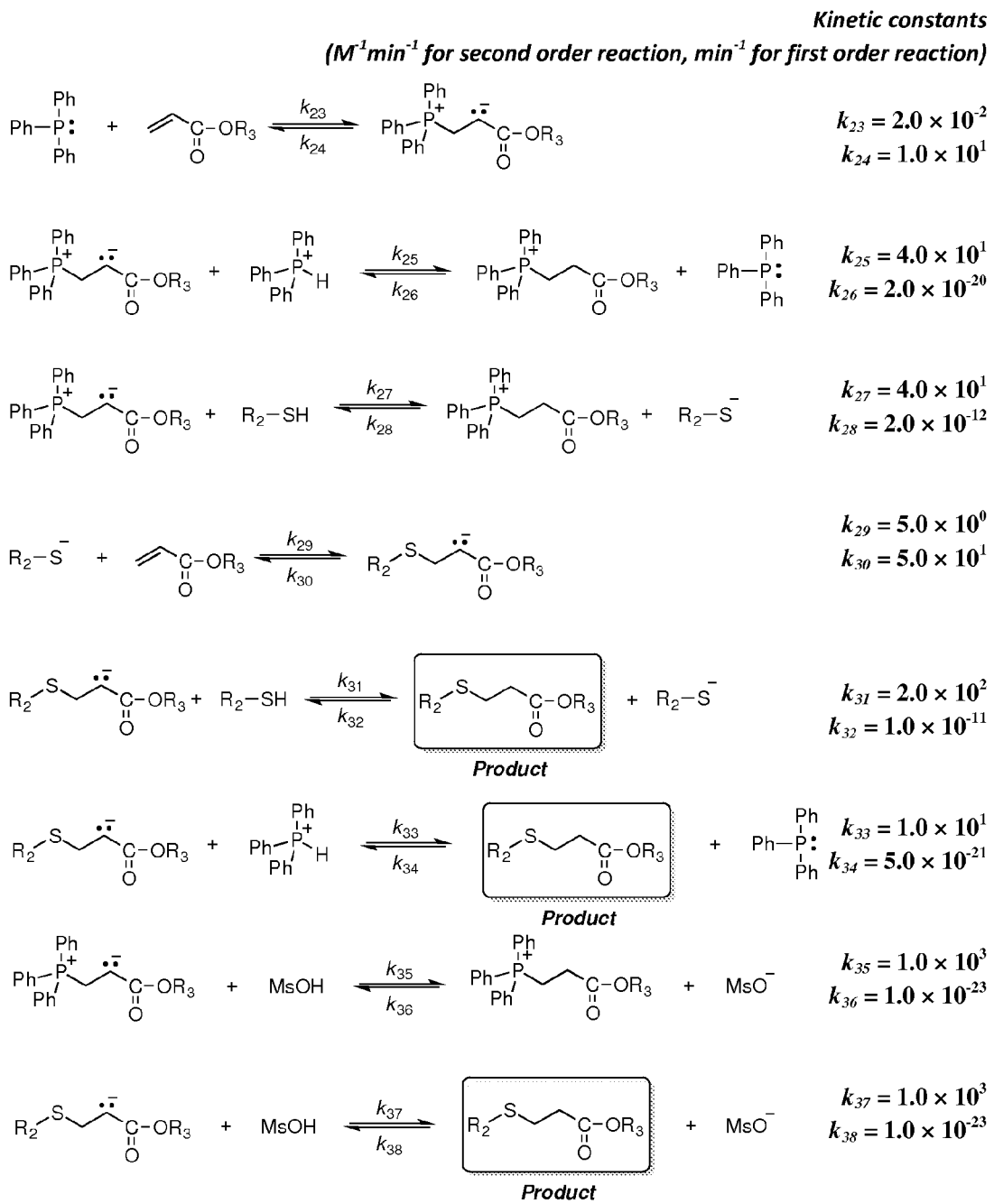
FIG. 18 illustrates chemical equations and kinetic constants that are added to the equations and values shown in FIG. 10 for modeling thiol:vinyl sulfone:acrylate:TPP:MsOH systems.
Figure 19B:
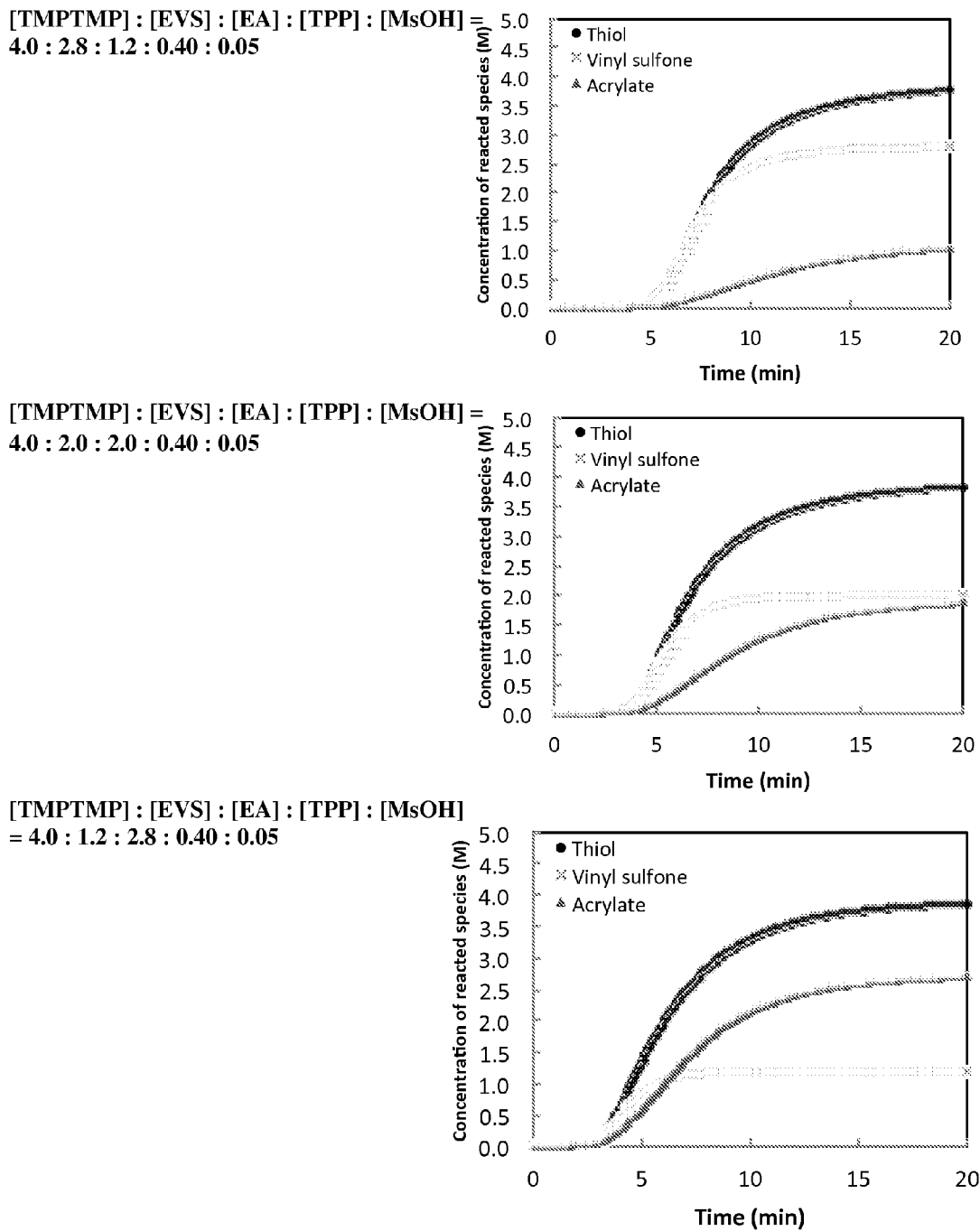
Figure 21:
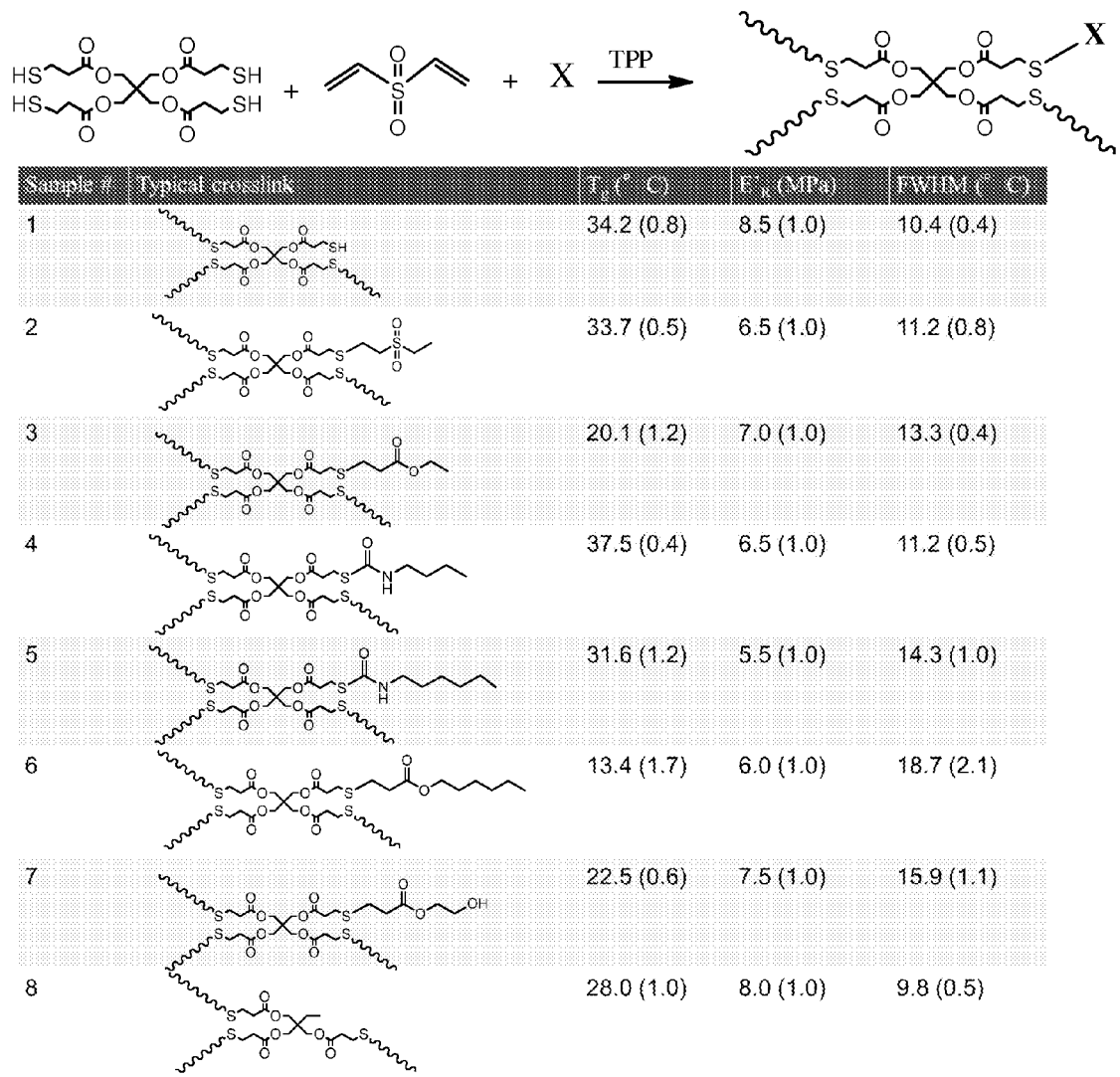
FIG. 21 is a table illustrating thiol-vinyl sulfone networks with different pendant functionalities. The systems comprised 3 moles PETMP, 3 moles DVS and 2 moles of X, wherein X is a thiol, EVS (ethyl vinyl sulfone), EA (ethyl acrylate), BI (butyl isocyanate), HI (hexyl isocyanate), HA (hexyl acrylate), and HEA (hydroxyethyl acrylate). The control system was 2 moles TMPTMP/3 moles DVS; Initiator: 1.5 wt. % triphenylphosphine (TPP). Mechanical properties of thiol-vinyl sulfone networks were enhanced by introducing functional groups capable of secondary interactions (Sample No. 4-5). Aliphatic hydrocarbon moieties and flexible ester functionalities generally deteriorated the mechanical properties (Sample Nos. 2, 5-7).
Figure 25:
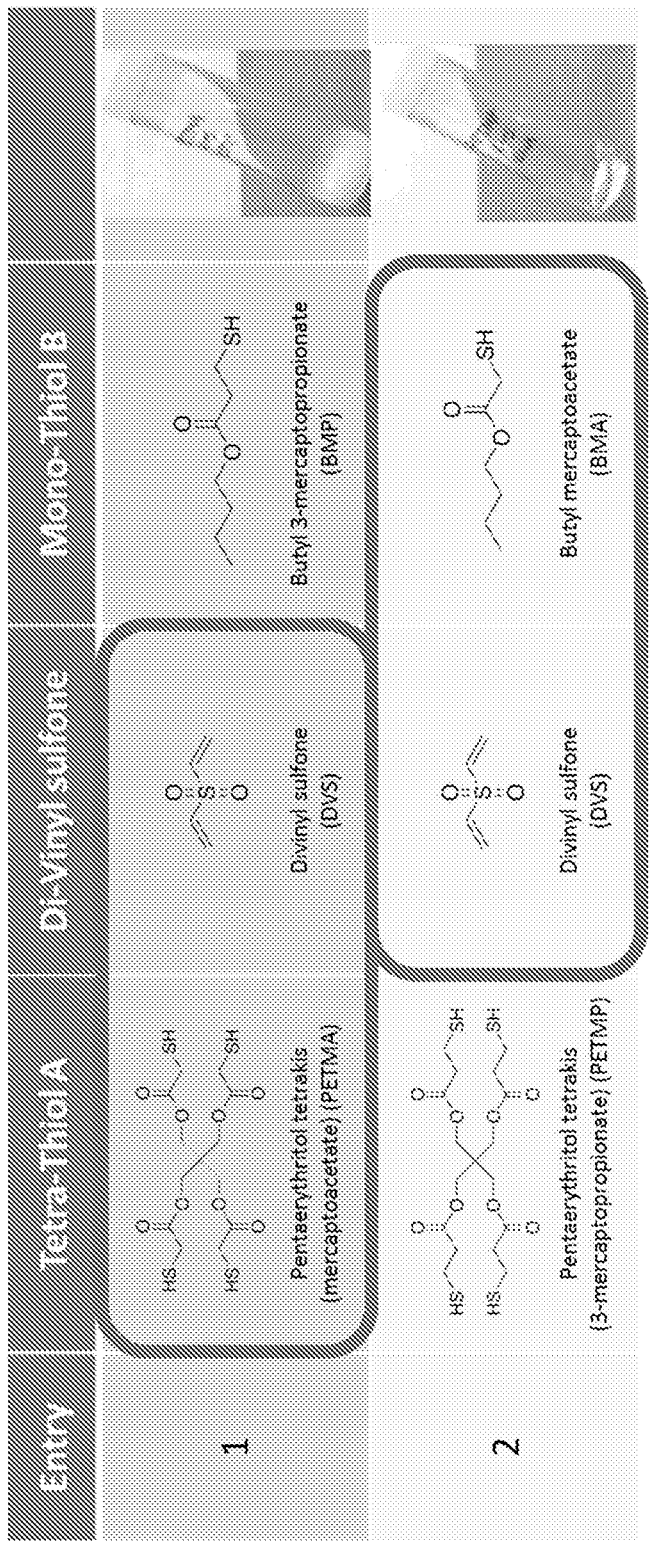
FIG. 25 is a table illustrating selective thiol-Michael addition reaction. Tetra-Thiol A:Di-Vinyl sulfone:Mono-Thiol B=1:1:1 (1 wt % TPP). Good selectivity between MA and MP was observed even in neat reaction conditions.
Figure 26A:
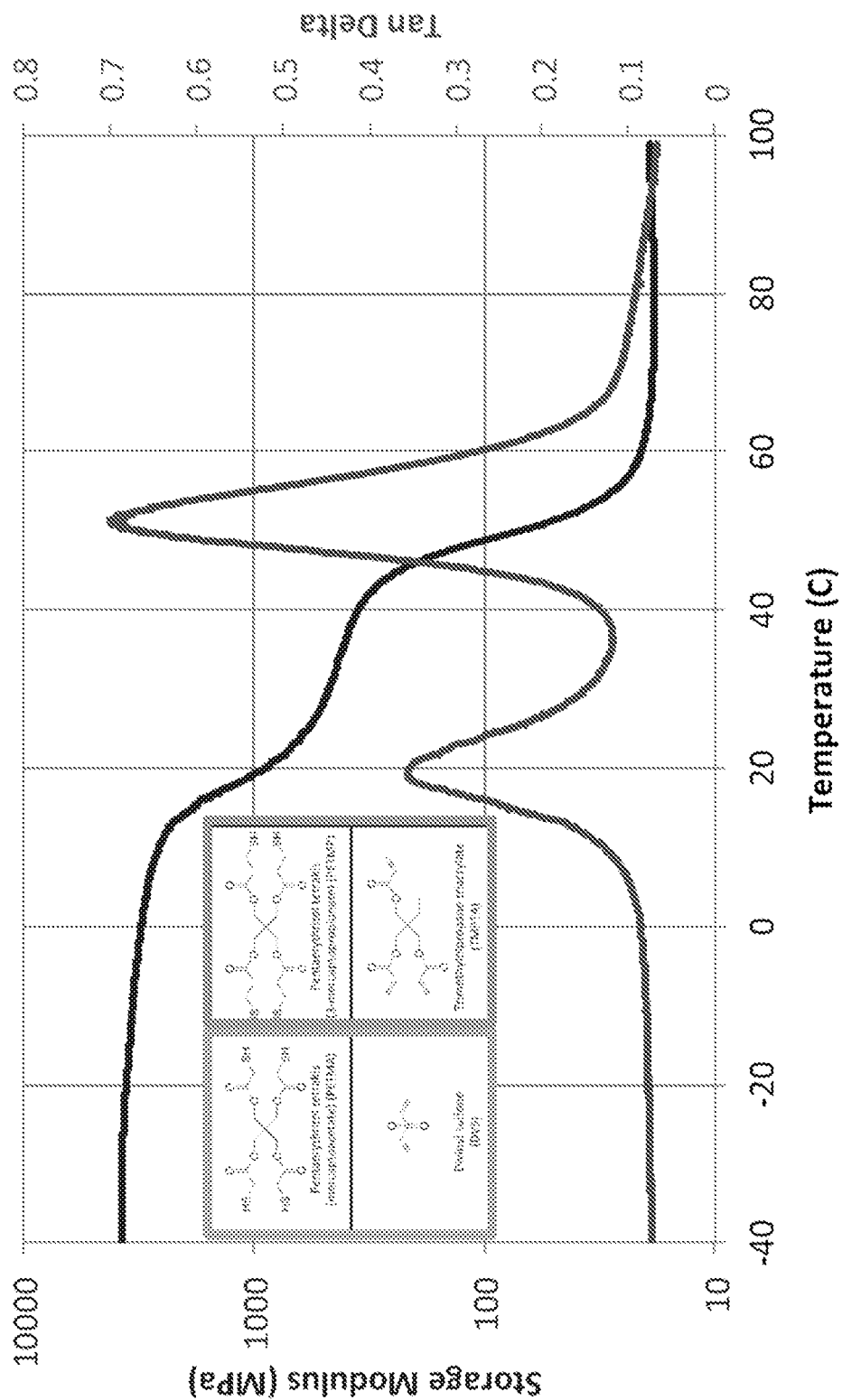
Figure 27:
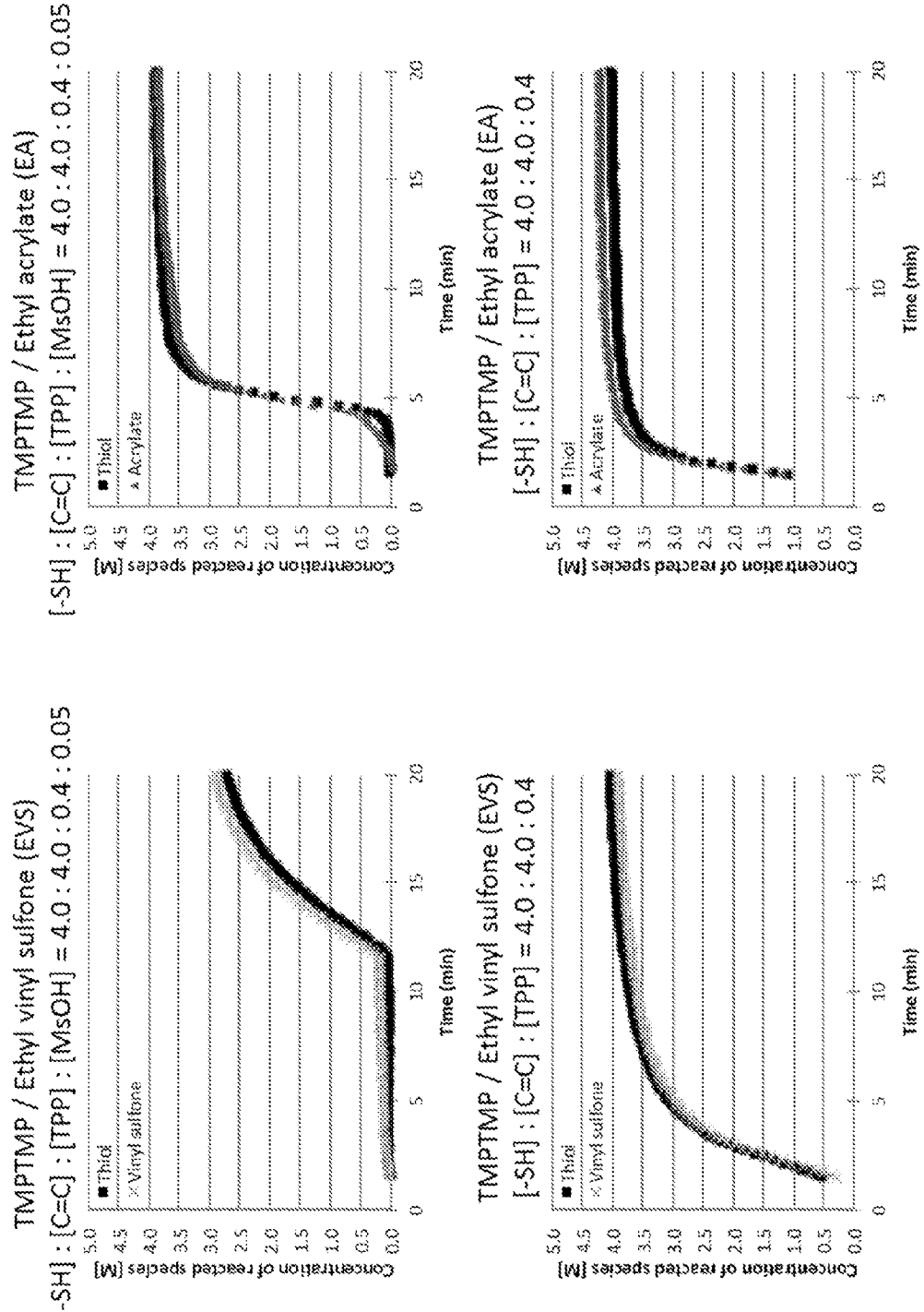
FIG. 27 is a series of graphs illustrating TPP mediated reaction with vinyl sulfones or acrylates. [Thiol]:[Alkene]:[TPP]:([MsOH]) in diethyleneglycol diethyl ether (DEGDE).
Figure 29:
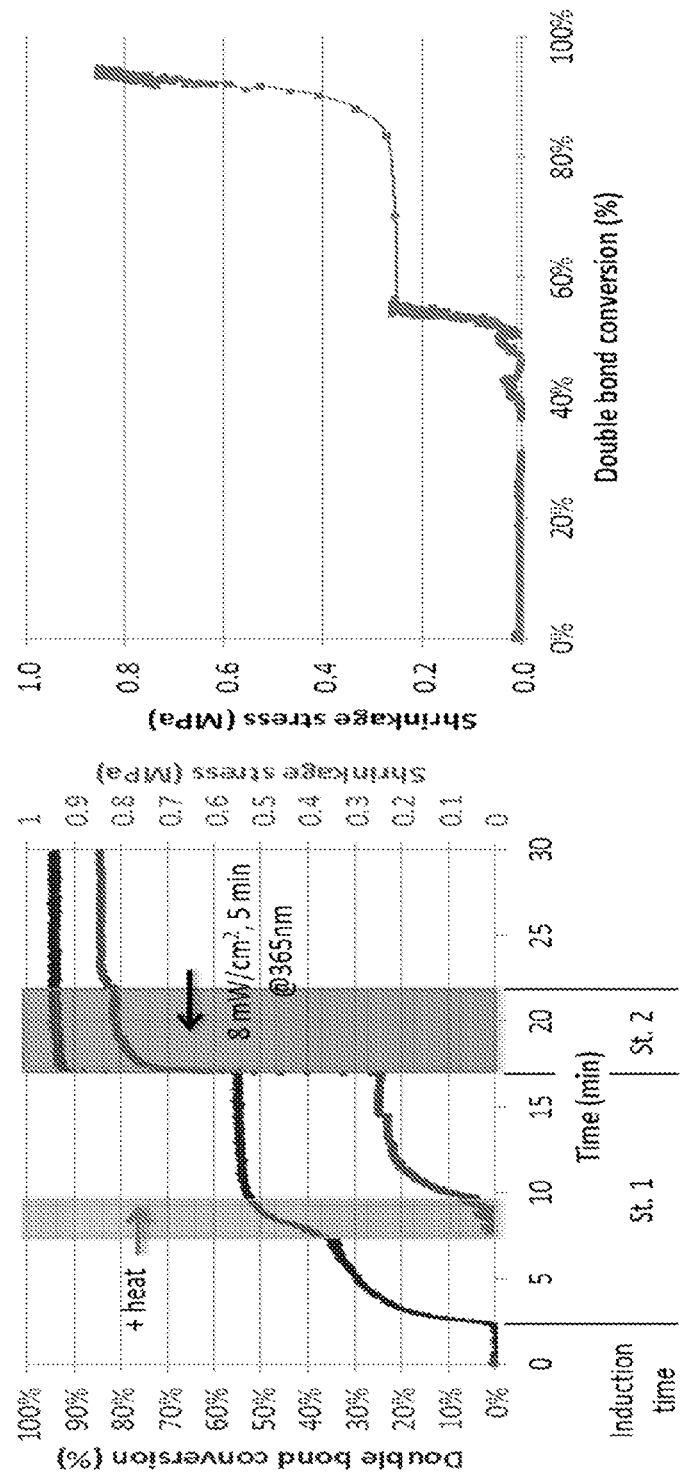
FIG. 29 is a series of graphs illustrating tensometer measurement of two-stage systems.
Figure 30:
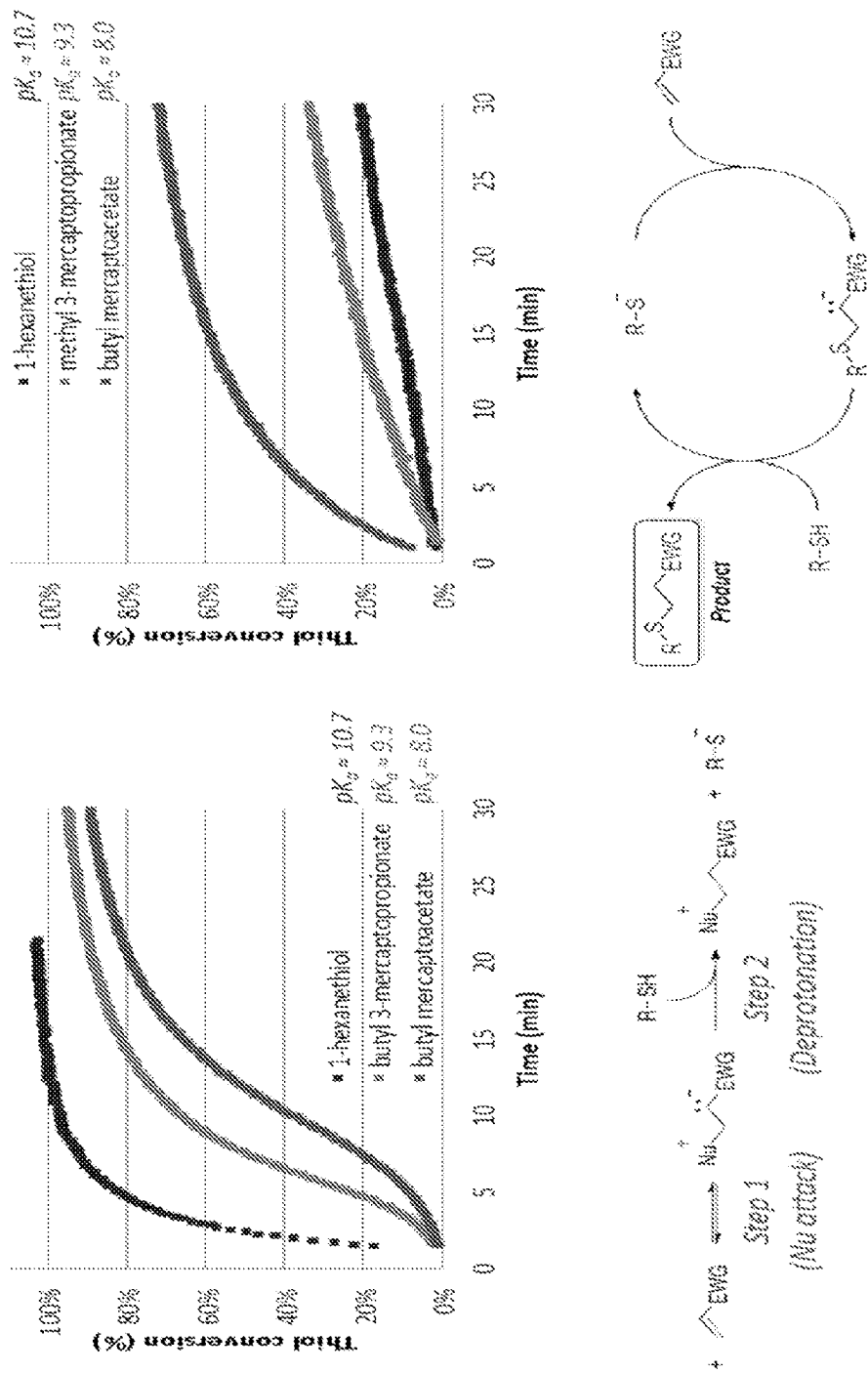
FIG. 30 is a graph illustrating the relative reactivity of various thiols in thiol-Michael addition reaction. [Thiol]:[Ethyl vinyl sulfone (EVS)]:[Nu or base] in diethyleneglycol diethyl ether. Nucleophile mediated: order of reaction rate was HT>BMP>BTG. Base mediated: order of reaction rate was BTG>MMP>HT. This suggests that step 2 (deprotonation) serving as a rate determining step for TPP mediated mechanism.
Figure 31:
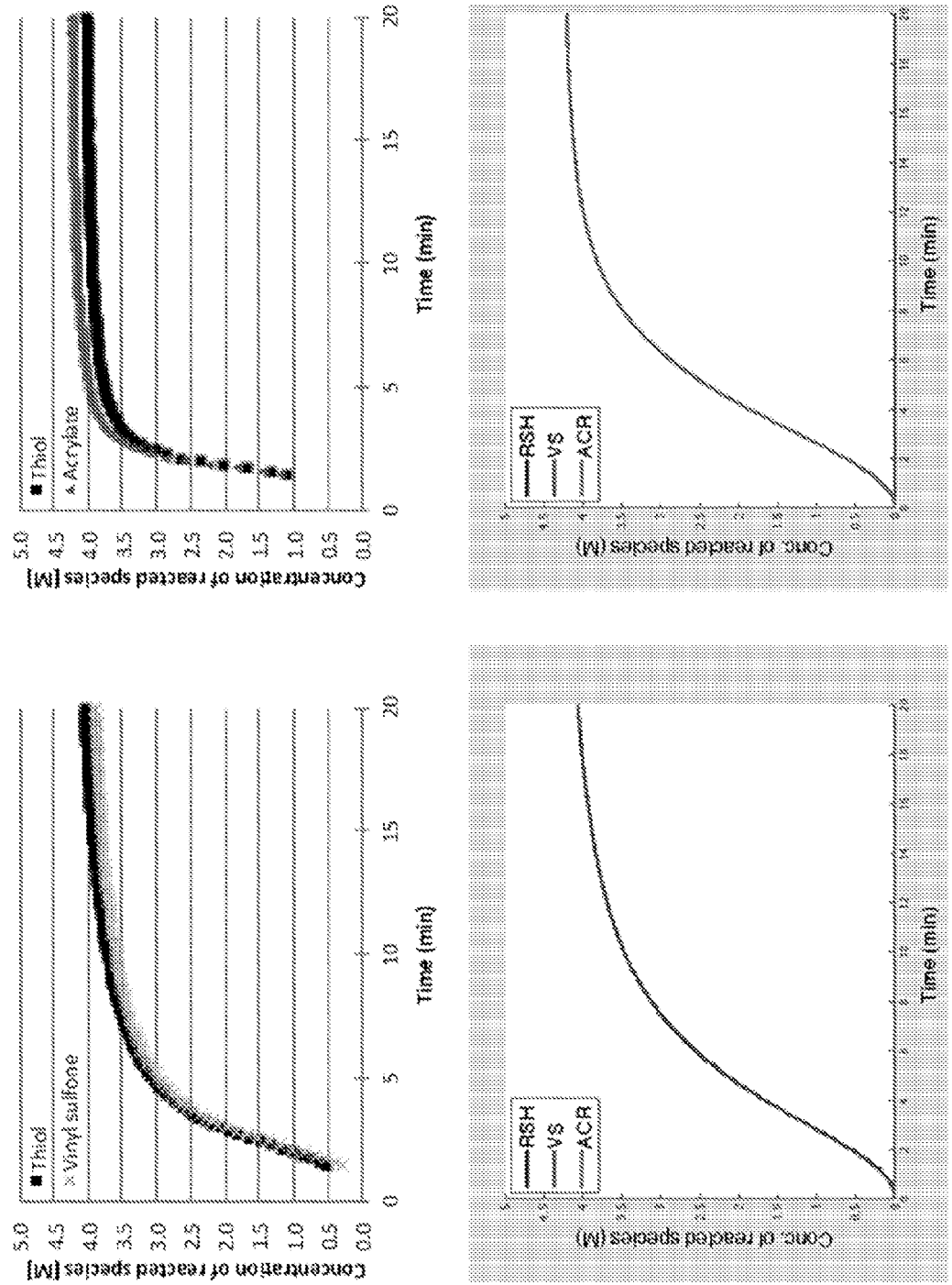
FIG. 31 is a series of graph illustrating modeling results for thiol/VS (or ACR)/TPP systems without MsOH. ACR showed higher reaction rates than VS.
Figure 32:
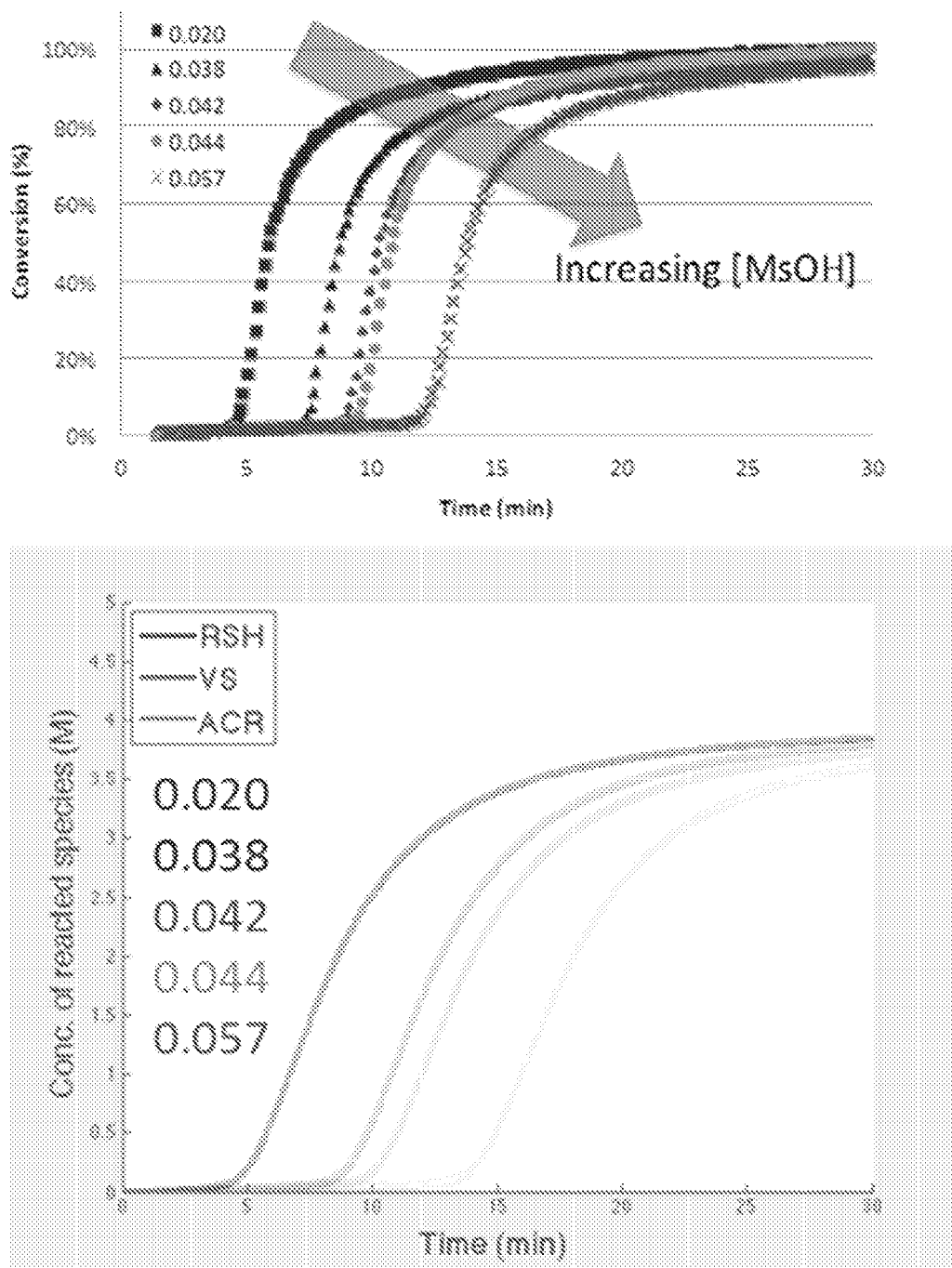
FIG. 32 is a series of graphs illustrating modeling of TMPTMP/EVS/TPP/MsOH systems with various [MsOH]. As [MsOH] increased, induction time also increased.
Figure 33:
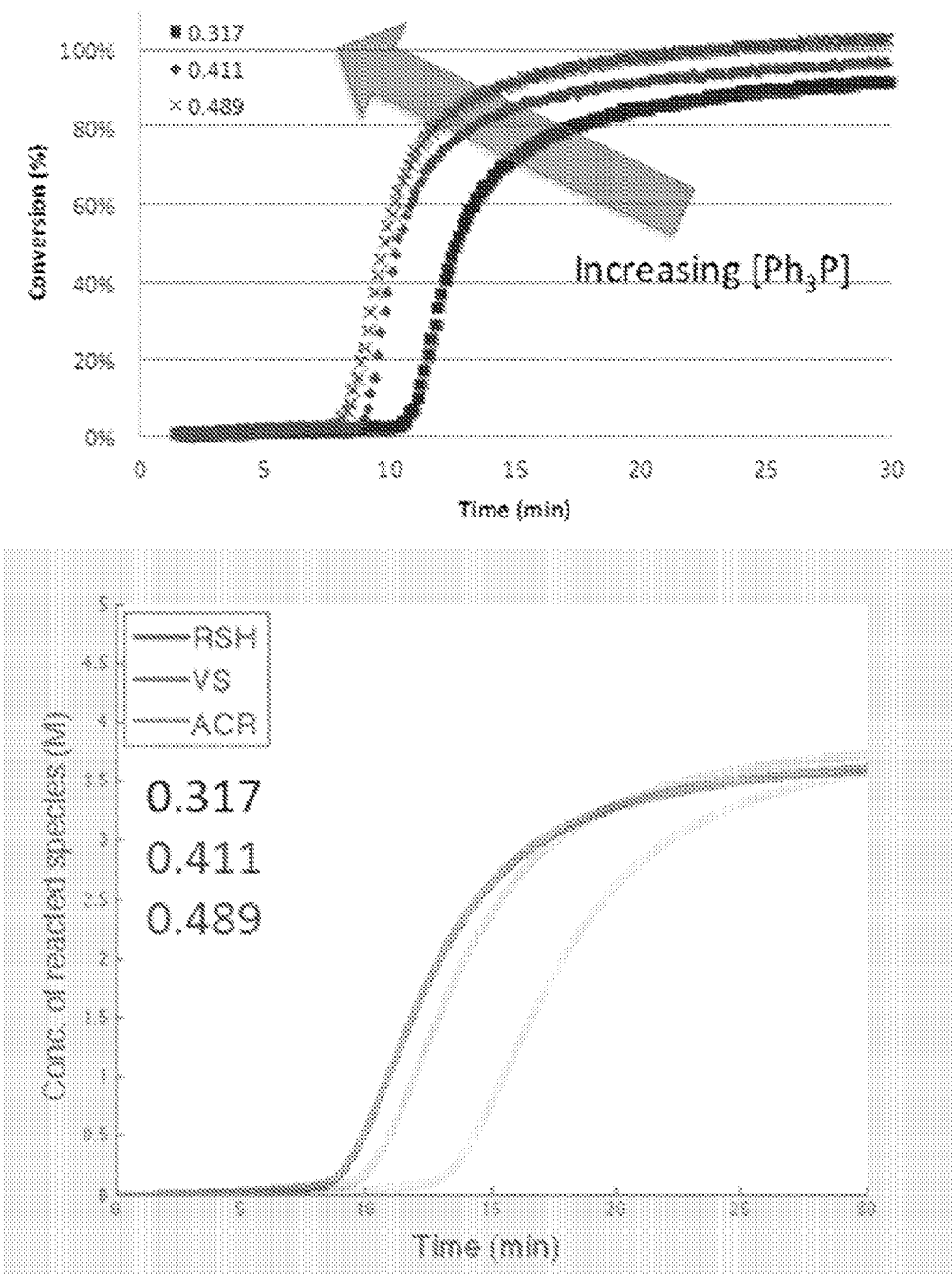
FIG. 33 is a series of graphs illustrating modeling of TMPTMP/EVS/TPP/MsOH systems with various [TPP]. As [TPP] increased, induction time decreased.
Figure 40A:
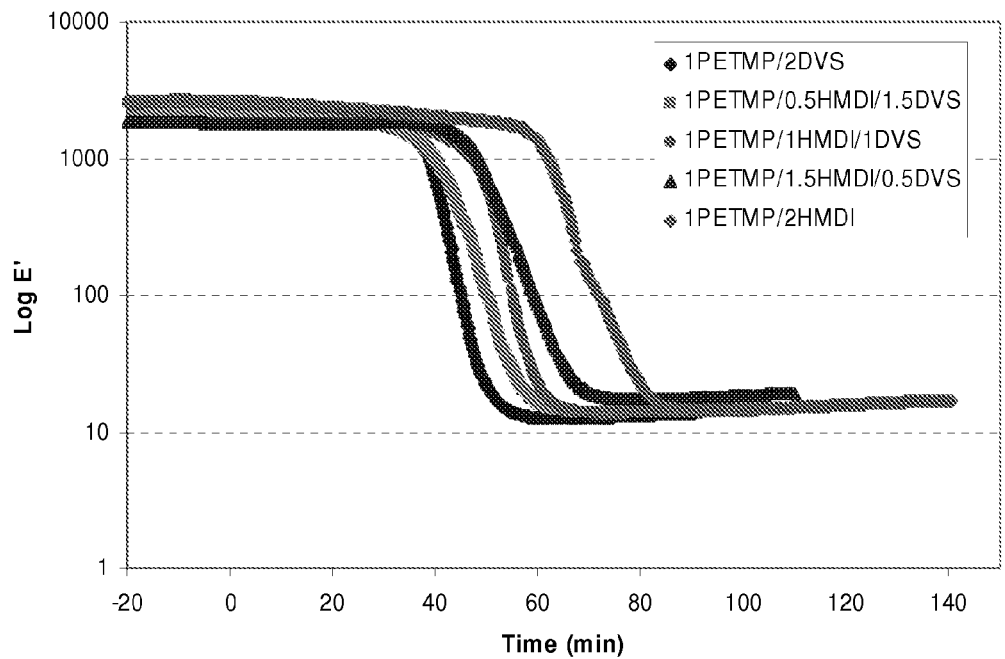
FIGS. 40A-40F, is a series of graphs illustrating experimental results relating to dynamic mechanical analysis (DMA) for copolymers of PETMP, DVS and HMDI (or MDI).
Figure 40B:
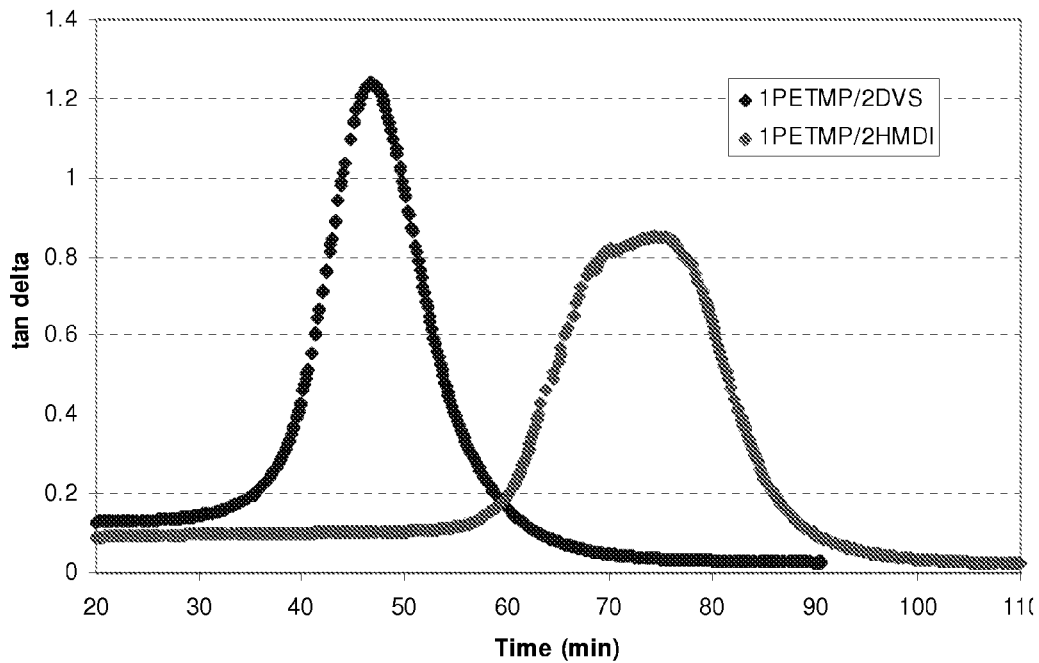
Figure 40C:
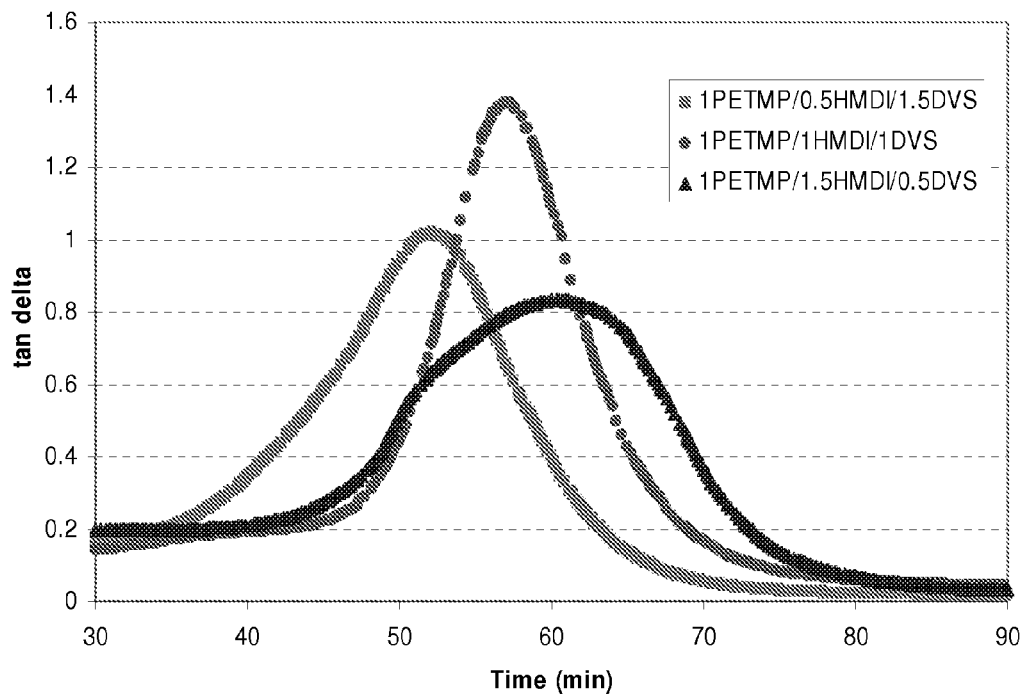
Figure 40D:
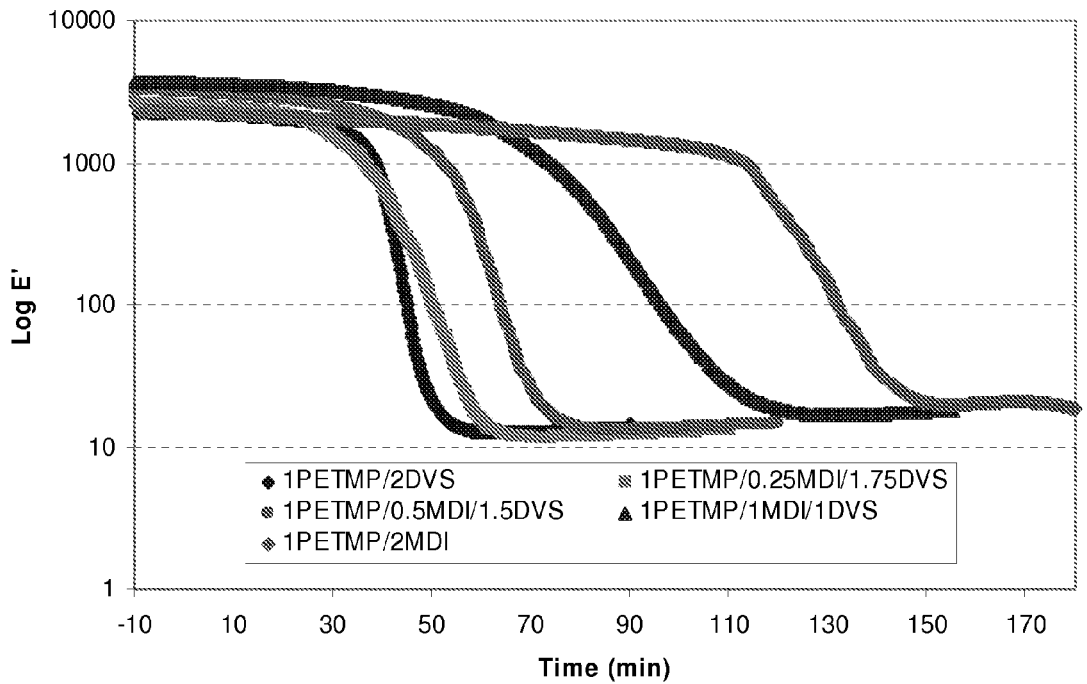
Figure 40E:
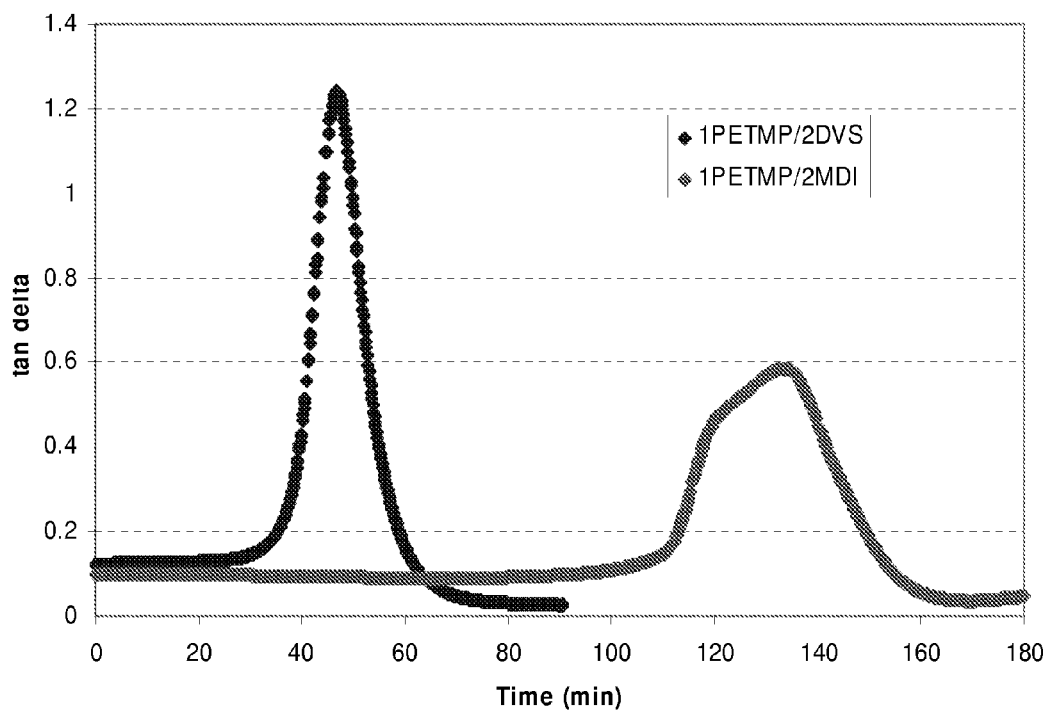
Figure 40F:
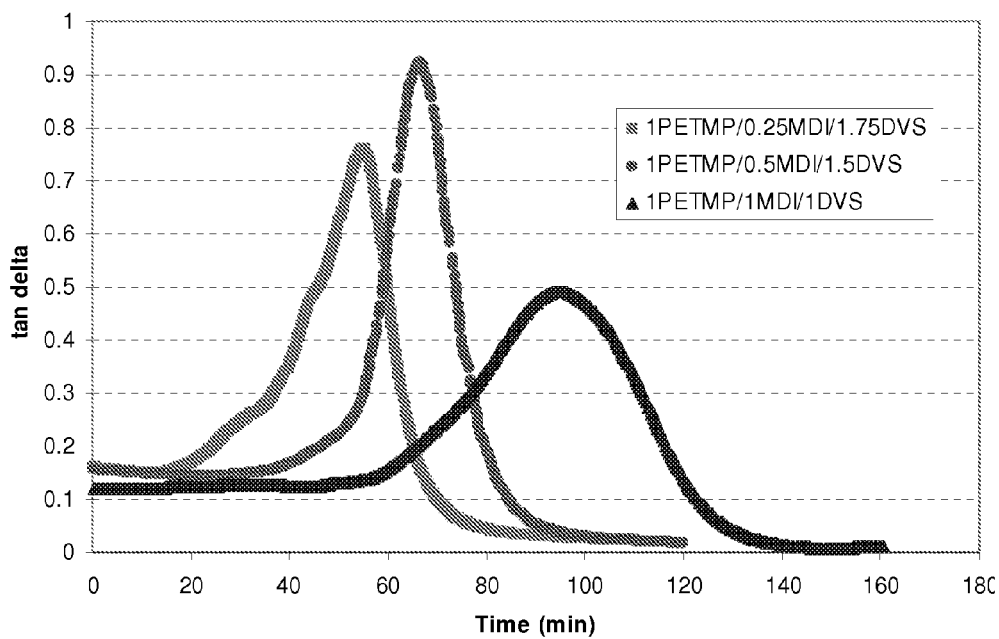

Effect of vinyl species was examined using ethyl acrylate (EA) instead of EVS and was reacted to TMPTMP. EA was expected to show longer induction time due to its less electron deficient character of vinyl group compared to EVS, which should lead to lower rate of nucleophilic attack. However, EA unexpectedly showed much shorter induction time with same concentration of TPP and MsOH (FIG. 16). To clarify this effect, TMPTMP was reacted with various ratios of EA/EVS mixture with fixed thiol to vinyl ratio (1 to 1). In all systems EVS actually reacted faster than EA, which indicates that thiol-Michael addition reaction itself proceeds faster for EVS than EA (FIG. 17). This observation lead to a hypothesis that the rate of zwitterion protonation for EVS/TPP system is much lower than that of EA/TPP system probably due to steric effects of bulky triphenylphosphine moiety and sulfone moiety that are close to the negative charge of zwitterionic species. Kinetic model also supported this hypothesis by reproducing longer induction time and lower rate of thiol-Michael addition reaction by having smaller kinetic constant for zwitterion protonation even with larger kinetic constant for nucleophilic attack (FIG. 19).

Figure 9:
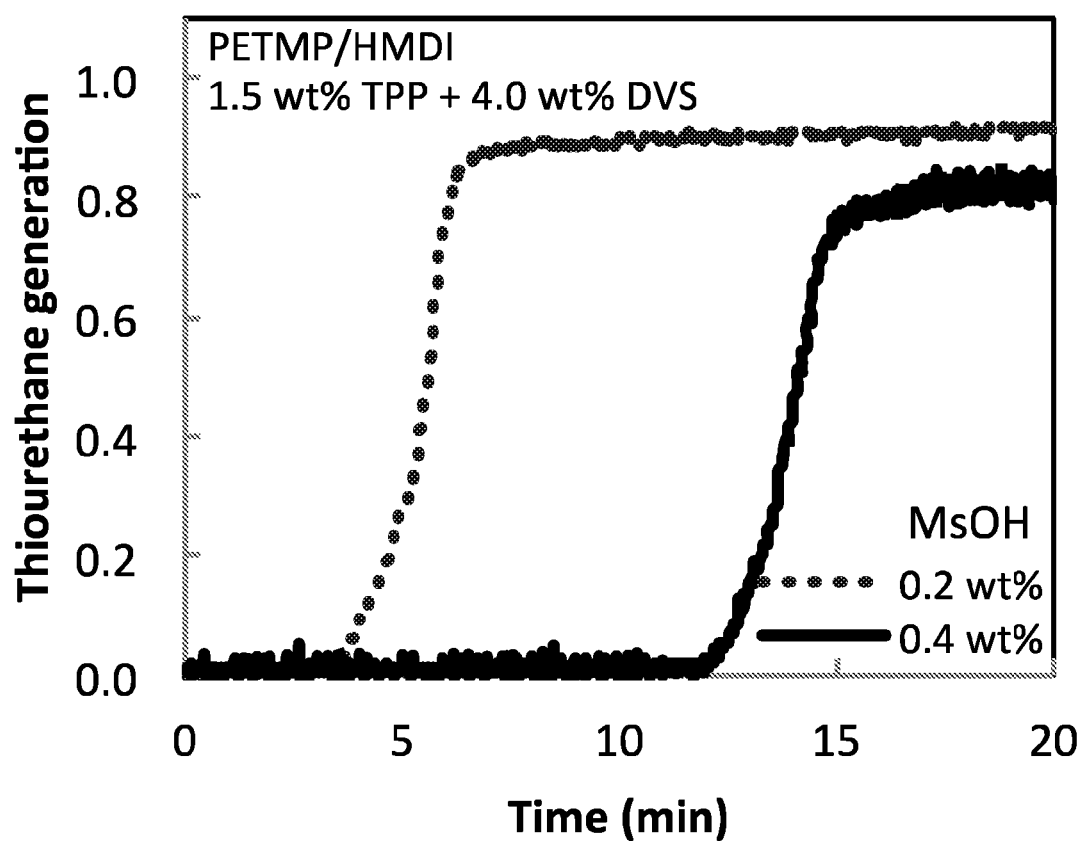
FIG. 9 is a graph illustrating conversion as a function of time plots for thiol/isocyanate reaction between pentaerythritol tetrakis(3-mercaptopropionate) (PETMP) and hexamethylene diisocyanate (HMDI). Thiol to isocyanate ratio was 1 to 1. TPP/DVS co-initiator system was used, and the amounts of each reagent were 1.5 wt % and 4.0 wt %, respectively. Adjustable induction time depending on MsOH concentration, followed by a rapid reaction, was clearly observed.

Thiol-isocyanate reaction could also be catalyzed by electron deficient vinyl and nucleophile via the same base generation mechanism. In this case, catalytic amount of electron deficient vinyl is needed as a co-catalyst. Therefore, EVS/TPP/MsOH catalyst system was examined for thiol-isocyanate reaction to evaluate its versatility. FIG. 9 illustrates the kinetic profile of a reaction between TMPTMP and butyl isocyanate (BI) catalyzed by EVS/TPP/MsOH, in which induction time was clearly observed.

In conclusion, a catalyst system consisted of electron deficient vinyl, nucleophile and acid could provide induction time in two thiol click reactions, thiol-Michael addition reaction and thiol-isocyanate reaction. Duration of induction time was easily adjustable by the concentration of each catalyst component. Implementation of this catalyst system to crosslinking systems would be extremely powerful, since the monomer mixture could be handled as a liquid for programmed amount of time for processing like coating, casting and molding, followed by rapid crosslinking polymerization. Moreover, this catalyst system is not limited to thiol-click reactions but also applicable to a wide range of chemical reactions that could be catalyzed by a pair of electron deficient vinyl and nucleophile.

Example 3

PETMP/HMDI/DVS Ternary Systems

Figure 42C:
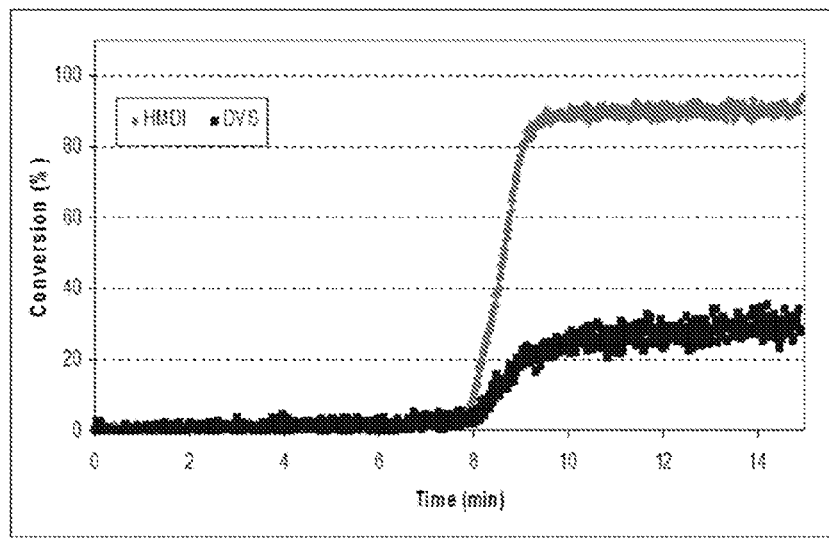
Figure 44:
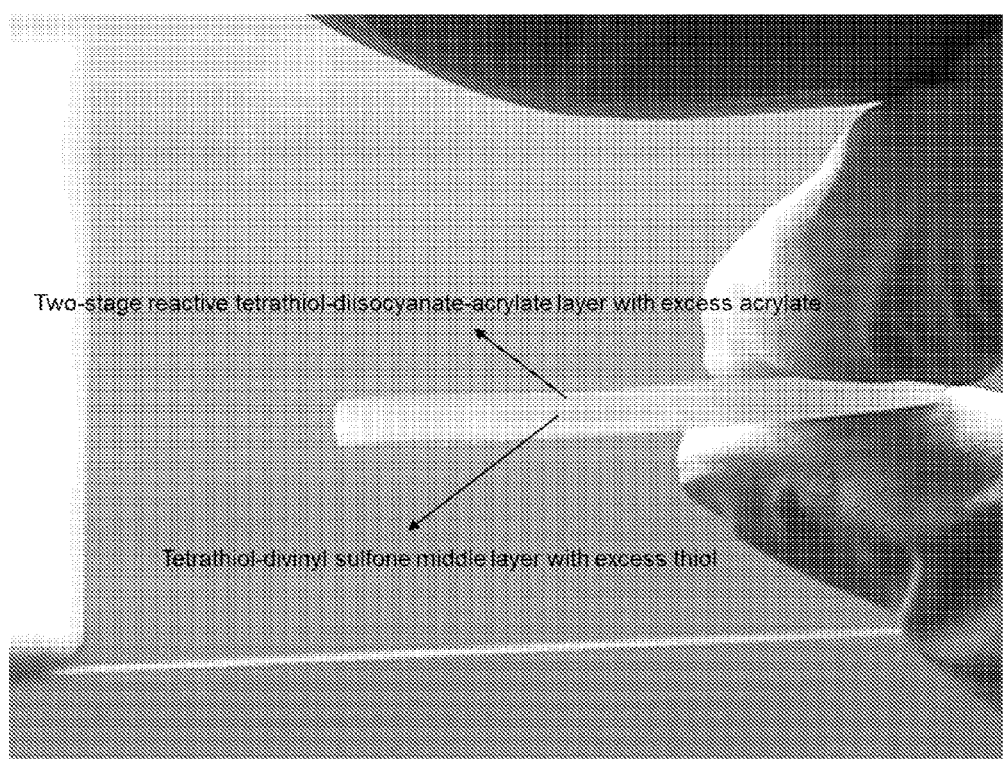
FIG. 44 illustrates a three-layer film of the invention.

The conversions at room temperature for ternary systems composed of tetrathiol, DVS and HMDI were investigated, in terms of maximum conversions and induction times (FIG. 42). Conversion at room temperature increased with the amount of HMDI in the system. Further, induction time increased with decreasing amount of co-initiator (DVS). Further, thiol-isocyanate reaction preceded thiol-vinyl sulfone reaction in all systems, at 80% isocyanate conversion there was less than 10% vinyl sulfone conversion. The studies indicated that the kinetics of thiol-isocyanate-vinyl sulfone crosslinking reaction may be easily controlled by the amount of TPP/MsOH ratio/content as well as co-initiator (DVS) concentration.

The shrinkage stress and shrinkage stress-Tg were also monitored (FIG. 43). To achieve full conversions the samples were heated up for 3-5 min at 60-70° C. The results suggest that at full conversions shrinkage stress shows linear dependence with $T_g$. However, there was no significant shrinkage stress generated at room temperature or below 80% conversions.

Further, a study was run to determine whether methyldiphenylphosphine and triphenylphosphine act as catalysts or initiators in thiol-Michael addition reaction. This distinction would determine whether a phosphine could be a leaving group from a zwitterion complex. To ensure quantitative vinyl sulfone consumption, 3-fold excess of the phosphine was used in the reaction. The protonated methyldiphenylphosphine-ethyl vinyl sulfone complex (A1) was obtained in 100% yield. The complex A1 did not react with thiolate anion (no thiol-Michael product could be detected in NMR spectrum), and thus the methane sulfonic acid anion was replaced by thiolate anion (a new cation-anion pair was formed).

Scheme 3:

MePh$_2$P/EVS/MsOH = 3M/1M/1M

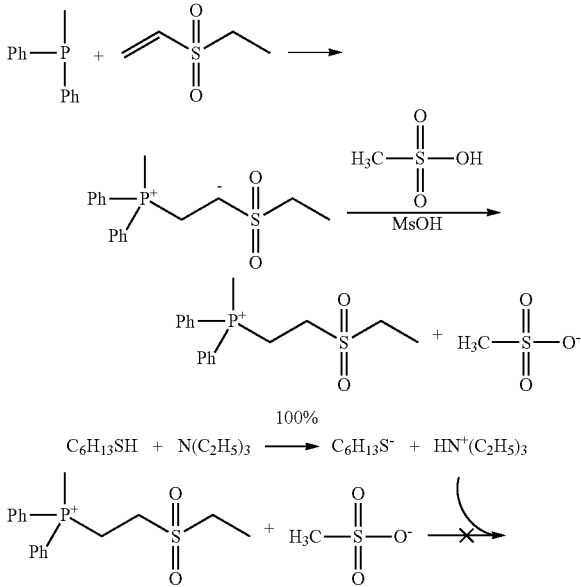

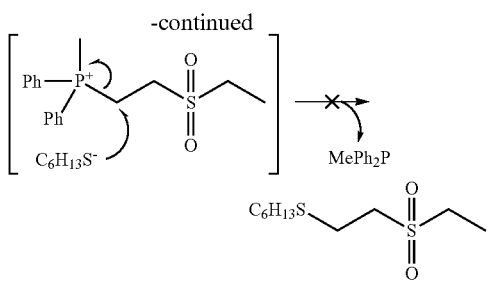

Ten-fold excess of triphenylphosphine over ethyl vinyl sulfone was used due to a very slow rate of nucleophile attack of triphenylphosphine on vinyl sulfone double bond. No thiol-Michael product could be detected in NMR spectrum, indicating that neither phosphine is able to leave a protonated zwitterion complex once it is formed.

Scheme 4:
$Ph_3P/EVS/MsOH = 10M/1M/1M$

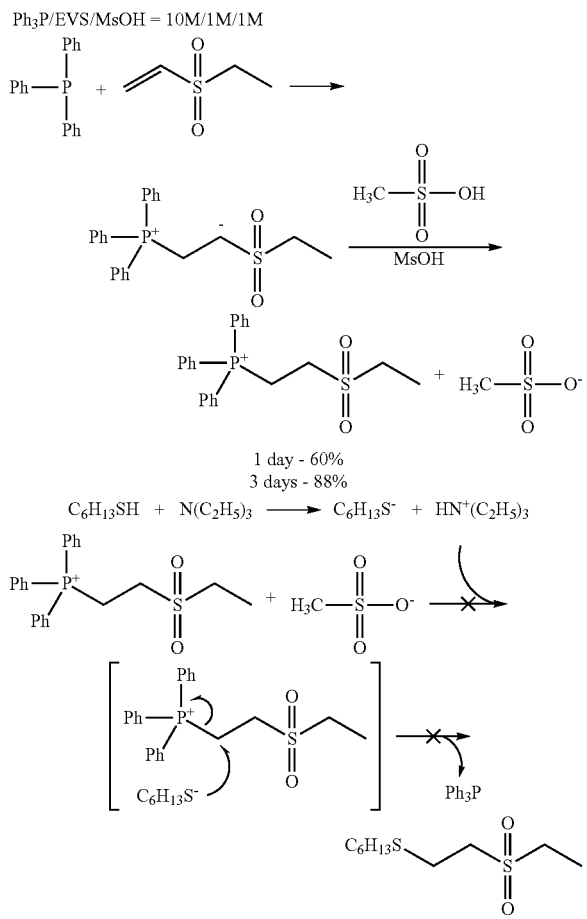

The disclosures of each and every patent, patent application, and publication cited herein are hereby incorporated herein by reference in their entirety.

While the invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed:

1. A composition comprising a vinyl sulfone monomer, a thiol monomer, and an acrylate monomer, wherein the thiol equivalent concentration is substantially equal to one selected from the group consisting of: the vinyl sulfone equivalent concentration; and the sum of the vinyl sulfone equivalent concentration and the acrylate equivalent concentration.

2. The composition of claim 1, further comprising at least one catalyst, wherein the catalyst comprises a base or nucleophile.

3. The composition of claim 2, wherein the catalyst comprises a tertiary amine or phosphine, wherein each substituent on the tertiary amine or phosphine is independently alkyl, substituted alkyl, aryl or substituted aryl.

4. The composition of claim 1, further comprising a polymerization photoinitiator, wherein the photoinitiator promotes photopolymerization of at least a portion of the acrylate monomer upon irradiation with UV radiation.

5. The composition of claim 4, wherein the polymerization photoinitiator is selected from the group consisting of 2,2-dimethoxy-1,2-diphenylethan-1-one, bis(2,4,6-trimethylbenzoyl)-phenylphosphineoxide, 1-hydroxycyclohexyl benzophenone, trimethyl-benzoyl-diphenyl-phosphine-oxide, and any combinations thereof.

6. The composition of claim 4, further comprising a polymerization accelerator or inhibitor.

7. The composition of claim 1, wherein the acrylate monomer is selected from the group consisting of ethylene glycoldi(meth)acrylate, tetraethyleneglycol-di(meth)acrylate, poly(ethylene glycol)dimethacrylates, the condensation product of bisphenol A and glycidyl methacrylate, 2,2'-bis[4-(3-methacryloxy-2-hydroxypropoxy)-phenyl]propane, hexanediol di(meth)acrylate, tripropylene glycol di(meth)acrylate, butanediol di(meth)acrylate, neopentyl glycol di(meth)acrylate, diethylene glycol di(meth)acrylate, triethylene glycol di(meth)acrylate, dipropylene glycol di(meth)acrylate, allyl(meth)acrylate trimethylolpropane triacrylate, tricyclodecane dimethanol diacrylate, and any combinations thereof.

8. The composition of claim 1, wherein the thiol monomer is selected from the group consisting of 2,5-dimercaptomethyl-1,4-dithiane, 2,3-dimercapto-1-propanol, 2-mercaptoethylsulfide, 2,3-(dimercaptoethylthio)-1-mercaptopropane, 1,2,3-trimercaptopropane, ethylene glycol bis(thioglycolate), ethylene glycol bis(3-mercaptopropionate), pentaerythritol tetra(3-mercaptopropionate), trimethylolpropane tris(3-mercaptopropionate), pentaerythritol tetra(2-mercaptoacetate), trimethylolpropane tris(2-mercaptoacetate), 1,6-hexanedithiol, 1,2-benzenedithiol, 1,3-benzenedithiol, isophorone diurethane thiol, and any combinations thereof.

9. The composition of claim 1, wherein the vinyl sulfone monomer is selected from the group consisting of ethyl vinyl sulfone, divinyl sulfone, the compounds depicted in FIG. 45, and any combinations thereof.

10. A method of generating a polymeric material, comprising the steps of:
   providing a composition comprising a vinyl sulfone monomer, a thiol monomer, an acrylate monomer, and at least one catalyst, wherein the catalyst comprises a base or nucleophile, wherein the thiol equivalent concentration is substantially equal to one selected from the group consisting of: the vinyl sulfone equivalent concentration; and the sum of the vinyl sulfone equivalent concentration and the acrylate equivalent concentration;
   submitting the composition to a first polymerization process, whereby the vinyl sulfone monomer is substantially polymerized and the acrylate monomer is substantially not polymerized; and, submitting the composition to a second polymerization process, whereby the acrylate monomer is substantially polymerized;

thereby generating the polymeric material.

11. The method of claim 10, wherein the second polymerization process comprises photopolymerization and the composition further comprises a polymerization photoinitiator.

* * * * *